United States Patent [19]

Bicher et al.

[11] 3,832,994

[45] Sept. 3, 1974

[54] CARDIAC MONITOR

[75] Inventors: Haim I. Bicher, Charleston, S.C.; Lon A. Sorenson, Cherry Hill, N.J.

[73] Assignee: Mediscience Corporation, Collingswood, N.J.

[22] Filed: Apr. 21, 1972

[21] Appl. No.: 246,124

[52] U.S. Cl. .......................... 128/2.06 A, 128/2.1 A

[51] Int. Cl. ............................................ A61b 5/04

[58] Field of Search ..... 128/2.05 R, 2.05 T, 20.6 A, 128/2.06 B, 2.06 E, 2.06 F, 2.06 G, 2.06 V, 2.1 A

[56] References Cited

UNITED STATES PATENTS

| | | | |
|---|---|---|---|
| 3,144,019 | 8/1964 | Haber | 128/2.06 A |
| 3,210,747 | 10/1965 | Clynes | 128/2.1 A |
| 3,212,496 | 10/1965 | Preston | 128/2.06 R |
| 3,513,833 | 5/1970 | Finch et al. | 128/2.06 R |
| 3,552,386 | 1/1971 | Horth | 128/2.06 A |
| 3,554,187 | 1/1971 | Glassner | 128/2.06 A |
| 3,603,769 | 9/1971 | Malcom | 128/2.06 F |
| 3,658,055 | 4/1972 | Abe et al. | 128/2.06 A |
| 3,717,140 | 2/1973 | Greenwood | 128/2.06 F |
| 3,724,455 | 4/1973 | Unger | 128/2.06 A |

*Primary Examiner*—William E. Kamm

[57] ABSTRACT

A cardiac monitor provides a real time analysis of critical cardiac functions. The cardiac monitor includes a first unit which, via a plurality of electrodes, is utilized to sense atrial and ventricular activity of a patient's heart to provide an analog EKG signal which includes the P,Q,R,S and T components of the analog EKG signal. The analog EKG signal is converted to a voltage controlled frequency modulated signal which is transmitted, via an FM transmitter, to a remote second unit which is advantageously carried by the patient. In the second unit, the analog EKG signal is detected in an FM detector and processed in an analog to digital converter which provides digital pulses related to the P,Q,R,S and T components of the analog EKG signal. The digital pulses are processed in various logic processing circuits which develop signals containing cardiac information. The cardiac information signals are analyzed to provide various alarm signals responsive to the sensing of cardiac abnormalities. Among the abnormalities which are sensed are atrial and ventricular bradycardias, atrial and ventricular tachycardias, long ventricular contractions, long atrial to ventrical conductions, premature ventricular contractions and junctional rhythms.

10 Claims, 26 Drawing Figures

CARDIAC MONITOR

This invention relates generally to cardiac monitors and, more particularly, to a cardiac monitor for providing a real time indication of various critical cardiac functions.

It is well known that expansions and contractions of the cardiac muscle produce electrical signals. These signals, which can be sensed by properly positioning electrodes on the surface of a person's skin, are most frequently called electrocardiac or EKG signals. The prior art has suggested various devices for monitoring EKG signals since, by analyzing these signals, an indication is provided as to the normal or abnormal condition of the monitored-heart.

Most frequently, the prior art cardiac monitors have taken the form of EKG computers which are designed, primarily, for in-hospital use. More particularly, these prior art EKG computers are designed primarily for use in operating rooms, intensive-care wards, recovery rooms and coronary-care units. Due to the complicated nature of these EKG computers, the computers are relatively bulky and, therefore, are not portable.

There exists a need in the art, however, to provide a compact and portable cardiac monitor. This need has arisen with the realization that it is often desirable to monitor the heart of post-coronary patients long after the occurrence of the initial "heart attack." Thus, it has been found desirable to monitor the heart of post-coronary patients — not only in intensive-care rooms, operating rooms or the like — but also for an extended period of time after the patient has "recovered" from the initial attack, while the patient is away from the hospital and back in his normal routine. It has been found that during the "recovery" time after an initial heart attack, changes in EKG signals may well forcast the occurrence of another attack. In fact, studies have found that critical rhythm changes in the patient's EKG signal have preceded, from approximately 1 to approximately 8 hours, the occurrence of another heart attack. It is apparent, therefore, that if such changes in the EKG signals can be detected, the patient can contact his physician and the physician can advise the patient on what course of conduct to follow. Thus, there exists a need in the art to provide a cardiac monitor which may be easily worn or carried by a patient and which can provide an early indication of a cardiac malfunction.

Furthermore, although the prior art has suggested the monitoring of various signals derived from the EKG signal, none of the prior art has been able to provide a cardiac monitor which is capable of monitoring a wide range of heartbeat characteristics. Thus, most prior art cardiac monitors have merely analyzed the QRS component of the EKG signal. However, the art has not suggested the monitoring of the P and T components of the EKG signal, either separately, or in relation to the QRS component and none of the prior art has suggested monitoring both inter-beat and intra-beat heartbeat characteristics. Accordingly, the prior art has been unable to provide all the information which may be obtained by analyzing the components of the EKG signal.

Another disadvantage of conventional cardiac monitors is the susceptibility of these monitors to extraneous signals. More specifically, virtually all existing cardiac monitors are "artifact-sensitive," that is, they respond to conditions other than actual changes in the EKG signal. These artifacts, which may be caused by noise, non-cardiac muscular activity, or the like, result in false alarms since existing cardiac monitors interpret these artifacts as abnormal EKG signals. Such false alarms or "false positives" are clearly undesirable in that they result in increased anxiety for the patient or user of the monitor and, if they occur frequently, result in the loss of confidence in such monitors. Thus, there exists a need in the art to provide a cardiac monitor which is not artifact sensitive and which eliminates false alarms or false positives resulting from these artifacts when, in fact, the patient's EKG signal is normal. There also exists a need in the art to provide a cardiac monitor which is free of false positives caused by the circuitry of the monitor.

Accordingly, it is a broad object of the present invention to provide an improved cardiac monitor.

A more specific object of the present invention is to provide a cardiac monitor which is portable and therefore especially useful during the post-coronary recovery period.

A still further object of this invention is to provide a cardiac monitor which is immune from false positives caused by artifacts or by the circuitry of the monitor.

A still further object of this invention is to provide a cardiac monitor which analyzes a plurality of components of an EKG signal.

A still further object of this invention is to provide a cardiac monitor which provides a real time analysis of an EKG signal.

In accordance with an illustrative embodiment demonstrating objects and features of the present invention, a cardiac monitor is provided for providing a real time analysis of an EKG signal. The cardiac monitor includes a first unit having a plurality of electrodes which are connected to the chest of a heart patient. The electrodes sense atrial and ventricular activity of the patient's heart to provide an analog EKG signal. A conventional FM transmitter, disposed in the first unit, transmits the analog EKG signal to a second unit which is advantageously remote from the first unit and which includes a conventional FM detector. The FM detector detects the transmitted analog EKG signal and couples the same to an analog to digital converter which provides pulse signals responsive to the P,Q,R,S and T components of the analog EKG signal. The pulse signals are fed to various logic circuits which provide delays, synchronizing and enable signals, clock and timing signals and inhibit signals which are utilized to process the pulse signals in various logic processing circuits. The various logic processing circuits provide signals responsive to abnormalities in the EKG signal. More particularly, the logic processing circuits provide alarm signals responsive to the occurrence of the following "abnormalities:" ventricular bradycardia and tachycardia; atrial bradycardia and tachycardia; premature ventricular contractions; long ventricular contractions; long atrial-ventricular conduction; and, junctional rhythms. The alarm signals are utilized to actuate an audible or other alarm to advise the patient of the heart abnormality.

The above brief description, as well as further objects, features and advantages of the present invention, will be more fully appreciated by reference to the following detailed description of a preferred, but nonetheless illustrative embodiment in accordance with the present invention, when considered in conjunction with the accompanying drawings, wherein.

GENERAL DESCRIPTION OF THE CARDIAC MONITOR

Figure 1:
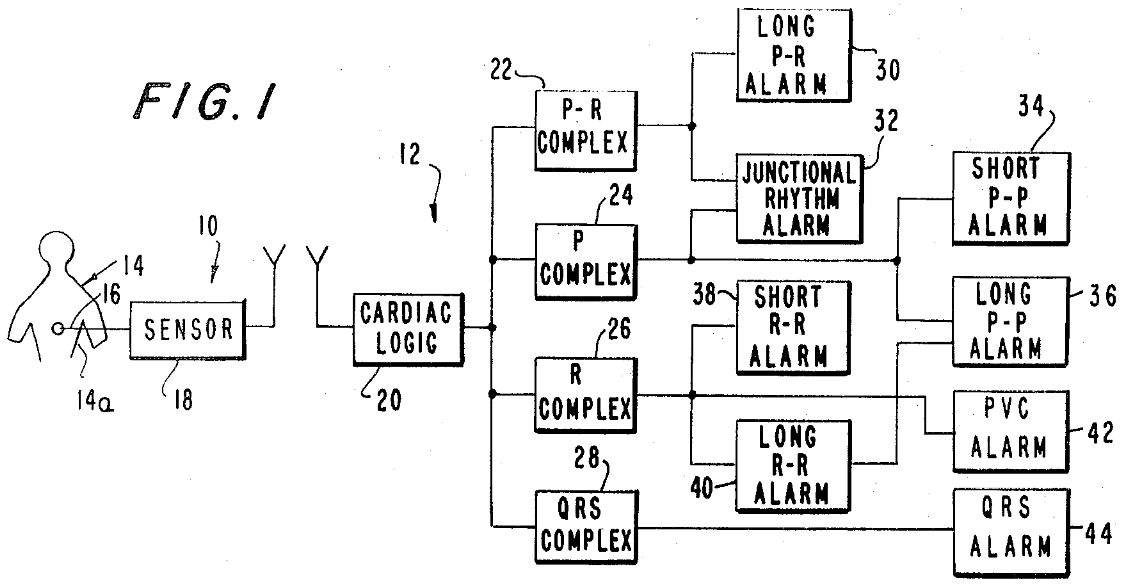
FIG. 1 is a block diagram useful in explaining the operation of the cardiac monitor of the present invention.

Referring now to the drawings and, more particularly, to FIG. 1 thereof, a cardiac monitor according to the present invention is shown in block diagram as including a first or SENSING AND TRANSMITTING UNIT, generally designated 10, and a second or PROCESSING UNIT, generally designated 12. SENSING AND TRANSMITTING UNIT 10 is advantageously of a size which enables the same to be worn near the chest 14*a* of a patient generally designated 14 whose heart is to be monitored. ELECTRODES 16, which are connected to the chest 14*a* of patient 14, sense atrial and ventricular activity of the patient's heart by sensing the muscular contractions proportional to cardiac activity. The signals from ELECTRODES 16 are sensed in a SENSOR 18, the output of which provides an analog EKG signal.

The analog EKG signal is transmitted to PROCESSING UNIT 12 which is advantageously remote from SENSING AND TRANSMITTING UNIT 10. By way of example, PROCESSING UNIT 12 may be carried in the pocket or the belt of patient 14. Thus, the cardiac monitor of the present invention provides a cardiac monitoring system which is portable and which may be carried in a convenient manner by the patient thereby facilitating the use of the cardiac monitor during the patient's post coronary recovery period.

PROCESSING UNIT 12 receives the analog EKG signal transmitted from SENSING AND TRANSMITTING UNIT 10 and, as indicated schematically in FIG. 1, the analog EKG signal is coupled to a CARDIAC LOGIC CIRCUIT 20 which, as will be explained in more detail hereinafter, provides a digital representation of the analog EKG signal. CARDIAC LOGIC CIRCUIT 20 further provides various enabling signals, timing signals, delays, reset signals and other signals useful in the present invention. The output from CARDIAC LOGIC CIRCUIT 20 is coupled to various CARDIAC PROCESSING CIRCUITS, generally designated 22, 24, 26 and 28.

Although the details of the CARDIAC PROCESSING CIRCUITS and the CARDIAC LOGIC CIRCUIT will be explained in more detail, the function of these circuits may be understood with reference to FIG. 4*a* which illustrates a typical (and relatively normal) EKG signal. As is well known in the art, there are electrical signals that circulate at the surface of a person's skin as the result of expansions and contractions of the cardiac muscle. These electrical signals are the socalled electrocardiac or EKG signals which are related to the action of the cardiac muscle and to the condition thereof. In a typical EKG signal (illustrated in FIG. 4*a*), the EKG signal includes a P (or atrial) component and which is a deflection of small amplitude (50 to 100 microvolts) and short duration (40 to 80 msec.). Thereafter, following a brief interval of quiescence (dependent on the origin of the ventricular pacemaker), the EKG signal swings through the QRS complex, corresponding to depolarization of the cardiac muscle, in which the signal first swings briefly negative (the Q component), then through a relatively sharp positive spike of about 1 mv. (the R component) and thence through a brief negative swing (the S component) for a nominal normal QRS duration of less than 120 msec. After a rest period of more or less quiescence, the EKG signal swings positive (the T component) indicating repolarization of the cardiac muscle. A ventricular refractory period, of approximately 200 msec., occurs from the R component during which no ventricular activity can occur. The T component is followed by a period of quiescence after which the EKG signal repeats. The cardiac monitor of the present invention senses the P,Q,R,S and T components of the EKG signal to provide various alarm signals if the monitored EKG signal is abnormal.

More particularly, CARDIAC LOGIC CIRCUIT 20 senses the P,Q,R,S and T components of the analog EKG signal. These components are then coupled to the various CARDIAC PROCESSING CIRCUITS 22–28 which analyze these components. Thus, P-R CARDIAC PROCESSING CIRCUIT 22 analyzes the P component and the R component of the analog EKG signal and provides a real time determination of the time between the atrial (the P component) and the ventricular (the R component) of such signal. If the time duration between the P and the R components of the analog EKG signal exceeds a predetermined value, a LONG P-R ALARM 30, which is coupled to the output of P-R CARDIAC PROCESSING CIRCUIT 22, is actuated. As will be explained in more detail hereinafter, LONG P-R ALARM 30 is actuated if the time duration between the P and the R components of the analog EKG signal equals or exceeds 0.22 seconds.

The output of P-R CARDIAC PROCESSING CIRCUIT 22 is also coupled to a JUNCTIONAL RHYTHM ALARM 32. Junctional rhythms are a well-known and well-recognized cardiac abnormality which occur, physiologically, when the cardiac muscle is actuated by nodal pacemakers, that is pacemakers which occur near the AV node and capture the normal sequence in the cardiac rhythm. This may result, for example, by the toxidity of the patient to certain drugs or other causes. JUNCTIONAL RHYTHM ALARM 32 is responsive to P-R CARDIAC PROCESSING CIRCUIT 22, the latter providing an alarm if the time duration between the atrial (P) and ventricular (R) components of the EKG signal is less than a predetermined value. More specifically, an alarm signal is provided when P-R CARDIAC PROCESSING CIRCUIT 22 senses "short" P-R INTERVALS, that is, if the time between the P and R components of the analog EKG signal is less than or equal to 120 msec.

It has been found, however, that it is possible for a patient to occasionally have a short P-R INTERVAL without having junctional rhythm. Thus, it is advantageous to count the number of short (less than or equal to 120 msec.) P-R INTERVALS during a heart dependent tally interval. As will be explained hereinafter, if 12 short P-R INTERVALS occur within a heart dependent tally interval as established by 128 ventrical beats or cycles, JUNCTIONAL RHYTHM ALARM 32 is actuated.

JUNCTIONAL RHYTHM ALARM 32 is also actuated responsive to the P CARDIAC PROCESSING CIRCUIT 24 which is coupled between JUNCTIONAL RHYTHM ALARM 32 and CARDIAC LOGIC CIRCUIT 20 and which analyzes the atrail or P components of the analog EKG signal. As hereinbefore explained, a junctional rhythm occurs as a result of a nodal pacemaker activating the cardiac muscle. Quite frequently, this results in an EKG signal which lacks the normal atrial or P component. By sensing the EKG signals which have a "missed P" component, junctional rhythms may be sensed. Accordingly, JUNCTIONAL RHYTHM ALARM 32 is also actuated, as will be explained in more detail hereinafter, by tallying "missed P" components of the EKG signal during a heart dependent tally interval. If 12 "missed P" components occur within the heart dependent tally interval as established by 128 ventrical beats or cycles, JUNCTIONAL RHYTHM ALARM 32 is actuated.

A SHORT P-P ALARM 34 and a LONG P-P ALARM 36 are also coupled to the output of P CARDIAC PROCESSING CIRCUIT 24. SHORT P-P ALARM 34 is actuated, responsive to the P CARDIAC PROCESSING CIRCUIT 24, when the cardiac monitor of the present invention senses an atrial tachycardia in the monitored-heart. As will be explained in more detail hereinafter, SHORT P-P ALARM 34 is actuated by tallying the number of short P-P INTERVALS which occur during a heart dependent tally interval. If 5 short P-P INTERVALS (less than or equal to 0.5 seconds) are tallied within 11 ventrical beats or cycles, SHORT P-P ALARM 34 is actuated thus providing an indication of an atrial tachycardia.

In a similar manner, the output from P CARDIAC PROCESSING CIRCUIT 24 is coupled to LONG P-P ALARM 36, the latter being actuated to provide an alarm signal upon the sensing in th cardiac monitor of an atrial bradycardia. More particularly, LONG P-P ALARM 36 will be actuated and will provide an immediate alarm if the P-P INTERVAL exceeds a predetermined time duration. For example, if a "long" P-P INTERVAL (a P-P INTERVAL greater than or equal to 1.5 seconds, corresponding to a cardiac EKG signal having an atrail component at 40 beats per minute) and if the long P-P INTERVAL occurs concurrent with a long R-R INTERVAL (as will be explained hereinafter), LONG P-P ALARM 36 is actuated.

LONG P-P ALARM 36 is also actuated if a number of "intermediately long" P-P INTERVALS occur within a heart dependent tally interval. Thus, if 12 "intermediately long" P-P INTERVALS (a P-P INTERVAL equal to or greater than 1.2 seconds but less than or equal to 1.5 seconds) occur within a heart dependent tally interval established by 60 ventricular beats or cycles, LONG P-P ALARM 36 is actuated. This indicates that an atrial bradycardia is being sensed by the cardiac monitor.

The CARDIAC LOGIC CIRCUIT 20 is also coupled to a R CARDIAC PROCESSING CIRCUIT 26 which analyzes the R or ventricular component of the analog EKG signal. A SHORT R-R ALARM 38, coupled to the output of R CARDIAC PROCESSING CIRCUIT 26, provides an alarm signal if a "short" R-R INTERVAL is sensed, that is, when the R-R INTERVAL is less than or equal to 0.5 seconds. This is a ventricular tachycardia and corresponds to an analog EKG signal having R or ventricular components occurring at approximately 120 beats per minute.

Similarly, R CARDIAC PROCESSING CIRCUIT 26 is coupled to a LONG R-R ALARM 40 which is actuated responsive to the occurrence of a ventricular bradycardia. More particularly, R CARDIAC PROCESSING CIRCUIT 26 senses "long" R-R INTERVALS and provides an immediate alarm at LONG R-R ALARM 40 upon sensing a long R-R INTERVAL (a R-R INTERVAL greater than or equal to 1.5 seconds, corresponding to an EKG signal of approximately 40 beats per minute). LONG R-R ALARM 40 is also actuated by tallying "intermediately long" R-R INTERVALS (an R-R INTERVAL greater than or equal to 1.2 seconds and less than or equal to 1.5 seconds). LONG R-R ALARM 40 is actuated if 12 "intermediately long" R-R INTERVALS are tallied within a heart dependent tally interval established by 60 ventricular beats or cycles.

Also coupled to the output of R CARDIAC PROCESSING CIRCUIT 26 is a PVC ALARM 42 which is responsive to premature ventricular contractions in the monitored-heart. Normally, in considering a series of analog EKG signals (and considering only the P and R components thereof), the normal or typical sequence is to have a P(or atrail) component followed by an R (or ventricular) component, followed by another P (or atrial) component and then another R (or ventricular) component, etc. Thus, the normal sequence is PRPRPR...,etc. However, in an "abnormal" EKG signal there often occurs an extra or ectopic ventricular contraction which may be caused by premature ventricular contractions in the monitored-heart. In such a EKG signal, the sequence is PRrPRPR...,etc. The second ventricular or R component (the *r*) in this sequence is defined as an "extra" or an ectopic ventricular contraction. It is also possible to have two extra or ectopic ventricular contractions "back to back," in which case the sequence is as follows: PR*rr*PR...,etc. In the latter sequence, the second and third ventricular or R component signals (the *rr*) signify ectopic ventricular contractions which occur "back to back."

R CARDIAC PROCESSING CIRCUIT 26 is responsive, as will be explained in more detail hereinafter, to ectopic ventricular contraction to immediately actuate PVC ALARM 42 upon the occurrence of two ectopic ventricular contractions "back to back". Additionally, PVC ALARM 42 will be actuated if a predetermined number of ectopic ventricular contractions occur within a predetermined time dependent tally interval. For example, PVC ALARM 42 is actuated if six ectopic ventricular contractions occur within a time dependent tally interval of 60 seconds, that is, within 60 seconds from the first ectopic beat.

Lastly, the output of CARDIAC LOGIC CIRCUIT 20 is coupled to a QRS CARDIAC PROCESSING CIRCUIT 28 which, in turn, is coupled to a LONG QRS ALARM 44. QRS CARDIAC PROCESSING CIRCUIT 28 senses the Q,R and S components of the analog EKG signal and actuates LONG QRS ALARM 44 if the time duration between these components exceed a predetermined value. For example, LONG QRS ALARM 44 is actuated if the QRS component duration is greater than or equal to 0.12 seconds. This corresponds to the occurrence of a long ventricular contraction in the monitored-heart.

Although the various circuits will be explained in more detail hereinafter, it is apparent that the cardiac monitor of the present invention provides various alarm signals responsive to a real time analysis of the analog EKG signal. The cardiac monitor provides alarm signals which are responsive to the intra-beat EKG signal (LONG P-R ALARM, QRS ALARM); which are responsive to the inter-beat EKG signal (SHORT AND LONG P-P, SHORT AND LONG R-R, and PVC); and, which are responsive to the interrelation between inter-beat and intra-beat EKG signals (the JUNCTIONAL RHYTHM ALARM).

Further, the cardiac monitor can provide immediate alarms if certain intervals exceed or are less than a predetermined time duration (for example, the short R-R INTERVAL, long P-R INTERVAL, etc.) and can also tally various components and intervals ("intermediately long" P-P INTERVAL, PVC ALARM) during various tally intervals which may be time dependent (60 seconds) or heart dependent (60 or 128 ventricular beats or cycles).

The details and operation of the cardiac monitor will now be explained in more detail.

GENERAL DESCRIPTION OF THE SENSING AND TRANSMITTING UNIT

Figure 2:
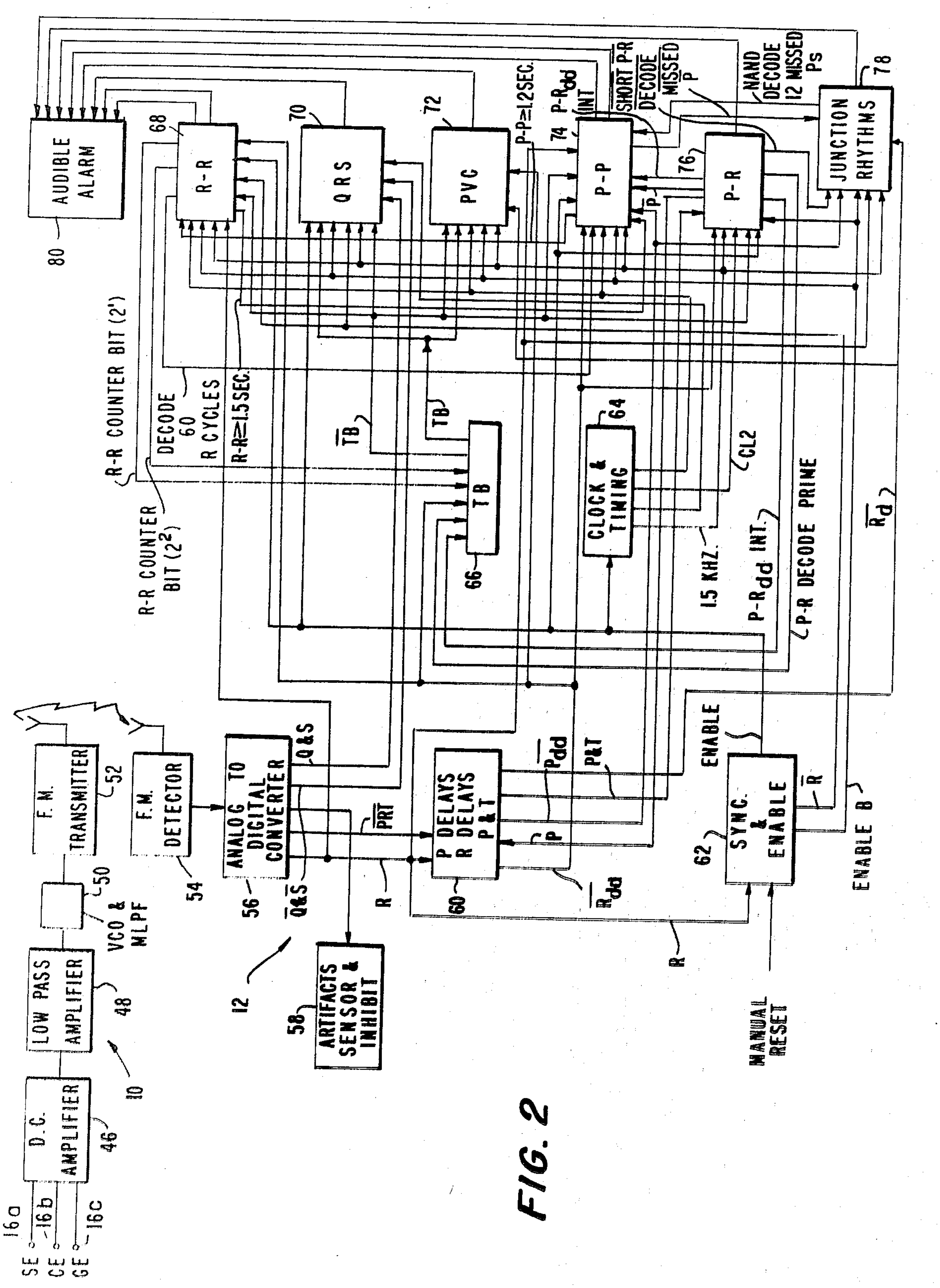
FIG. 2 is a block diagram of the cardiac monitor of the present invention indicating the various interconnections in the PROCESSING UNIT of the cardiac monitor.

Referring to FIG. 2 SENSING AND TRANSMITTING UNIT 10 is shown as including a plurality of electrodes 16*a*, 16*b* and 16*c* which are adapted to be secured to the chest of a cardiac patient. By way of example, electrode 16*a* may be connected to the side of the patient's chest, electrode 16*b* may be connected to the center of the chest and electrode 16*c* may be attached to the chest to act as a ground terminal for grounding the cardiac monitor. The placement of electrodes 16*a*, 16*b* and 16*c* may be varied, however, to suit the particular patient to be monitored. For example, in obese patients it may be required to place one (or more) of the electrodes at the patient's shoulder.

As is well known in the art, electrodes 16*a*, 16*b* and 16*c* sense the signals produced by the cardiac muscle, thereby providing an analog EKG signal. The analog EKG signal is coupled to a conventional DC AMPLIFIER 46 which advantageously is chosen to have a gain of approximately 60. In order to eliminate noise and other interference, the analog EKG signal is then coupled to a LOW PASS AMPLIFIER 48 which is chosen to pass frequencies from approximately 1 to approximately 80 Hz. and which has a gain of approximately 30. DC AMPLIFIER 46 and LOW PASS AMPLIFIER 48, per se, are well known in the art and are advantageously operational amplifiers.

After the analog EKG signal has been amplified and filtered, the signal is coupled to a conventional VOLTAGE CONTROLLED OSCILLATOR 50 which, in turn, then couples the signal to a conventional FM TRANSMITTER 52. VOLTAGE CONTROLLED OSCILLATOR 50 may also include a multiple low pass active filter (not shown) and a voltage divider (not shown). VOLTAGE CONTROL OSCILLATOR 50 and FM TRANSMITTER 52 operate, as is well known in the art, to transmit the analog EKG signal as an FM/FM carrier signal to the PROCESSING UNIT 12 which, advantageously, is remote from the SENSING AND TRANSMITTING UNIT 10. Thus, SENSING AND TRANSMITTING UNIT 10 may be worn on the patient's chest while PROCESSING UNIT 12 may be carried in the patient's pocket or on a belt or the like. In any case, SENSING AND TRANSMITTING UNIT 10 and PROCESSING UNIT 12 are of a size which enable the same to be easily and conveniently carried by a patient. This results in a cardiac monitor which is readily portable and which provides the monitoring of a heart well into the "recovery" or post-coronary after an initial heart attack with such monitoring continuing for an extended period of time while the patient goes about his normal routine.

THE PROCESSING UNIT

As indicated in FIG. 2, PROCESSING UNIT 12 includes a conventional FM DETECTOR 54 which is adapted to receive the FM/FM carrier signal containing as information the analog EKG signal which is transmitted from SENSING AND TRANSMITTING UNIT 10. FM DETECTOR 54 operates to detect the FM/FM carrier and demodulate the FM subcarrier to obtain the analog EKG signal by principles well known in the art, for example, by using a phase lock loop to demodulate the subcarrier. Thus, the analog EKG signal is provided at the output of FM DETECTOR 54.

The analog EKG signal output from FM DETECTOR 54 is coupled to an ANALOG TO DIGITAL CONVERTER 56. Although the operation of ANALOG TO DIGITAL CONVERTER 56 will be explained in more detail hereinafter, this circuit provides, at the output thereof, a series of pulses corresponding to the components of the analog EKG signal. ANALOG TO DIGITAL CONVERTER 56 also provides an output signal which is coupled to an ARTIFACTS SENSOR AND INHIBIT CIRCUIT 58 which senses AC and DC artifacts, such as muscular noise, coughing, improper electrode interfaces and other dynamic artifacts such as loss of subcarrier, high level noise pulses, etc. to inhibit PROCESSING UNIT 12. Thus, ARTIFACTS SENSOR AND INHIBIT CIRCUIT 58 prevents artifact signals from being interpreted as cardiac abnormalities thereby eliminating false positives or false alarms in the cardiac monitor.

The pulse outputs from ANALOG TO DIGITAL CONVERTER 56 are coupled to a DELAY CIRCUIT 60 and to SYNCHRONIZING AND ENABLE CIRCUIT 62. DELAY CIRCUIT 60 is useful in obtaining various delay signals which are utilized to obtain the various INTERVALS responsive to the analog EKG signal while SYNCHRONIZING AND ENABLE CIRCUIT 62 is utilized to provide various signals useful in PROCESSING UNIT 12.

PROCESSING UNIT 12 also includes a CLOCK AND TIMING CIRCUIT 64 which is responsive to SYNCHRONIZING AND ENABLE CIRCUIT 62 and which is utilized to provide various clock pulses used to determine the time duration between the P,Q,R, S and T components of the analog EKG signal, that is, the clock pulses are used to determine the duration of the various heart INTERVALS.

PROCESSING UNIT 12 also includes a VARIABLE RATE T BLANKING CIRCUIT 66 which is utilized to provide a VARIABLE RATE T BLANKING SIGNAL useful in the present invention. By way of example, the VARIABLE RATE T BLANKING SIGNAL is utilized to obtain the P pulse corresponding to the atrial component of the analog EKG signal from the ANALOG TO DIGITAL CONVERTER output and is also utilized in establishing a PVC (premature ventricular contraction) ALARM signal.

The outputs from ANALOG TO DIGITAL CONVERTER 56, SYNCHRONIZING AND ENABLE CIRCUIT 62, CLOCK AND TIMING CIRCUIT 64 and VARIABLE RATE T BLANKING CIRCUIT 66 are coupled to various CARDIAC LOGIC PROCESSING CIRCUITS 68–78. The specific circuitry associated with the CARDIAC LOGIC PROCESSING CIRCUITS 68–78 and the interconnections between these circuits and the other circuits of PROCESSING UNIT 12 will be explained more fully hereinafter. However, by way of general description, R-R CARDIAC LOGIC PROCESSING CIRCUIT 68 provides a LONG R-R ALARM signal responsive to a ventricular bradycardia and a SHORT R-R ALARM signal responsive to a ventricular tachycardia. In a similar manner, QRS CARDIAC LOGIC PROCESSING CIRCUIT 70 provides a QRS ALARM signal which is responsive to a long ventricular contraction and PVC CARDIAC LOGIC PROCESSING CIRCUIT 72 senses premature ventricular contractions to provide a PVC ALARM signal. Likewise, P-P CARDIAC LOGIC PROCESSING CIRCUIT 74 is similar to R-R CARDIAC LOGIC PROCESSING CIRCUIT 68 and provides a LONG P-P ALARM signal when the cardiac monitor senses an atrial bradycardia and provides a SHORT P-P ALARM signal when the cardiac monitor senses an atrial tachycardia. P-R CARDIAC LOGIC PROCESSING CIRCUIT 76 provides a LONG P-R ALARM signal when the monitored-heart has a long P-R INTERVAL and is also utilized with JUNCTIONAL RHYTHM CARDIAC LOGIC PROCESSING CIRCUIT 78 to provide a JUNCTIONAL RHYTHM ALARM signal responsive to the occurrence of a predetermined number of short P-R INTERVALS. A JUNCTIONAL RHYTHM ALARM signal is also provided by JUNCTIONAL RHYTHM CARDIAC LOGIC PROCESSING CIRCUIT 78 responsive to a predetermined number of "missed" P pulses.

The various ALARM signals which are developed are utilized to actuate an AUDIBLE ALARM 80, coupled to the output of the various CARDIAC LOGIC PROCESSING CIRCUITS, to advise the patient or user of the cardiac monitor that the monitored-heart is undergoing an abnormality. The specific abnormality is identified by a plurality of INDICATORS which provide a visual indication of the cause of the ALARM.

The details, interconnections and operation of the circuits shown in FIG. 2 will now be explained in more detail.

THE ANALOG TO DIGITAL CONVERTER AND THE ARTIFACTS SENSOR AND INHIBIT CIRCUITS

Figure 3:
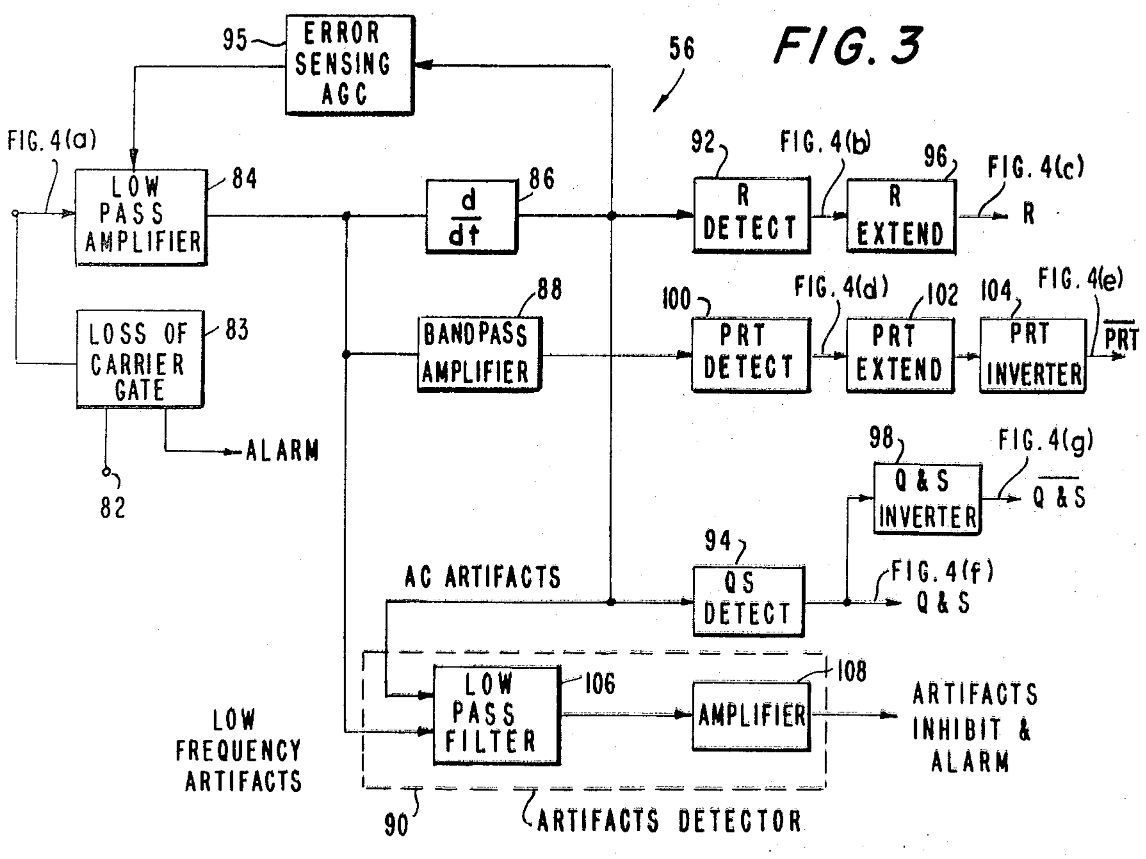
FIG. 3 is a block diagram of the ANALOG TO DIGITAL CONVERTER utilized in the present invention.
Figure 4:
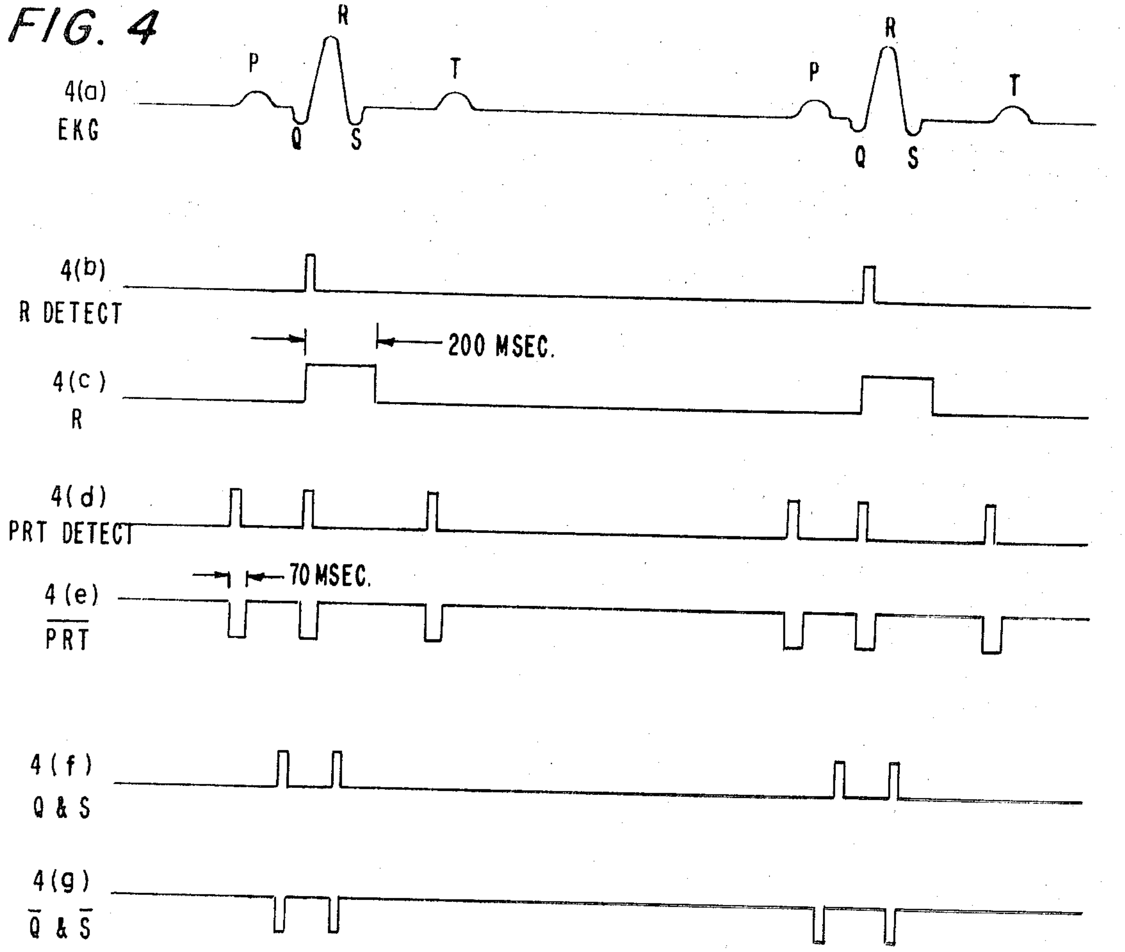
FIG. 4 is a graphical view showing various waveforms helpful in understanding the operation of the ANALOG TO DIGITAL CONVERTER of FIG. 3.

Referring to FIGS. 3 and 4 which illustrate ANALOG TO DIGITAL CONVERTER 56 and ARTIFACTS SENSOR AND INHIBIT CIRCUIT 58 and waveforms helpful in understanding the operation of the circuits, the input to ANALOG TO DIGITAL CONVERTER 56 is illustrated in FIG. 4 *a* and is an analog EKG signal having P,Q,R,S and T components. The analog EKG signal is applied to an INPUT TERMINAL 82 of ANALOG TO DIGITAL CONVERTER 56 from the output of FM DETECTOR 54. The analog EKG signal is then coupled to a LOW PASS AMPLIFIER 84 which amplifies the analog EKG signal in a manner well known in the art. By way of example, LOW PASS AMPLIFIER 84 may be chosen to pass signals having frequencies from approximately 1 to approximately 80 Hz. and may be chosen to have a gain of approximately 30. A LOSS OF SUBCARRIER gate 83 may be included and disposed between INPUT TERMINAL 82 and LOW PASS FILTER 84 to prevent the output from FM DETECTOR 54 from being coupled to ANALOG TO DIGITAL CONVERTER 56 when the information-containing subcarrier is lost, for example, due to a fault in SENSING AND TRANSMITTING UNIT 10, battery failure or the like. It is apparent that if a signal containing no cardiac information, but only noise, is processed in PROCESSING UNIT 12, a great likelihood that a false positive ALARM will be provided will result. Accordingly, LOSS OF SUBCARRIER gate 83 advantageously includes an amplifying and filtering circuit (not shown) which, when no subcarrier is present, actuates a switch, for example a FET (not shown), to prevent the information-free signal from DETECTOR 54 from being coupled to the ANALOG TO DIGITAL CONVERTER. LOSS OF SUBCARRIER gate 83 may also actuate a LOSS OF SUBCARRIER ALARM (not shown) to call to the patient's attention the cardiac monitor is not processing cardiac information.

The amplified analog EKG signal is coupled to a conventional DIFFERENTIATOR 86, a conventional BAND PASS AMPLIFIER 88 and an ARTIFACTS DETECTOR 90, the latter forming part of ARTIFACTS SENSOR AND INHIBIT CIRCUIT 58 (see FIG. 2).

DIFFERENTIATOR 86 differentiates the analog EKG signal thereby accentuating the Q,R and S components of this signal. This provides for more precise and easier detection of these components. Coupled to the output of DIFFERENTIATOR 86 is an R DETECT CIRCUIT 92, a QS DETECT CIRCUIT 94 and a AGC CIRCUIT 95. By way of example, R DETECT CIRCUIT 92 may be a conventional saturated amplifier or Schmitt trigger and is adapted to respond to positively going signals of a predetermined amplitude to provide an output pulse therefrom each time the amplitude is exceeded. In operation, R DETECT CIRCUIT 92 is chosen to provide an output pulse when the analog EKG' signal (the differentiated EKG signal) exceeds a threshold set slightly below the amplitude corresponding to the maximum slope of the R component of this signal. The output of R DETECT CIRCUIT 92 is illustrated in FIG. 4*b* and is a series of R DETECT pulses corresponding to the R component of the analog EKG signal. It is advantageous, however to provide a R refractory pulse (a pulse starting at the R component of the analog EKG signal but lasting 200 msec.) to prevent multiple R pulses from being sensed, for example, multiple R pulses due to extraneous and physiological reasons (for example, a "branch bundle block"). Accordingly, the output from R DETECT CIRCUIT 92 is coupled to an R EXTEND CIRCUIT 96 which provides a series of R pulses, as illustrated in FIG. 4*c*, which start at the R DETECT pulse of FIG. 4*b* but which extend for a predetermined time duration. By way of example R EXTEND CIRCUIT 96 is chosen such that the R pulses of FIG. 4*c* extend for approximately 200 msec.

In a similar manner, QS DETECT CIRCUIT 94 is responsive to the output of DIFFERENTIATOR 86 to provide a series of Q and S pulses responsive to the Q and S components of the analog EKG signal. More particularly, QS DETECT CIRCUIT 94, which may be a saturated amplifier or a Schmitt trigger, is responsive to the negatively going Q and S components of the analog EKG signal to provide a series of Q and S pulses, illustrated in FIG. 4*f*, which are utilized in PROCESSING UNIT 12 as will be explained in more detail hereinafter. The Q and S pulses are also coupled to an INVERTER 98 which provides an output as illustrated in FIG. 4(g). The output of INVERTER 98 is a series of Q and S pulses — thus, when the output of QS DETECT CIRCUIT 94 is "high" the output of INVERTER 98 is "low" and vice versa. As will be explained hereinafter, the Q and S pulses of FIG. 4(f) and the Q and S pulses of FIG. 4*g* are utilized in QRS CARDIAC LOGIC PROCESSING CIRCUIT 70.

The output from LOW PASS AMPLIFIER 84 is coupled to a BAND PASS AMPLIFIER 88 which is chosen to have a gain of approximately 5 and a pass band from approximately 20 to approximately 80 Hz. BAND PASS AMPLIFIER 88 passes and amplifies the PRT components of the analog EKG signal which are provided at the output of LOW PASS AMPLIFIER 84. The output from BAND PASS AMPLIFIER 88 is coupled to a PRT DETECT CIRCUIT 100, which may be a saturated amplifier or Schmitt trigger, and which provides a series of PRT DETECT pulses, illustrated in FIG. 4*d*, responsive to the P,R and T components of the analog EKG signal. Thus, PRT DETECT CIRCUIT 100 provides a pulse output when the analog EKG signal input thereto exceeds a predetermined amplitude. Such circuits, per se, are well known in the art.

As with the R DETECT pulses, it has been found advantageous to extend the PRT DETECT pulses from PRT DETECT CIRCUIT 100 and the output of PRT DETECT CIRCUIT 100 is coupled to a PRT EXTEND CIRCUIT 102. PRT EXTEND CIRCUIT 102 provides a series of PRT pulses which start, respectively, at the P,R and T components of the analog EKG signal (and the PRT DETECT pulses) but which have a predetermined time duration, for example, each pulse has a duration of approximately 70 msec. The output from PRT EXTEND CIRCUIT 102 is coupled to an INVERTER 104 which provides a series of PRT pulses illustrated in FIG. 4*e*. The PRT pulses go "low" for approximately 70 msec., corresponding to the P,R and T components of the analog EKG signal and, during the rest of the time, are "high."

The output from LOW PASS AMPLIFIER 84 and DIFFERENTIATOR 86 are coupled to ARTIFACTS DETECTOR 90 which includes a conventional LOW PASS FILTER 106 coupled to a conventional AMPLIFIER 108. The output from AMPLIFIER 108 is an ARTIFACTS INHIBIT AND ALARM signal which indicates that various artifacts have been sensed by the cardiac monitor. More particularly, the output from DIFFERENTIATOR 86 provides an AC ARTIFACTS signal caused, for example, by poor electrode interfaces, or the like, and this signal is passed by LOW PASS FILTER 106 and amplified by AMPLIFIER 108. Similarly, the output from LOW PASS AMPLIFIER 84 provides a LOW FREQUENCY ARTIFACTS signal caused, for example, by muscular noise, coughing or the like, and this signal, after being passed by LOW PASS FILTER 106 and amplified by AMPLIFIER 108, provides an output from ARTIFACTS DETECTOR 90. The ARTIFACTS INHIBIT AND ALARM signal may be utilized to actuate an alarm, calling to the patient's attention the fact that the cardiac monitor has sensed artifacts. This signal may also actuate circuitry in PROCESSING UNIT 12 which prevents this unit from processing cardiac information signals which, due to the presence of artifacts, may be sensed as a cardiac abnormality to produce a false positive, that is, the sensing of an abnormality when, in fact, the cardiac signal is "normal."

THE DELAY CIRCUIT

Figure 5:
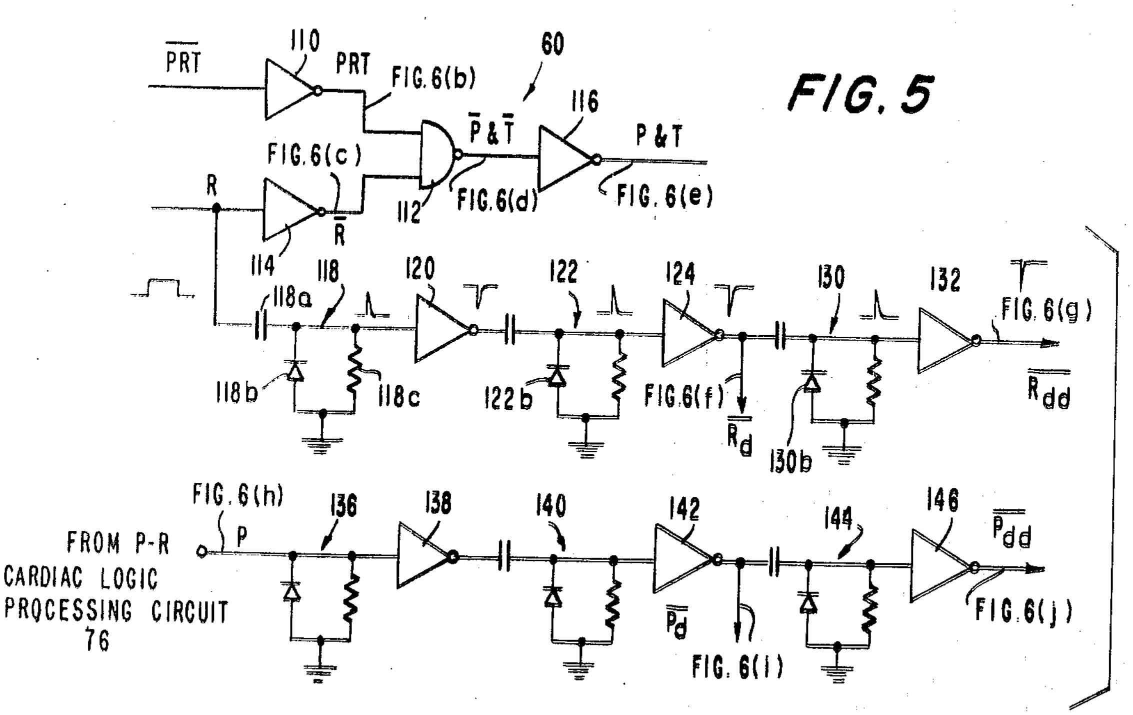
FIG. 5 is a circuit schematic showing the logic circuitry of the DELAY CIRCUIT of the present invention.

DELAY CIRCUIT 60 is utilized to obtain various delay signals useful in PROCESSING UNIT 12 of the cardiac monitor and also provides P & T pulses useful in the present invention. Referring particularly to FIG. 5, DELAY CIRCUIT 60 includes an INVERTER 110 having, as an input thereto, the PRT pulses derived from ANALOG TO DIGITAL CONVERTER 56. INVERTER 100 provides an output signal, illustrated in FIG. 6*b*, which is a series of PRT pulses with each pulse having a duration of approximately 70 msec. and starting, respectively, at the start of the P,R or T component of the analog EKG signal.

The PRT pulses are coupled as an input to a NAND gate 112. The other input to NAND gate 112 is a series of R pulses which are derived from the output of an INVERTER 114 which inverts the series of R pulses coupled to the INVERTER from ANALOG TO DIGITAL CONVERTER 56. Thus, each time the input to INVERTER 114 goes "high," the output thereof goes "low" and vice versa.

Figure 6:
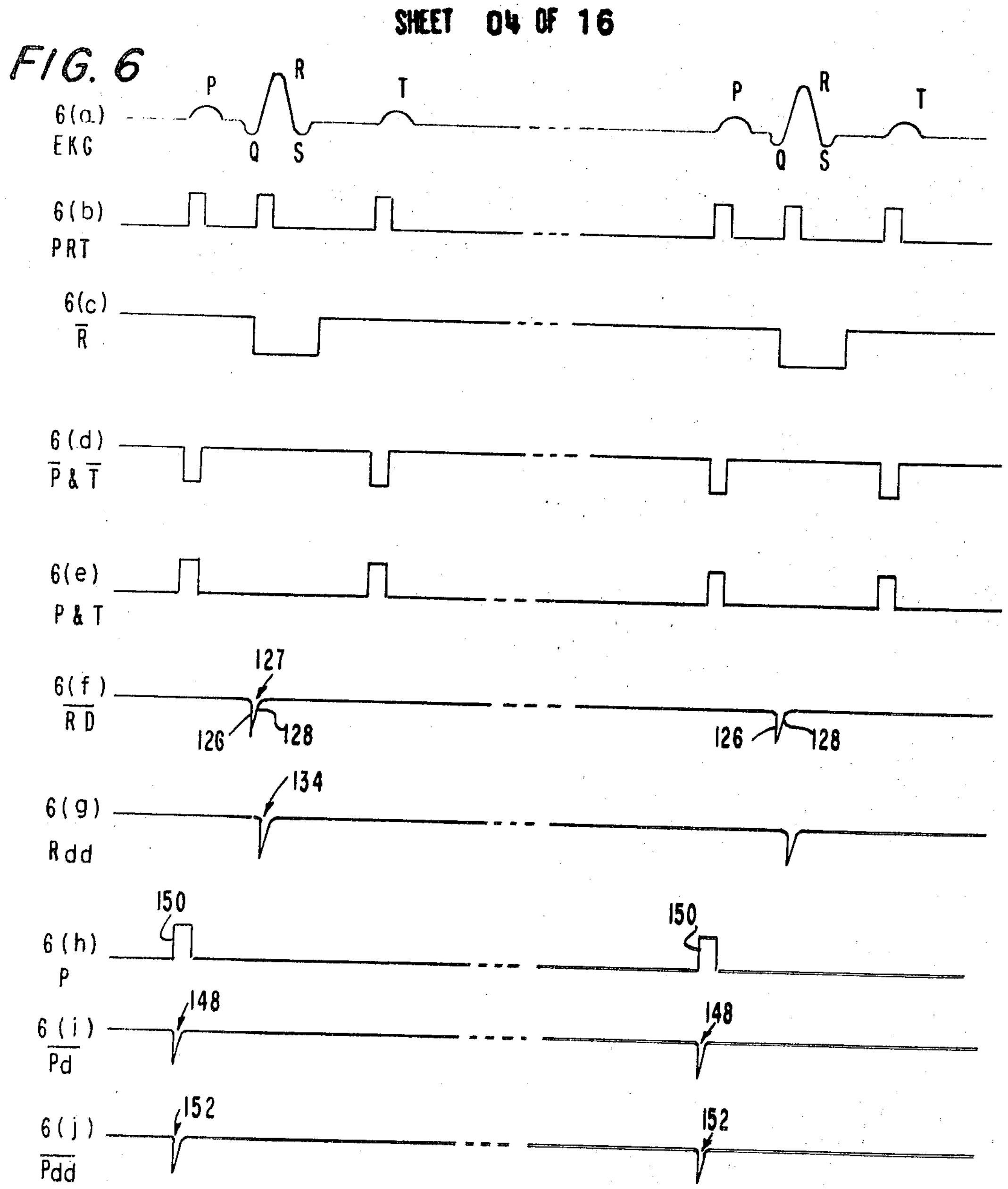
FIG. 6 is a graphical view of various waveforms helpful in understanding the operation of the DELAY CIRCUIT of FIG. 5.

The output of NAND gate 112 is illustrated in FIG. 6*d* and is a series P and T pulses which are coupled to an INVERTER 116. The INVERTER provides a series P & T pulses illustrated in FIG. 6*e*. Thus, the R input to NAND gate 112 "removes" the R pulse from the series of PRT pulses, leaving the series of P & T pulses.

The R pulse input to DELAY CIRCUIT 60 is also coupled to a DIFFERENTIATING NETWORK, generally designated 118, which includes a series connected capacitor 118*a* and a parallel connected diode and resistor 118*b* and 118*c*, respectively. Normally, the output from DIFFERENTIATING NETWORK 118 would be a series of positively and negatively going spikes corresponding, respectively, to the leading (or rising) edges of the R pulses and the trailing (or falling) edges of the R pulses. However, diode 118*b* acts to shunt the negatively going spikes to ground and, accordingly, the output from DIFFERENTIATING NETWORK 118 is a series of positively going spikes corresponding to the leading or rising edges of the R pulses. A typical spike is illustrated in FIG. 5 at the output of DIFFERENTIATING NETWORK 118. The output of DIFFERENTIATING NETWORK 118 is coupled to an INVERTER 120 which provides a series of spike signals one of which is shown in FIG. 5 at the output of the INVERTER. More particularly, the output from INVERTER 120 may be thought of as a series of spikes which go "low" at the rising or leading edge of the R pulse. Each spike includes a falling edge (going from "high" to "low") and a rising edge (going from "low" to "high").

The series of spike outputs from INVERTER 120 are coupled to a DIFFERENTIATING NETWORK 122 which differentiates the input spikes to provide a series of positively going spikes (see the output of DIFFERENTIATING NETWORK 122 in FIG. 5). These positively going spikes correspond to the differentiation of the rising edges of the input spikes. There is, however, no negatively going spikes corresponding to differentiation of the falling edges of the input spikes since a diode 122b, disposed within DIFFERENTIATING NETWORK 122, shunts to ground these negatively going spikes. Thus, the output of DIFFERENTIATING NETWORK 122 is a series of positively going spikes which correspond to the differention of the rising edges of the input spikes. After being coupled to an INVERTER 124, the output is illustrated in FIG. 6*f*. This is a series of $R_d$ pulses or spikes which go "low" for a short time. More particularly, a typical $R_d$ pulse or spike 127 includes a falling edge 126 and a rising edge 128. Spike 127 (and more particularly falling edge 126) occurs approximately 25 microseconds after the occurrence of the leading or rising edge of the R pulses. In other words, $R_d$ pulse spike 127 occurs approximately 25 microseconds after the R pulses illustrated in FIG. 6(c) go "low."

The $R_d$ pulses from INVERTER 124 is coupled to a DIFFERENTIATING NETWORK 130 which, in a similar manner to DIFFERENTIATING NETWORK 122, provides a series of positively going spikes which correspond to differentiation of the rising edge 126 of spike 127 shown in FIG. 6*f*. There is no negatively going spike, corresponding to differentiation of the falling edge 126 of spike 127, since DIFFERENTIATING NETWORK 130 includes a diode 130*b* which clamps the negatively going spikes to ground. Thus, the output from DIFFERENTIATING NETWORK 130 is a series of positively going spikes which are responsive to the differentiation of the rising edges of the input spikes applied thereto, for example, corresponding to differentiation of rising edges 128 in FIG. 6*f*. After being coupled to an INVERTER 132, the output is a series of $R_{dd}$ pulses or spikes illustrated in FIG. 6*g*. The $R_{dd}$ pulses or spikes occur, in time, approximately 25 microseconds after the occurrence of the $R_d$ pulses or spikes and, consequently, the $R_{dd}$ pulses or spikes occur approximately 50 microseconds after the leading or rising edges of the R pulses applied to DELAY CIRCUIT 60.

In a similar manner, a series of P pulses, corresponding to the atrial component of the analog EKG signal and illustrated in FIG. 6*h*, is coupled from P-R CARDIAC LOGIC PROCESSING CIRCUIT 76 to DELAY CIRCUIT 60. DELAY CIRCUIT 60 includes a DIFFERENTIATING NETWORK 136, an INVERTER 138, a DIFFERENTIATING NETWORK 140 and an INVERTER 142. In a like manner to the development of the $R_d$ pulses, the output of INVERTER 142 provides, as illustrated in FIG. 6*i*, a series of $P_d$ pulses or spikes go "low" approximately 25 microseconds after the occurrence of the leading or rising edge 150 of the P pulses. The $P_d$ pulses are then coupled to a DIFFERENTIATING NETWORK 144 and an INVERTER 146 to provide a series of $P_{dd}$ spikes or pulses, illustrated in FIG. 6(g), which go "low" approximately 25 microseconds after the $P_d$ spikes 148 and approximately 50 microseconds after the leading edge 150 of the P pulses. Of course, the various time from the leading edges of the R and P pulses are a function of the time constants of the various differentiating circuits and may be varied, if so desired.

It has been found advantageous to trigger the various delay signals, that is, the $P_d$, $R_d$, $P_{dd}$ and $R_{dd}$ pulses or spikes from the leading or rising edges of the R or P pulses. This is especially true in the case of R pulses since these pulses have a duration of approximately 200 msec. However, since the P pulses are somewhat "narrow", it is apparent that the $P_d$ and the $P_{dd}$ pulses may be triggered by the trailing edge of the P pulses, if so desired.

As will be explained in more detail hereinafter, the various delay signals developed in DELAY CIRCUIT 60 are utilized elsewhere in the cardiac monitor, as is the P & T developed pulses. For example, the various delays are utilized to establish various heart intervals while the P & T series of pulse are utilized in JUNCTIONAL RHYTHM CARDIAC LOGIC PROCESSING CIRCUIT 78.

THE SYNCHRONIZING AND ENABLE CIRCUIT

Referring now to the SYNCHRONIZING AND ENABLE CIRCUIT 62 shown in FIG. 7, this circuit is provided, as will be explained in more detail hereinafter, to provide an ENABLE signal and an ENABLE B signal, substantially identical to each other, which are utilized to synchronize and enable the various circuits which are included in PROCESSING UNIT 12. More particularly, the ENABLE B and the ENABLE signals synchronize and enable the various circuits after the cardiac monitor of the present invention has sensed a cardiac abnormality and has then been manually reset. Thus, these signals insure that PROCESSING UNIT 12 will be actuated upon the occurrence of the next R or ventricular pulse after the cardiac monitor has been reset.

SYNCHRONIZING AND ENABLE CIRCUIT 62 includes a NAND gate 154 having three inputs. One input to NAND gate 154 is provided from a TIME DELAY NETWORK, generally designated 155, which is provided to allow transient signals to die away when the power to the cardiac monitor is turned on. TIME DELAY NETWORK 155 includes a RESISTOR 156, coupled between NAND gate 154 and a power source (not shown) for the cardiac monitor, and a CAPACITOR 158, connected between the input to NAND gate 154 and ground. The RESISTOR and CAPACITOR thus provide a time delay allowing transients to die away when power to the cardiac monitor is switched on. After transients have died away, the input to NAND gate 154 from TIME DELAY NETWORK 155 goes "high."

The second input to NAND gate 154 is an input from MANUAL RESET NETWORK 160 which includes a MANUAL RESET BUTTON 160*a*. The input to NAND gate 154 from MANUAL RESET NETWORK 160 is normally "high" except, as will be explained hereinafter, when MANUAL RESET BUTTON 160a is actuated, which occurs after the cardiac monitor has sensed a cardiac abnormality to provide an ALARM signal. Actuation of MANUAL RESET BUTTON 160*a* causes the cardiac monitor of the present invention and, more particularly, PROCESSING UNIT 12 thereof, to start processing received analog EKG signals at the next R or ventricular pulse.

The third input to NAND gate 154 is the ENABLE signal illustrated in FIG. 8*d*. This signal is normally "high" until MANUAL RESET BUTTON 160*a* is actuated at which time the ENABLE signal goes "low." When the ENABLE signal goes "low," this causes CLOCK AND TIMING CIRCUIT 64 and the various CARDIAC LOGIC PROCESSING CIRCUITS OF PROCESSING UNIT 12 to be rendered "inoperative" until the cardiac monitor senses the next R pulse or ventricular beat or cycle. Once the next R pulse or ventricular beat or cycle is sensed, the ENABLE output goes "high" to synchronize and enable the various circuits in PROCESSING UNIT 12. The output from NAND gate 154 is an ENABLE signal, illustrated in FIG. 8*e*, which is coupled to an INVERTER 166 thereby providing an ENABLE B signal, illustrated in FIG. 8*g*. The ENABLE B signal is substantially identical to the ENABLE signal.

The output from NAND gate 154 is also coupled as one input to a NAND gate 162, the output of which is the ENABLE signal of FIG. 8*d*. The other input to NAND gate 162 is the series of R pulses shown in FIG. 8*c*. The R pulses are obtained by taking the R pulses, coupled from the output of ANALOG TO DIGITAL CONVERTER 56, and inverting these pulses in an INVERTER 164.

Figure 7:
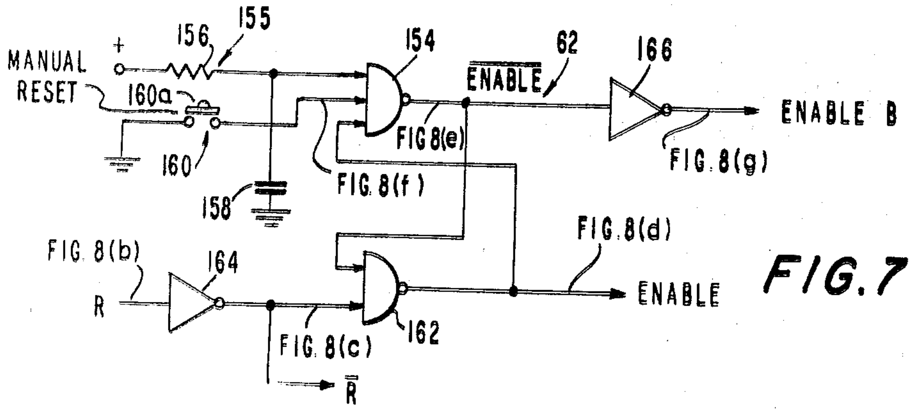
FIG. 7 is a circuit schematic showing the logic circuitry of the SYNCHRONIZING AND ENABLE CIRCUIT of the present invention.
Figure 8:
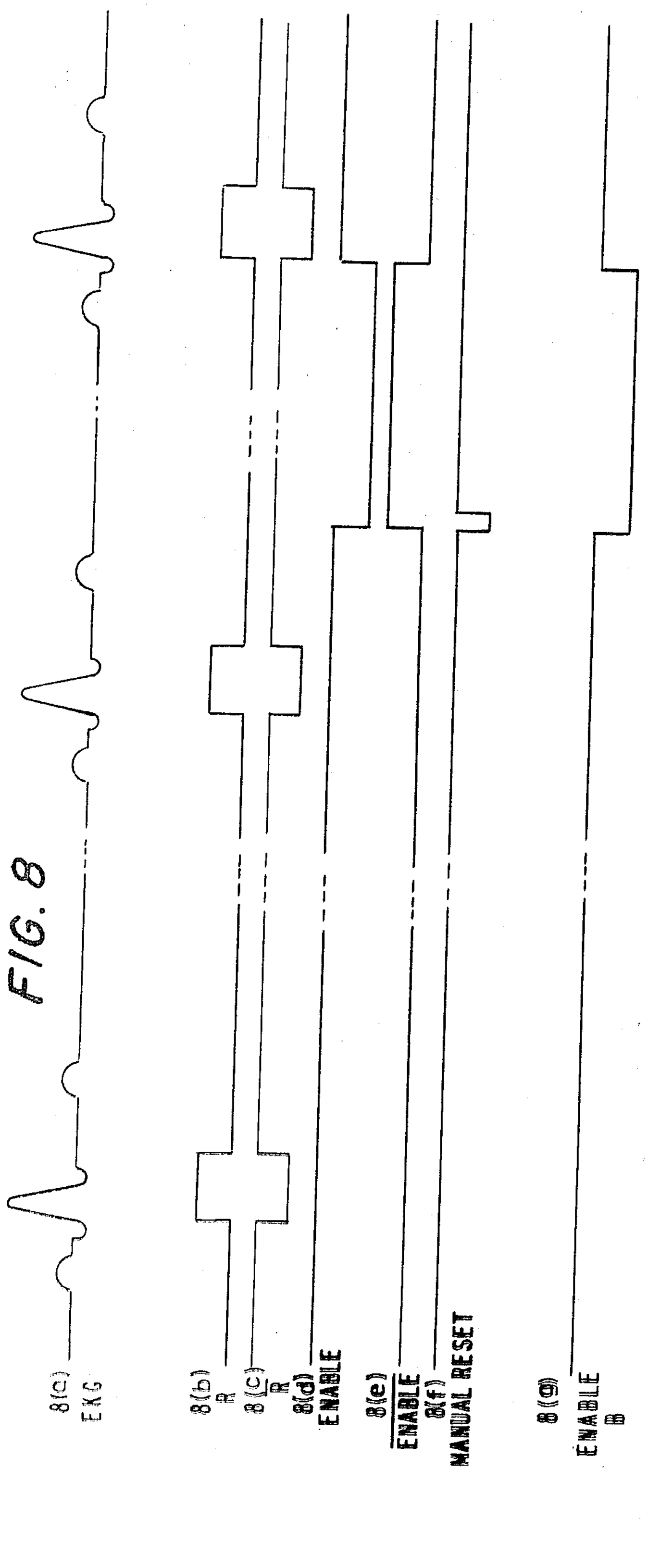
FIG. 8 is a graphical view illustrating various waveforms helpful in understanding the operation of the SYNCHRONIZING AND ENABLE CIRCUIT of FIG. 7.

The operation of SYNCHRONIZING AND ENABLE CIRCUIT 62 may be understood with reference to FIGS. 7 and 8. More particularly, the purpose of synchronizing and ENABLE CIRCUIT 62 is to provide ENABLE B and ENABLE output signals which are "high" until the actuation of MANUAL RESET BUTTON 160*a*, at which time the ENABLE B and the ENABLE signals go "low." These signals stay "low" until the occurrence of the next R pulse or ventricular beat or cycle. Thus, SYNCHRONIZING AND ENABLE CIRCUIT 62 (and particularly NAND gates 154, 162) act as a "latch" circuit.

More particularly, assuming all transients have died away so that the input from TIME DELAY CIRCUIT 155 is "high," the input from MANUAL RESET NETWORK 160 to NAND gate 154 is "high" (see FIG. 8*f*) and the input to this gate from the ENABLE output of NAND gate 162 is also "high." Consequently, the ENABLE output of NAND gate 154 is "low" (see FIG. 8(e)). Since the ENABLE signal is coupled to NAND gate 162 and assuming the R input to NAND gate 162 is "high" (see FIG. 8*c*), the ENABLE signal output from NAND gate 162 goes "high" (see FIG. 8*d*). As the next R pulse is received from ANALOG TO DIGITAL CONVERTER 56, the R input to NAND gate 162 goes "low." However, this has no effect on the output of gate 162, the output remains "high" since both inputs to NAND gate 162 are "low." Similarly, the R pulse has, under these circumstances, no effect on NAND gate 154.

After the occurrence of an ALARM signal, it is desirable to reset the CARDIAC LOGIC PROCESSING CIRCUITS and to synchronize the cardiac monitor. After the occurrence of an ALARM signal, MANUAL RESET BUTTON 160*a* is momentarily actuated and, as indicated in FIG. 8*f*, this causes the input from MANUAL RESET NETWORK 160 to NAND gate 154 to momentarily go "low" which, in turn, causes the output of NAND gate 154 to go "high." In other words, the ENABLE output from NAND gate 154 goes "high". Assuming MANUAL RESET BUTTON 160*a* is actuated between the occurrence of R pulses, the ENABLE signal going "high" causes the output from NAND gate 162 to go "low." In other words, the ENABLE signal of FIG. 8*b* goes "low."

Although the MANUAL RESET NETWORK 160 input to NAND gate 154 shortly thereafter goes "high," the output from NAND gate 154 will remain "high" since the ENABLE input to this gate is now "low". Thus, both the ENABLE signal of FIG. 8*d* and the ENABLE B signal of FIG. 8*g* go "low" upon actuation of MANUAL RESET BUTTON 160*a*.

The ENABLE (and the ENABLE B) signals stay "low" until the next R pulse is received by SYNCHRONIZING AND ENABLE CIRCUIT 62. This causes the R input to NAND gate 162 to go "low" which, in turn, causes the output from NAND gate 162 (the ENABLE signal) to go "high." Since this signal is also coupled as an input to NAND gate 154, this causes the ENABLE output from NAND gate 154 to go "low" and the ENABLE B signal is caused to go "high." The ENABLE signal and the ENABLE B signal remain "high" until the next time MANUAL RESET BUTTON 160*a* is actuated.

THE CLOCK AND TIMING CIRCUIT

Figure 9:
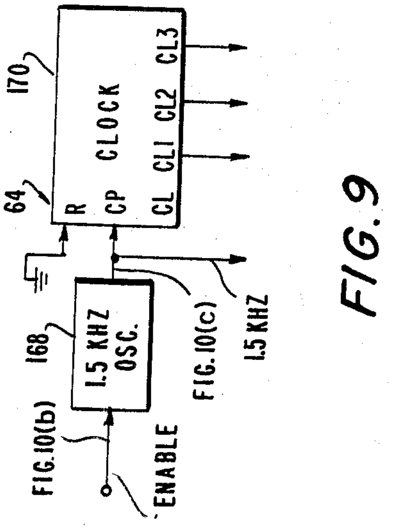
FIG. 9 is a block diagram of the CLOCK AND TIMING CIRCUIT of the present invention.

The CLOCK AND TIMING CIRCUIT 64, illustrated in FIG. 9, is provided to supply various clock pulses, CL1, CL2 and CL3, and is utilized to supply a 1.5 Khz. signal. The clock pulses are utilized in PROCESSING UNIT 12 to measure the time duration between the various interbeat and intrabeat components of the EKG signal. In other words, these signals are utilized in the various CARDIAC LOGIC PROCESSING CIRCUITS to measure the heart intervals developed in the monitor.

Figure 10:
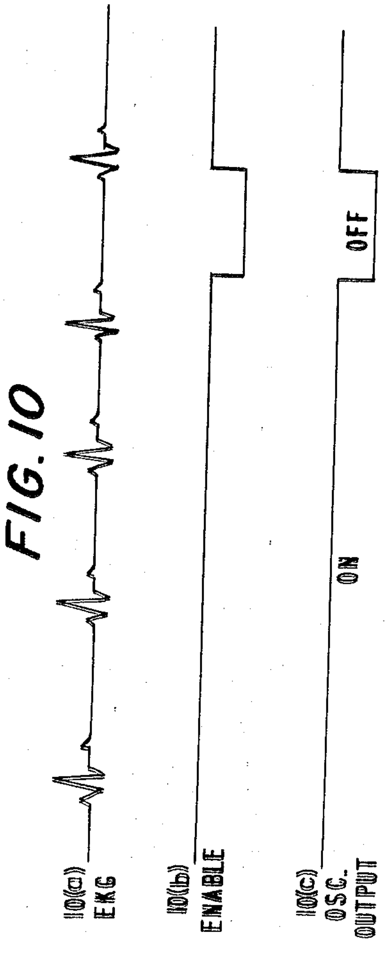
FIG. 10 is a graphical view of waveforms helpful in understanding the operation of the CLOCK AND TIMING CIRCUIT of FIG. 9.

CLOCK AND TIMING CIRCUIT 64 includes a conventional MASTER OSCILLATOR 168 which provides an output signal having a predetermined frequency, for example, 1.5 Khz. MASTER OSCILLATOR 168 is responsive to the ENABLE signal, which is applied as the input of the MASTER OSCILLATOR coupled from SYNCHRONIZING AND ENABLE CIRCUIT 62. When the ENABLE signal, illustrated in FIG. 10*b*, is "high," MASTER OSCILLATOR 168 is rendered in an operative or ON condition. This is shown diagramatically in FIG. 10*c*. On the other hand, when the ENABLE signal input to the MASTER OSCILLATOR is "low", the oscillator is rendered inoperative or OFF. Since the ENABLE signal starts at the first R pulse or ventricular beat or cycle occurring after actuation of MANUAL RESET BUTTON 160*a*, it is apparent that MASTER OSCILLATOR 168 is synchronized to the series of R pulses, that is, MASTER OSCILLATOR 168 starts with the occurrence of the R pulse and, in the case where an ALARM signal has occurred and MANUAL RESET BUTTON 160*a* actuated, MASTER OSCILLATOR 168 will not provide a 1.5 Khz. output signal until the next R pulse is sensed.

The 1.5 Khz. signal output from MASTER OSCILLATOR 168 is coupled to the various CARDIAC LOGIC PROCESSING CIRCUIT 68–78 and is utilized to actuate various ALARM INDICATORS when an ALARM signal is provided. The 1.5 Khz. signal is also coupled to a conventional CLOCK 170 which, responsive to the 1.5 Khz. input signal thereto, provides various clock pulses CL1, CL2 and CL3 which are utilized to measure the heart intervals.

If the output from MASTER OSCILLATOR 168 is a series of pulses of a frequency 1.5 Khz. (and period of 0.666 msec.), then the CL1 clock pulse output from CLOCK 170 is a series of pulses having a period twice that of the period of the input signal, that is, 1.332 msec.; the CL2 pulse output is a series of pulses having a period four times that of the input signal and twice that of the CL1 signal, that is, 2.664 msec.; and, the CL3 pulse output is a series of pulses having a period 8 times that of the input signal and twice that of the CL2 signal, that is, 5.328 msec. of course, if the frequencey of the output signal from MASTER OSCILLATOR 168 is chosen to be other than 1.5 Khz., the frequency of the CL1, CL2 and CL3 clock pulses will also change in a corresponding manner.

THE VARIABLE RATE T BLANKING CIRCUIT

Figure 11:
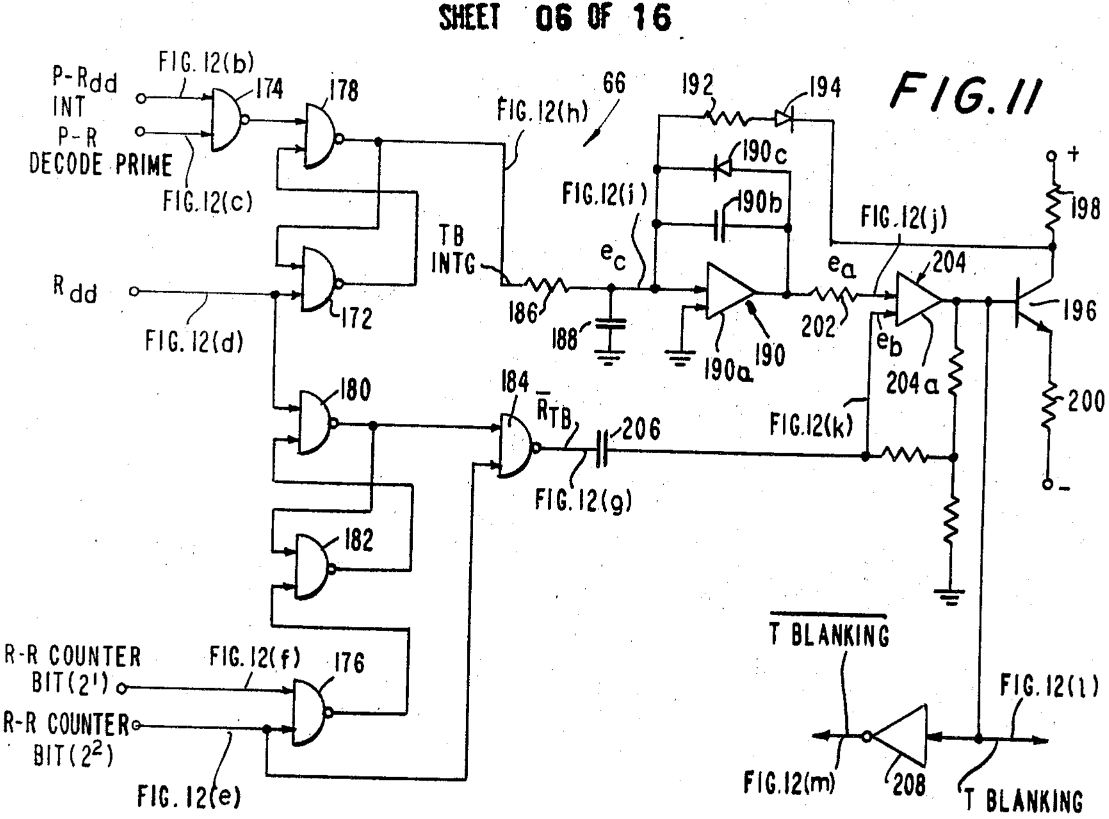
FIG. 11 is a circuit schematic of the logic circuitry of the VARIABLE RATE T BLANKING CIRCUIT of the present invention.

PROCESSING UNIT 12 includes a VARIABLE RATE T BLANKING CIRCUIT 66, shown in FIG. 11, which provides a VARIABLE RATE T BLANKING signal used frequently in PROCESSING UNIT 12. For example, and as will be explained in more detail, the VARIABLE RATE T BLANKING signal is utilized to "eliminate" the T pulse from the P & T series of pulses. Thus, the T BLANKING signal is used to obtain the P or atrial pulse. That the VARIABLE RATE T BLANKING signal must be "rate variable" may be appreciated by considering a fixed rate T BLANKING signal. If the T BLANKING signal is fixed in rate and the EKG signal occurs frequently or rapidly, it is possible that the fixed rate T BLANKING signal would also eliminate the next P pulse in the P & T series of pulses. This would be highly undesirable in that the cardiac monitor would not sense a P component of the analog EKG signal when, in fact, such a signal had occurred.

As indicated in FIG. 11, various input signals are coupled to VARIABLE RATE T BLANKING CIRCUIT 66 in order to provide a T BLANKING and a T BLANKING signal at the output thereof. More particularly, one input is the series of $R_{dd}$ pulses which are coupled to the VARIABLE RATE T BLANKING CIRCUIT from the output of DELAY CIRCUIT 60. The $R_{dd}$ pulses are coupled as one input to a NAND gate 172. Also coupled as an input to VARIABLE RATE T BLANKING CIRCUIT 66 is a P-$R_{dd}$ INTERVAL signal and a P-R DECODE PRIME signal which are coupled, respectively, as inputs to the VARIABLE RATE T BLANKING CIRCUIT from P-R CARDIAC LOGIC PROCESSING CIRCUIT 76. These signals are coupled to a NAND gate 174. The two other inputs to VARIABLE RATE T BLANKING CIRCUIT 66 is a R-R COUNTER BIT ($2^1$) signal and a R-R COUNTER BIT ($2^2$) signal, both of which are derived from the output of R-R CARDIAC LOGIC PROCESSING CIRCUIT 68. Both of these signals are coupled to a NAND gate 176.

The output of NAND gate 174 is coupled as one input to a NAND gate 178. The other input to NAND gate 178 is provided from the output of NAND gate 172 which, in turn, includes as one input thereto, the output from NAND gate 178. Thus, NAND gates 172 and 178 are connected in a "latch" configuration.

The output of NAND gate 178 is a TB INTG signal which is a series of pulses, of fixed duration, occurring variably in time, that is, a series of uniform pulses whose repetition rate varies. As will be explained in more detail, the repetition rate varies as a function of the ventricular rate of the EKG signal.

The $R_{dd}$ signal is also coupled to a NAND gate 180, the output of which is connected to a NAND gate 182. The other input to NAND gate 182 is provided from the output of NAND gate 176. The output from NAND gate 182 is coupled as an input to NAND gate 180. Thus, NAND gates 180 and 182 are connected in a "latch" configuration.

The output from NAND gate 180 and the R-R COUNTER BIT ($2^2$) signal are coupled as respective inputs to a NAND gate 184. The output of NAND gate 184 is an $R_{TB}$ signal, the function of which will become apparent as the operation of VARIABLE RATE T BLANKING CIRCUIT 66 is explained.

The TB INTG signal from NAND gate 178 is coupled to a RESISTOR 186 and a CAPACITOR 188 to provide an output signal designated, $e_c$. The $e_c$ signal is coupled to a "leaky" INTEGRATOR, generally designated 190, which includes an operational amplifier 190*a* having a feedback path including a capacitor 190*b* and a diode 190*c*. The $e_c$ signal is also coupled, via a RESISTOR 192 and a CAPACITOR 194, to the collector of a TRANSISTOR 196. The 9 cllector of TRANSISTOR 196 is connected, via a RESISTOR 198, to a source of positive potential. Another RESISTOR 200 couples the emitter electrode of TRANSISTOR 196 to a source of negative potential.

The output from "leaky" INTEGRATOR 190 is coupled, via a RESISTOR 202, to the input of a COMPARATOR, generally designated 204. COMPARATOR 204 includes an operational amplifier 204*a* having two inputs. One input is a $e_a$ signal derived from the output of the "leaky" integrator and the other input is the $e_b$ signal derived from the output of a CAPACITOR 206, the input to which is the $R_{TB}$ signal output from NAND gate 184. The output from COMPARATOR 204, coupled to the base of TRANSISTOR 196, is the T BLANKING SIGNAL. This signal is also coupled to an INVERTER 208 to provide the T BLANKING signal.

The operation of the VARIABLE RATE T BLANKING CIRCUIT 66 will now be explained. It will be recalled that the purpose of VARIABLE RATE T BLANKING CIRCUIT 66 is to provide a T BLANKING signal utilized, among other purposes, to "eliminate" the T pulse signal from the series of P & T pulses, that is, to obtain the P or atrial pulse. Accordingly, the T BLANKING signal must be rate variable so that this signal will also not "eliminate" the next P pulse, if the EKG signal occurs frequently in time — that is, if the monitored-heart has a rapid heartbeat.

Figure 12:
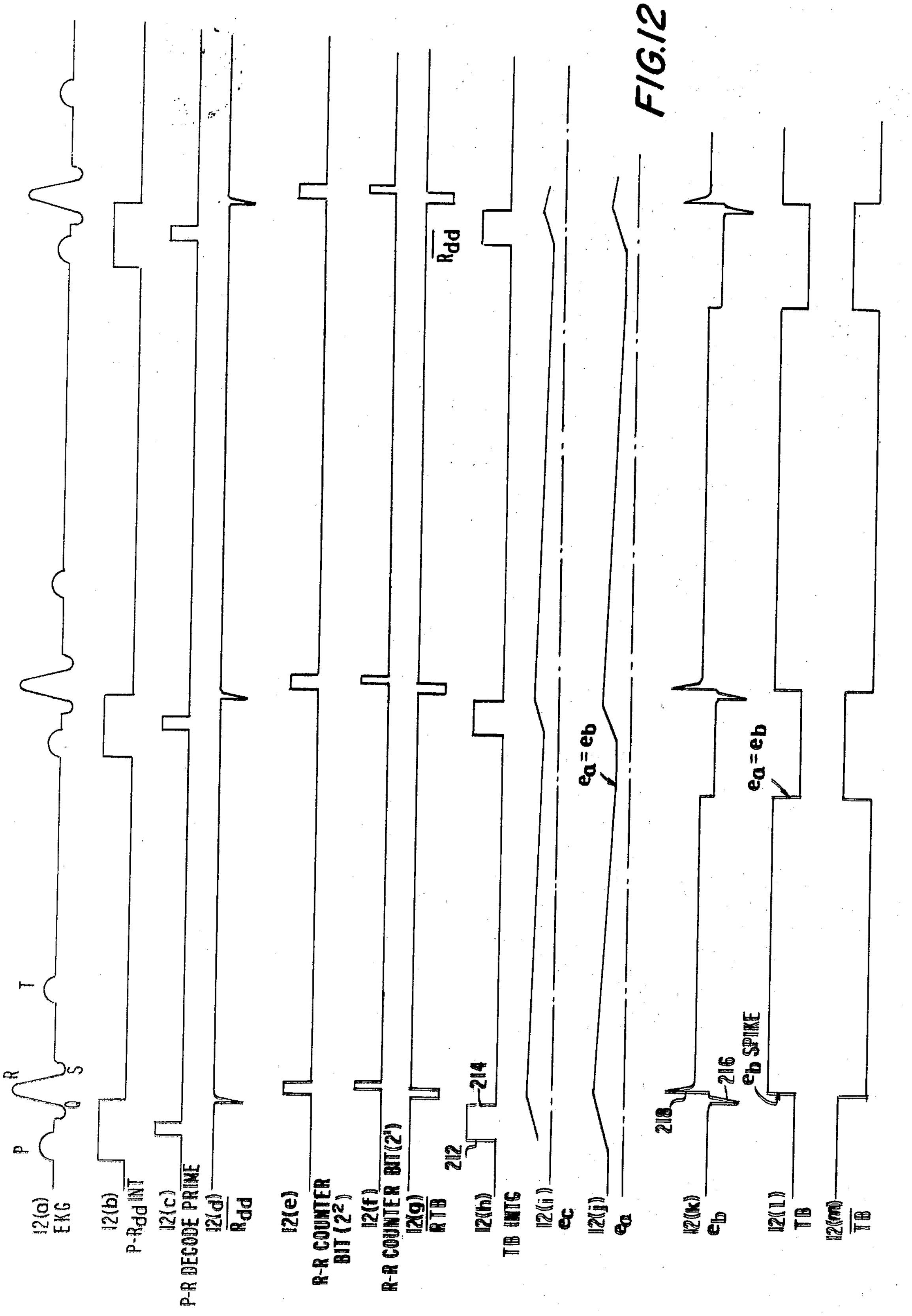
FIG. 12 is a graphical view showing waveforms helpful in understanding the operation of the VARIABLE RATE T BLANKING CIRCUIT of FIG. 11.

In order to provide the T BLANKING signal, VARIABLE RATE T BLANKING CIRCUIT 66 develops a TB INTG signal which is illustrated in FIG. 12*h*. This signal, which is provided at the output of NAND gate 178, is a series of pulses of uniform width but which occur at a variable rate, the rate being a function of the ventricular or R component of the EKG signal. The starting or leading edge 212 of the TB INTG pulse is generated by the coincidence of the P-$R_{dd}$ INTERVAL and the P-R DECODE PRIME signals applied to NAND gate 174. It will be appreciated that NAND gates 172 and 178 function as a "one shot" multivibrator or latch which provides the TB INTG signal output when the "one shot" is triggered. Thus, the "one shot" is triggered upon coincidence of the P-$R_{dd}$ INTERVAL signal and the P-DECODE PRIME signal illustrated, respectively, in FIGS. 12*b* and 12*c*.

As will be explained in more detail, the P-$R_{dd}$ INTERVAL signal of FIG. 12*b* starts or goes "high" at the P pulse or atrial component of the EKG signal and stays "high" until the $R_{dd}$ signal occurs. The R-R DECODE PRIME signal of FIG. 12*c* occurs a predetermined time after the start of the P-$R_{dd}$ INTERVAL signal of FIG. 12*b*. As will be explained in more detail, the P-R DECODE PRIME signal occurs approximately 16 CL2 clock pulses after the start of the P-$R_{dd}$ INTERVAL signal, that is, approximately 16 CL2 clock pulses after the P pulse or atrial component of the EKG signal.

Coincidence of the P-$R_{dd}$ INTERVAL signal and the P-R DECODE PRIME signal triggers the "one shot" to start the TB INTG signal. The TB INTG signal is terminated when the "one shot" is triggered by the $R_{dd}$ signal input to NAND gate 172. Thus, the trailing edge 214 of the TB INTG signal is responsive to the occurrence of the $R_{dd}$ signal illustrated in FIG. 12*d*.

The TB INTG signal output is coupled to RESISTOR 186 and CAPACITOR 188 to provide signal $e_c$ (see FIG. 12(i) at the output thereof. During the occurrence of TB INTG signal, CAPACITOR 188 is charged and signal $e_c$ rises. However, between the TB INTG pulses, the capacitor discharges and, as a result thereof, signal $e_c$ decays until the start of the next TB INTG pulse.

The $e_c$ signal of FIG. 12(i) is coupled to "leaky" INTEGRATOR 190, the output of which is the $e_a$ signal of FIG. 12*j* which is coupled as one input to COMPARATOR 204. Reference to FIG. 12*j* indicates that the $e_a$ signal is a positive signal having a voltage, at least during the T BLANKING signal, which is greater than the voltage of signal $e_b$ illustrated in FIG. 12*k*. It will be further observed that the $e_a$ signal charges up or rises during the TB INTG signal and, between the TB INTG signal, the $e_a$ signal decays since capacitor 190*b* "leaks" off through a path including RESISTOR 192 and DIODE 194.

When the $e_a$ signal is greater than the $e_b$ signal, the output from COMPARATOR 204 is "high" and TRANSISTOR 196 is forward biased. However, when the $e_a$ signal of FIG. 12*j* equals the $e_b$ signal of FIG. 12*k*, the T BLANKING signal of FIG. 12*l* is terminated due to the fact that the output from COMPARATOR 204 goes "low" and TRANSISTOR 196 is no longer forward biased. Thus, the VARIABLE RATE T BLANKING signal terminates when $e_a = e_b$.

Having described how the VARIABLE RATE T BLANKING signal of FIG. 12*l* is terminated, the initiation of this signal will now be explained. More particularly, the T BLANKING signal is initiated by the development of an $R_{TB}$ signal, illustrated in FIG. 12*g*, and provided at the output of NAND gate 184. The generation of the $R_{TB}$ signal may be understood by considering FIGS. 12*d*, 12*e*, 12*f*, and 12*g*. More particularly, the $R_{dd}$ spike input to NAND gate 180, illustrated in FIG. 12*d*, causes the output of NAND gate 180 to go "high". Since the $R_{dd}$ "low" going spike occurs approximately 25 microseconds after the start of the R pulse, NAND gate 180 will go "high" at that time causing this input to NAND gate 184 to go "high." Approximately 20 msec. after the R pulse, an R-R COUNTER BIT ($2^2$) pulse FIG. 12(e)), provided from R-R CARDIAC LOGIC PROCESSING CIRCUIT 68, is applied as the other input to NAND gate 184. Since both inputs to NAND gate 184 are now "high", the output of this gate goes "low". Thus, the $R_{TB}$ signal, illustrated in FIG. 12*g*, goes "low".

The $R_{TB}$ output from NAND gate 184 stays "low" until an R-R COUNTER BIT ($2^1$) pulse is received at the input of NAND gate 176. This occurs approximately 30 msec. after the occurrence of the R pulse. This signal (see FIG. 12*f*) is coupled, via NAND gates 176 and 182, to the input of NAND gate 180 and causes the output of NAND gate 180 to go "low." Once NAND gate 180 goes "low", the output of NAND gate 184 goes "high." Thus, the output of NAND gate 184 provides the $R_{TB}$ signal. The $R_{TB}$ signal going "low" approximately 20 msec. after the start of the R pulse and going "high" approximately 30 msec. after the start of the R pulse.

Having explained the development of the $R_{TB}$ signal, the use of this signal to turn on the T BLANKING signal will now become clear. More particularly, the $R_{TB}$ signal output is utilized to control CAPACITOR 206, that is, when $R_{TB}$ is "low" CAPACITOR 206 discharges and the $e_b$ signal coupled to CAPACITOR 206 goes negative, as indicated by negatively going spike 216 of FIG. 12*a*. During the time that $R_{TB}$ is "low," the $e_b$ signal returns to zero. When the $R_{TB}$ output goes "high," CAPACITOR 206 discharges in a positively going direction causing the $e_b$ signal to go positive, as indicated by the positively going spike 218. Thus, the $e_b$ signal is proportional to the rate differential of $R_{TB}$.

The positively going spike 218 biases TRANSISTOR 196 "on," resulting in the initiation of the T BLANKING signal illustrated in FIG. 12(l). The $e_b$ signal then decays, but is kept at a positive voltage or value while TRANSISTOR 196 is "on," that is, during the T BLANKING signal. The T BLANKING signal lasts until TRANSISTOR 196 is turned "off," which occurs when the $e_a$ signal decays to a value equal to the $e_b$ signal.

Thus, the T BLANKING signal, illustrated in FIG. 12*l*, is a signal which is rate variable, the signal starting approximately 30 msec. after the R pulse and lasting for a time which is a function of the decay of the $e_a$ signal. However, since the decay of the $e_a$ signal is a function of the $e_c$ signal which, in turn, is a function of the TB INTG signal, the latter being a function of ventricular rate, it is appreciated that the T BLANKING signal of FIG. 12*l* is rate variable with a rate depending on the R pulse or ventricular component of the monitored heart.

The T BLANKING signal of FIG. 12*l* and the T BLANKING signal of FIG. 12*m*, the latter being obtained by passing the T BLANKING signal into an INVERTER 208, are both utilized in PROCESSING UNIT 12 as will be explained hereinafter.

THE QRS CARDIAC LOGIC PROCESSING CIRCUIT

Figure 15:
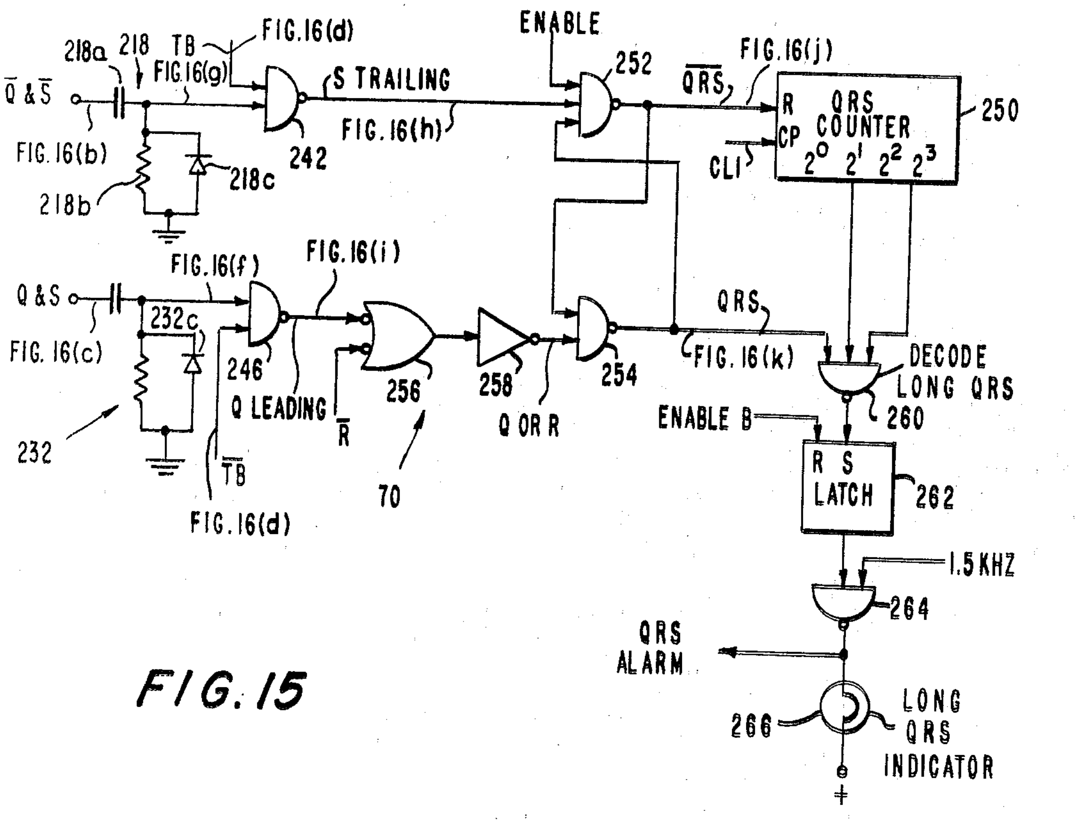
FIG. 15 is a circuit schematic showing the logic circuitry of the QRS CARDIAC LOGIC PROCESSING CIRCUIT of the present invention.

QRS CARDIAC LOGIC PROCESSING CIRCUIT 70 is illustrated in FIG. 15. As indicated hereinbefore, the function of QRS CARDIAC LOGIC PROCESSING CIRCUIT 70 is to provide a LONG QRS ALARM signal if the QRS component of the analog EKG signal exceeds a predetermined time duration. As will now be explained, this is an intrabeat heart or cardiac rhythm condition and a LONG QRS ALARM signal is provided if the QRS INTERVAL is equal to or greater than 0.12 seconds.

As indicated in FIG. 15, the Q and S series of pulses and the Q and S series of pulses, both of which are derived in ANALOG TO DIGITAL CONVERTER 56, are coupled as inputs to QRS CARDIAC LOGIC PROCESSING CIRCUIT 70. Referring to FIGS. 16*a*–16*c*, the Q and S pulses occur, respectively, at the Q and the S components of the analog EKG signal while the Q and S pulses go "low" during this time.

The Q and S pulses are coupled to a DIFFERENTIATING NETWORK 218 which includes a capacitor 218*a*, and a parallel connected resistor 218*b* and diode 218*c*, the diode being such as to shunt negatively going signals to ground. More particularly, DIFFERENTIATING NETWORK 218 operates in a manner similar to the DIFFERENTIATING NETWORKS of DELAY CIRCUIT 60 to differentiate the Q and S pulses applied thereto to provide, as illustrated in FIG. 16*g*, a series of positively going spikes 220 and 222 which correspond, respectively, to the rising edge 224 of the Q pulse and to the rising edge 226 of the S pulse. The polarity of diode 218c shunts to ground the negatively going spikes (not shown) which would otherwise result from the falling edges 228 and 230 of the input pulses applied thereto.

Figure 16:
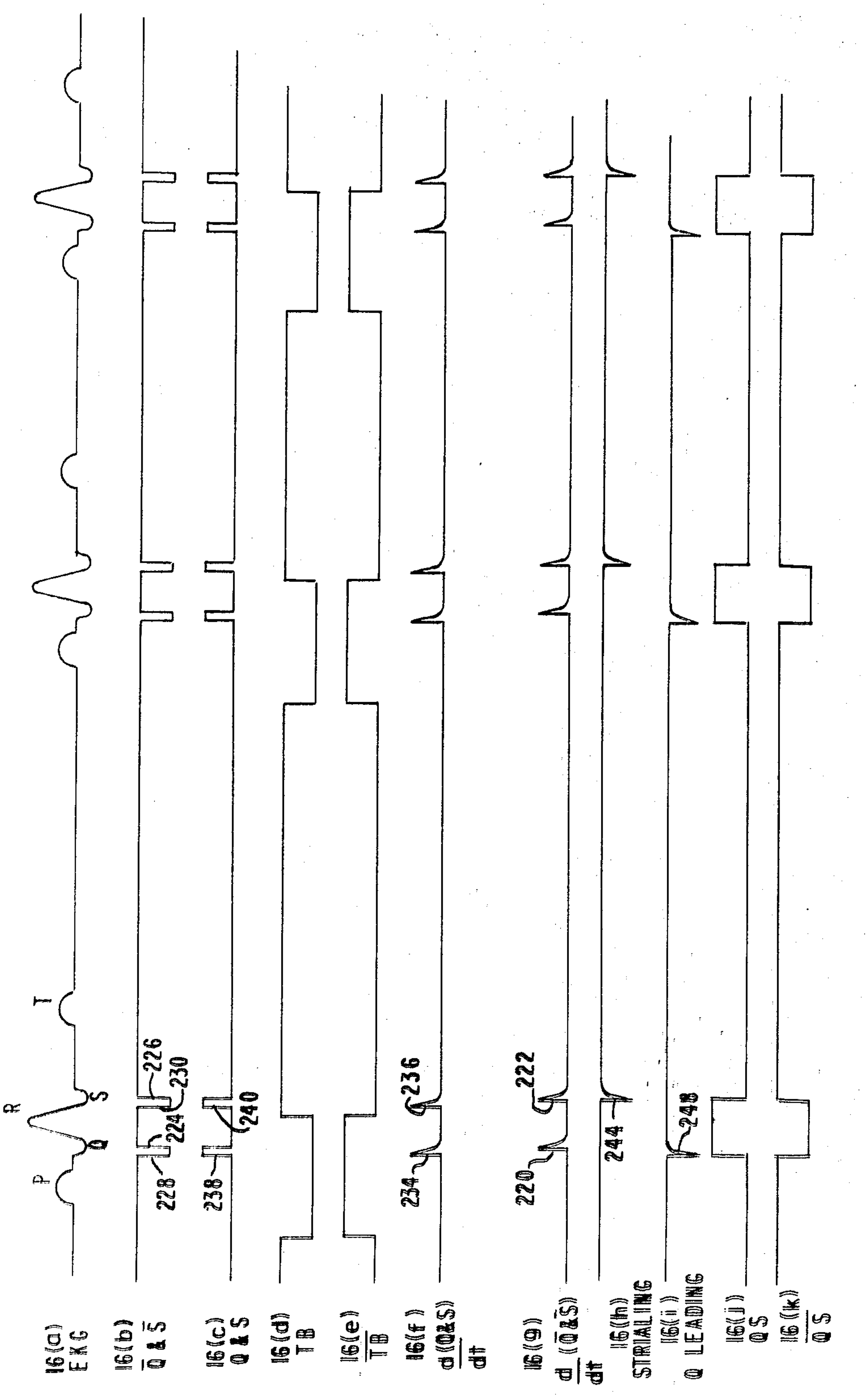
FIG. 16 is a graphical view of various waveforms helpful in understanding the operation of the QRS CARDIAC LOGIC PROCESSING CIRCUIT of FIG. 15.

In a similar manner, the Q and S pulses, shown in FIG. 16(*c*), are coupled to a DIFFERENTIATING NETWORK 232 which provides a series of positively going spikes 234 and 236 (see FIG. 16*f*) which correspond, respectively, to the rising edges 238 and 240 of the Q and S pulses. The negatively going spikes (not shown), corresponding to the falling edges of the Q and S pulses, are shunted to ground by a diode 232*c*.

The output from DIFFERENTIATING NETWORK 218 is coupled as one input to a NAND gate 242. The other input to NAND gate 242 is the T BLANKING signal (see FIG. 16*d*) which is derived from VARIABLE RATE T BLANKING CIRCUIT 66. The purpose of NAND gate 242 is to develop an S TRAILING spike which is illustrated in FIG. 16*h*.

As indicated by reference to FIGS. 16*g* and 16*h*, the "low" going S TRAILING spike 244 corresponds to the positively going or "high" spike 222 of FIG. 16*g*. Accordingly, S TRAILING spike 244 is obtained by "removing" the positively going spike 220 from the series of spikes illustrated in FIG. 16*g* and inverting the output. This is accomplished in NAND gate 242. More particularly, NAND gate 242 develops the S TRAILING spike 244 since the output of this gate goes "low" upon coincidence of either of the spike signals 220, 222 of FIG. 16*g* with the T BLANKING signal of FIG. 16*d*, that is, when both of the inputs to the gate are "high" the gate output goes "low." However, since the T BLANKING signal goes "high" after spike 220, the T BLANKING signal effectively "removes" spike 220 from spike 222 and the output from NAND gate 242 goes "low" upon the coincidence of the T BLANKING signal and spike 222. Thus, S TRAILING spike 244 is provided at the output of NAND gate 242 and this spike occurs, in time, approximately at the end of the QRS component of the EKG signal.

In a similar manner, the output from DIFFERENTIATING NETWORK 232 is coupled as one input to NAND gate 246 while the other input to this gate is the T BLANKING signal (see FIG. 16*e*) from VARIABLE RATE T BLANKING CIRCUIT 66. The output from NAND gate 246 is a "low" going Q LEADING spike 248 illustrated in FIG. 16*i* which corresponds to spike 234 of FIG. 16*f*. Accordingly, the Q LEADING spike corresponds to the start of the QRS component of the EKG signal.

The Q LEADING spikes and the S TRAILING spikes are utilized, as will be explained, to develop a QRS INTERVAL and QRS LOGIC PROCESSING CIRCUIT 70 includes a QRS COUNTER 250 which counts clock pulses during the QRS INTERVAL. If, during the QRS INTERVAL, a predetermined number of clock pulses are counted, thereby indicating that the QRS INTERVAL exceeds a predetermined time duration and, accordingly, that the QRS component of the EKG signal is "long", QRS CARDIAC LOGIC PROCESSING CIRCUIT 70 provides a LONG QRS ALARM signal.

In order to actuate QRS COUNTER 250, the QRS LOGIC PROCESSING CIRCUIT 70 derives a series QRS pulses, illustrated in FIG. 16*j*, and a series of QRS pulses, illustrated in FIG. 16*k*. The QRS pulses are provided at the output of a NAND gate 252 which has, as one input thereto, the S TRAILING spikes of FIG. 16*h*. Another input to NAND gate 252 is the ENABLE signal which is coupled to the input of this gate from SYNCHRONIZING AND ENABLE CIRCUIT 62. The ENABLE signal is provided so that QRS COUNTER 250 will be synchronized, after an alarm has occurred, to start counting clock pulses on the next sensed R pulse or ventricular beat or cycle of the EKG signal. However, for purposes of explanation, the ENABLE signal input to NAND gate 252 may be considered to always be "high." Also applied as an input to NAND gate 252 are the QRS pulses which are derived from the output of a NAND gate 254. As will be explained hereinafter, NAND gates 252, 254 are connected in a "latch" configuration. The Q LEADING spike (or alternatively, as will be explained, the R pulse) sets the "latch" causing the output of NAND gate 252 to go "low" and the S TRAILING spike resets the "latch" causing the output of NAND gate 252 to go "high."

One input to NAND gate 254 is the QRS pulses coupled from NAND gate 252. The other input to NAND gate 254 is, most frequently, provided by the Q LEADING spike. The Q LEADING spike is developed at the output of NAND gate 246 and is coupled to a NOR gate 256. The other input to NOR gate 256 is the series of R pulses coupled from SYNCHRONIZING AND ENABLE CIRCUIT 62. The output from NOR gate 256 is coupled to an INVERTER 258 and the output from this INVERTER is coupled as the other input to NAND gate 254.

As will be explained in more detail hereinafter, QRS COUNTER 250 counts CL1 clock pulses during the QRS INTERVAL as determined by the time that the QRS pulse is "low." In other words, QRS COUNTER 250 counts CL1 clock train pulses from the Q LEADING spike or start of the QRS INTERVAL to the S TRAILING spike or end of the QRS INTERVAL. This provides a real time indication of the duration of the ventricular contraction or the QRS component of the analog EKG signal.

Occasionally, the Q component of the analog EKG signal is weak and it is possible that the Q component will not be sensed to provide a Q LEADING spike. It is still desirable, however, to obtain some measure of the ventricular contraction of the monitored-heart. This is provided by the R pulse input to NOR gate 256. If the Q component of the analog EKG signal is not weak, the output from INVERTER 258 is a series of signals, the first signal corresponding to the Q LEADING spike or start of the QRS INTERVAL followed by an R pulse corresponding to the start of the R pulse or ventricular component of the analog EKG signal. When both the Q LEADING spike and the R pulse are provided to NAND gate 254, the R pulse will have no effect on the gate since the gate output will have already been set "high" by the preceding Q LEADING spike. Accordingly, QRS COUNTER 250 will start counting CL1 pulses at the start of the QRS INTERVAL.

However, when the Q component of the analog EKG signal is weak and is not sensed, no Q LEADING spike will be provided at NOR gate 256 and the output from INVERTER 258 will be a series of single R pulses corresponding to the R component of the analog EKG signal. Accordingly, QRS COUNTER 250 will start counting CL1 clock pulses on the R component of the QRS INTERVAL. If this "RS" INTERVAL exceeds a predetermined time duration, then the "full" QRS INTERVAL must also exceed the predetermined time duration.

Referring to QRS COUNTER 250, this COUNTER counts signals applied to the clock pulse input thereto when the reset to the COUNTER is "low". When the reset to the COUNTER is "high", the COUNTER is cleared and will not count. As indicated in FIG. 15, the QRS pulse output from NAND gate 252 is coupled to the reset of QRS COUNTER 250 and CL1 clock pulses, derived in CLOCK AND TIMING CIRCUIT 64, are coupled to the clock pulse input to the COUNTER. During the time that the QRS pulses are "low," that is, during the time the reset to the COUNTER is "low," the COUNTER will count the number of CL1 clock pulses applied thereto. When the QRS pulse goes "high," the COUNTER is reset and cleared to zero. Thus, QRS COUNTER 250 counts CL1 pulses (more particularly, COUNTER 250 counts the transition of the CL1 clock pulses from "low" to "high") during the QRS INTERVAL and if, during the QRS INTERVAL, a predetermined number of CL1 clock pulses are counted, a LONG QRS ALARM signal is provided thereby indicating the QRS component of the analog EKG signal has exceeded a predetermined time duration and is "long."

More particularly if, during the QRS INTERVAL, QRS COUNTER 250 counts 10 CL1 clock pulses, the $(2)^1$ and $(2)^3$ BITS from the COUNTER go "high" (this corresponds to a QRS INTERVAL and, therefore, the QRS component of the EKG signal, having time duration equal to or greater than 0.12 seconds). On the other hand, if fewer than 10 CL1 clock pulses are counted during the QRS INTERVAL, no ALARM signal is provided and QRS COUNTER 250 is reset at the end of the QRS INTERVAL when the QRS pulse goes "high." The COUNTER is thus cleared to zero and will not count CL1 clock pulses until the reset to the COUNTER goes "low." This occurs at the start of the next QRS INTERVAL when the QRS pulse goes low.

The output from QRS COUNTER 250 is coupled to a NAND DECODE LONG QRS gate 260. The output of NAND DECODE LONG QRS gate 260 goes "low" when the BIT outputs from QRS COUNTER 250 go "high" and when the QRS pulse input from NAND gate 254 goes "high." The QRS pulse signal is "high" only during the QRS INTERVAL and this insures that the output from NAND DECODE LONG QRS gate 260 will go "low" only during the QRS INTERVAL. In other words, this input to NAND DECODE LONG QRS gate 260 prevents spurious signals from the output of QRS COUNTER 250 from triggering NAND DECODE LONG QRS gate thereby reducing the chance of false positives due to the internal circuitry of the cardiac monitor.

The output of NAND DECODE LONG QRS gate 260 goes "low" when 10 CL1 clock pulses are counted during the QRS INTERVAL (corresponding to the QRS component of the analog EKG signal having a time duration equal to or greater than 0.12 sec.) and this output is coupled to the set terminal of a LATCH 262. The reset to LATCH 262 is provided by the ENABLE B signal which is coupled to the LATCH from SYNCHRONIZING AND ENABLE CIRCUIT 62. The output from LATCH 262 is coupled to a NAND gate 264, the other input to this NAND gate being the 1.5 Khz. signal which is coupled to this gate from CLOCK AND TIMING CIRCUIT 64.

When the QRS INTERVAL exceeds a predetermined time duration, signifying a "long" QRS component of the analog EKG signal, the set input to LATCH 262 goes "low." This causes the output of LATCH 262 to go "high." Considering only this input to NAND gate 264, this results in the output of NAND gate 265 going "low." When this occurs, a LONG QRS ALARM signal is produced. The LONG QRS ALARM signal, that is, the "low" output from NAND gate 264 is coupled to AUDIBLE ALARM 80, actuating the AUDIBLE ALARM thereby indicating to the patient that some abnormality has occurred. In order to identify the particular abnormality which has caused AUDIBLE ALARM 80 to operate, a LONG QRS INDICATOR 266 is coupled to the output of NAND gate 264 and is also coupled to a source of positive potential (not shown). By way of example, LONG QRS INDICATOR 266 may be a light or other visual indicator. When the output from NAND gate 264 goes "low," current flows through the LONG QRS INDICATOR 266 actuating the same and, by mounting the INDICATOR in a convenient place within PROCESSING UNIT 12, the patient can quickly ascertain which cardiac abnormality has caused the alarm and may notify his physician.

Considering the 1.5 Khz. signal input to NAND gate 264, this signal is provided for power purposes and causes the output from NAND gate 264, when QRS CARDIAC LOGIC PROCESSING CIRCUIT 68 has sensed a long QRS INTERVAL, to fluctuate from "high" to "low" at a frequency corresponding to 1.5 Khz. (rather than just staying "low"). As a result, LONG QRS INDICATOR 266 will operate as actuated by an AC source conserving power and providing longer life for the INDICATOR. It is to be noted, however, that the 1.5 Khz. input to NAND gate 264 will have no effect on the output of the gate if the LATCH input to this gate is "low." In other words, the output of NAND gate 264 will remain "high" until a long QRS INTERVAL is sensed.

In operation, QRS CARDIAC LOGIC PROCESSING CIRCUIT 70 provides a LONG QRS ALARM signal and actuates LONG QRS INDICATOR 266 if the QRS component of the analog EKG signal exceeds a predetermined time duration. This is determined by the number of CL1 clock pulses counted by QRS COUNTER 250 during a QRS INTERVAL. Specifically, the various gates, which are coupled to the reset of QRS COUNTER 250, provide a series of QRS pulses which go "low" during the QRS INTERVAL to render operative the QRS COUNTER. Normally, the QRS pulse is "low" from the Q LEADING edge to the S TRAILING edge of the QRS INTERVAL. However, if the Q component of the analog EKG signal is "weak," NOR gate 256 allows QRS COUNTER 250 to count CL1 clock pulses, starting with the R component of the analog EKG signal.

When 10 CL1 clock pulses are counted during the QRS INTERVAL, the output from the COUNTER 250 goes "high" and the output from NAND DECODE LONG QRS gate 260 goes "low" thus indicating a "long" QRS heartbeat. As an added safety feature, the QRS pulse is also coupled as an input to NAND DECODE LONG QRS gate 260 to reduce false positives by insuring that this gate will go "low" only during the QRS INTERVAL.

When NAND gate 260 goes "low," LATCH 262 is set and the LATCH output goes "high." This results in actuation of LONG QRS INDICATOR 266 and results in the development of a LONG QRS ALARM signal.

LATCH 262 will remain "high" thereby providing a LONG QRS ALARM signal until the LATCH is reset by the patient. This is accomplished by actuation of MANUAL RESET BUTTON 160*a* (see FIG. 7) which causes the ENABLE B input to the reset of LATCH 262 to go "low." Once the ENABLE B signal goes low, the output of LATCH 262 will remain "low" until the next long QRS component of the EKG signal is sensed by the cardiac monitor.

THE R-R CARDIAC LOGIC PROCESSING CIRCUIT

Figure 17:
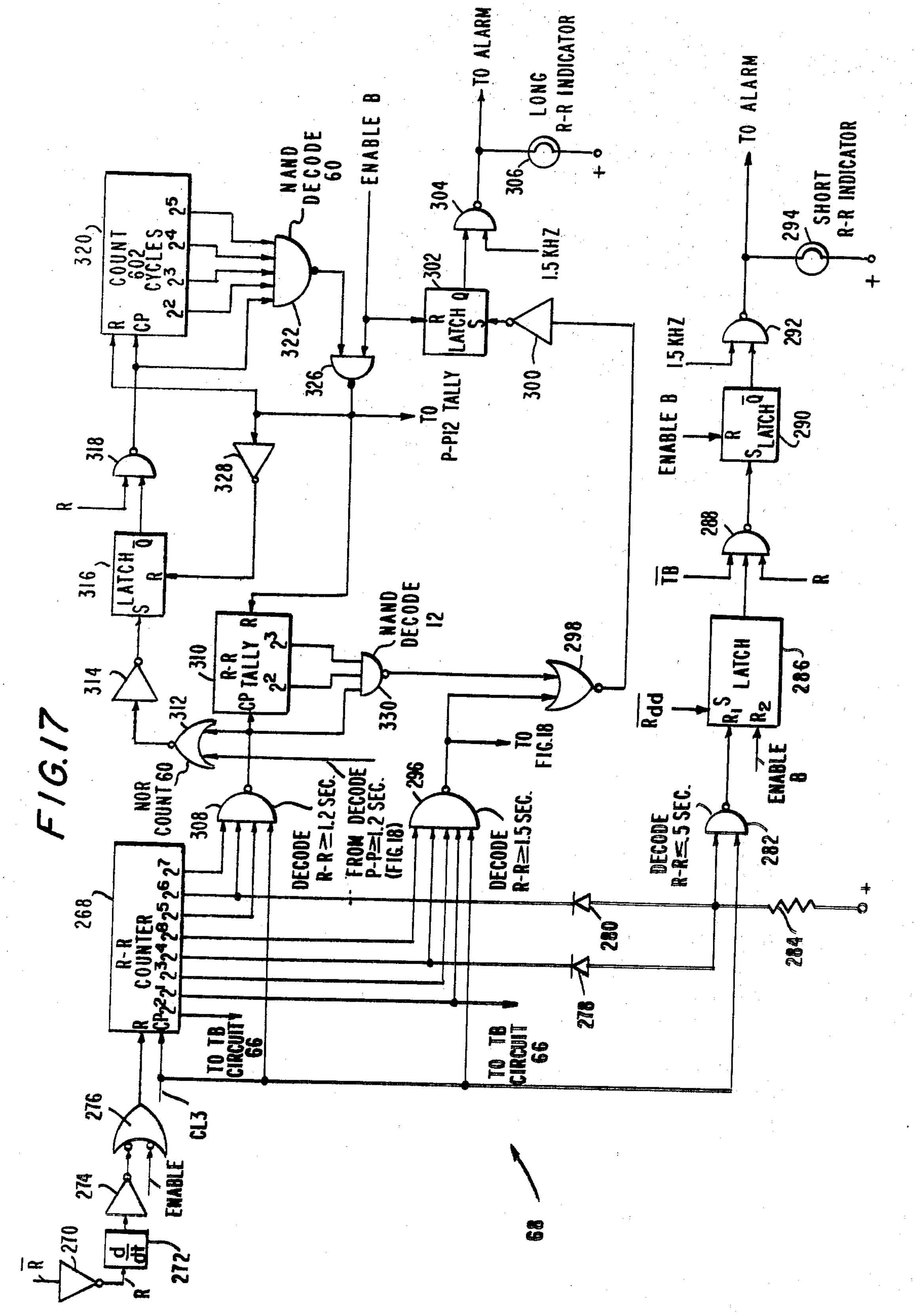
FIG. 17 is a circuit schematic of the logic circuitry of the R-R CARDIAC LOGIC PROCESSING CIRCUIT of the present invention.

R-R CARDIAC LOGIC PROCESSING CIRCUIT 68, shown in FIG. 17, is utilized to provide various ALARM signals responsive to the sensing by the cardiac monitor of ventricular bradycardia and ventricular tachycardia in the monitored-heart. More particularly, R-R CARDIAC LOGIC PROCESSING CIRCUIT 68 develops R-R INTERVALS which correspond to consecutive R or ventricular components of the analog EKG signal and provides a SHORT R-R ALARM signal (corresponding to a ventricular tachycardia) if the time duration of the R-R INTERVAL is less than a predetermined value. By way of example, if the R-R INTERVAL is equal to or less than 0.5 sec., corresponding to a heart rate in excess of 120 beats per minute, a SHORT R-R ALARM signal is provided.

Similarly, R-R CARDIAC LOGIC PROCESSING CIRCUIT 68 will provide an immediate LONG R-R ALARM signal, corresponding to a ventricular bradycardia in the monitored-heart, if the R-R INTERVAL time duration is equal to or greater than 1.5 sec. (corresponding to a heart beat rate of approximately 40 beats per minute). Additionally, if the R-R INTERVAL is "intermediately long" (that is, equal to or greater than 1.2 sec. but less than or equal to 1.5 sec.), the R-R CARDIAC LOGIC PROCESSING CIRCUIT counts or tally these "intermediately long" R-R INTERVALS during a tally interval. If 12 "intermediately long" R-R INTERVALS are tallied within 60 ventricular beats or cycles, the LONG R-R ALARM signal is also provided.

Referring now specifically to FIG. 17, R-R LOGIC PROCESSING CIRCUIT 68 includes an R-R COUNTER 268 which is adapted to count CL3 clock pulses applied to the clock pulse input to the COUNTER from CLOCK AND TIMING CIRCUIT 64. R-R COUNTER 268 is rendered operative to count the CL3 clock pulses when the reset input to the COUNTER goes "low."

In order to provide the reset input to R-R COUNTER 268, the R pulses from SYNCHRONIZING AND ENABLE CIRCUIT 62 are coupled to the R-R LOGIC PROCESSING CIRCUIT and these pulses are inverted in an INVERTER 270. The output of INVERTER 270 provides a series of pulses which are differentiated in a DIFFERENTIATING NETWORK 272. The output of DIFFERENTIATING NETWORK 272 provides a series of positively going spikes responsive to the rising edges of the R pulses. DIFFERENTIATING NETWORK 272 also shunts to ground the negatively going spikes which correspond to the falling edges of the R pulses. The output from DIFFERENTIATING NETWORK 272 is coupled to an INVERTER 274. It is appreciated that the output from INVERTER 274 is a series of spike pulses providing a signal which is normally "high" but which goes "low" for a short time at the leading edges of the R pulses, corresponding to the start of the R or ventricular components of the analog EKG signal. The output from INVERTER 274 is coupled to a NOR gate 276 which has, as the other input thereto, the ENABLE signal provided from SYNCHRONIZING AND ENABLE CIRCUIT 62. Since the ENABLE input to NOR gate 276 is normally "high," it is appreciated that the output from the NOR gate is a signal which is normally "low" but which has a series of "high" going spikes which occur at the leading edge of the R pulses. Thus, this signal establishes the R-R INTERVAL and is coupled as the reset to R-R COUNTER 268.

Since the reset input to R-R COUNTER 268 is normally "low," the COUNTER is rendered operative to count CL3 clock pulses during the R-R INTERVAL, that is, from the start of the R pulse or ventricular component of the EKG signal to the start of the next R pulse or ventricular component. R-R COUNTER 268 is reset each time the spike reset signal goes "high" or, after an ALARM signal, when the MANUAL RESET BUTTON 160a is actuated to cause the ENABLE signal to go "low." When the latter occurs, R-R COUNTER 268 will remain inoperative until the next R pulse and, therefore, will be synchronized.

R-R COUNTER 268, by counting the CL3 clock pulses, provides an indication of the time duration of the R-R INTERVALS. As will be explained hereinafter, the BIT outputs from R-R COUNTER 268 are utilized to provide various ALARM signals. Furthermore, the output from R-R COUNTER BIT ($2^1$) and R-R COUNTER BIT ($2^2$) are coupled to the VARIABLE RATE T BLANKING CIRCUIT 66, these BIT outputs being utilized to obtain the $R_{TB}$ signal to initiate the T BLANKING signal as previously explained.

Considering first the development of the SHORT R-R ALARM signal in P-R LOGIC PROCESSING CIRCUIT 68, the ($2^4$) and ($2^6$) BIT outputs from R-R COUNTER 268 are tied together and are coupled, via DIODES 278, 280, to the input of NAND DECODE R-R gate 282. A reference source (not shown) is also tied to the DIODES and is coupled to NAND DECODE R-R gate 282 via a RESISTOR 284. The other input to NAND DECODE R-R gate 282 is the series of CL3 clock pulses. It will be appreciated that the output from NAND DECODE R-R gate 282 stays "high" until 80 CL3 clock pulses are counted by R-R COUNTER 268. When (and if) the COUNTER counts 80 CL3 clock pulses (corresponding to outputs from BITS ($2^4$) to ($2^6$), the output from NAND DECODE R-R gate 282 goes "low." DIODES 278 and 280 and RESISTOR 284 are provided to keep the input to NAND DECODE R-R gate 282 "low" until the COUNTER has counted 80 CL3 clock pulses. In other words, DIODES 278, 280 and RESISTOR 284 act as an OR function keeping this output to NAND DECODE R-R gate 282 "low" until 80 CL3 clock pulses are counted. The CL3 clock pulse input to NAND DECODE R-R gate 282 insures that the gate will go "low" only if R-R COUNTER 268 is counting clock pulses. This prevents the occurrence of a false positive due to any errors within the circuitry of the cardiac monitor.

The output from NAND DECODE R-R gate 282 is coupled as a reset to a LATCH 286 which has, as another reset thereto, the ENABLE B signal from SYNCHRONIZING AND ENABLE CIRCUIT 62. The $R_{dd}$ series of pulses are coupled to the set input to LATCH 286 from DELAY CIRCUIT 60. The output of LATCH 286 is coupled as one input to a NAND gate 288.

The two other inputs to NAND gate 288 are the T BLANKING signal coupled to this gate from VARIABLE RATE T BLANKING CIRCUIT 66 and the series of R pulses coupled to this gate from ANALOG TO DIGITAL CONVERTER 56. The output from NAND gate 288 is coupled as the set input to a LATCH 290 and the reset input thereto is provided by the ENABLE B signal coupled to the LATCH from SYNCHRONIZING AND ENABLE CIRCUIT 62.

LATCH 290 is coupled to a NAND gate 292 which has, as the other input thereto, the 1.5 Khz. signal from CLOCK AND TIMING CIRCUIT 64. As will be explained in more detail, when R-R CARDIAC LOGIC PROCESSING CIRCUIT 68 senses a short R-R INTERVAL, the output from NAND gate 292 goes "low" thereby providing a SHORT R-R ALARM signal which is coupled to AUDIBLE ALARM 80 which advises the patent of the fact that a cardiac abnormality has occurred. Further, when output from NAND gate 292 goes "low," a SHORT R-R INDICATOR 294 is actuated which particularly identifies the specific cardiac abnormality that has occurred. It will be appreciated, therefore, that LATCH 290 and NAND gate 292 operate similarly to LATCH 262 and NAND gate 264 described with reference to the QRS LOGIC PROCESSING CIRCUIT 70 of FIG. 15.

Considering a typical operational sequence, the leading edge of the R pulse actuates R-R COUNTER 268 by causing the reset to this COUNTER to go "low" and R-R COUNTER 268 immediately starts to count the CL3 clock pulses applied thereto. R-R COUNTER 268 will count CL3 pulses during the R-R INTERVAL.

At the start of the R-R INTERVAL, the output from NAND DECODE R-R gate 282 will be "high" since R-R COUNTER 268 will not have counted 80 CL3 clock pulses. Further, a short time after the start of the R-R INTERVAL (and, more precisely, approximately 50 microsec. after the start thereof), the $R_{dd}$ pulse is received at the set input of LATCH 286 causing the output of the LATCH to go "high".

Assuming that R-R COUNTER 268 counts 80 CL3 clock pulses during the R-R INTERVAL, that is, before the COUNTER is reset by the next R pulse, the output from NAND DECODE R-R gate 282 goes "low" and since this signal is applied to the reset of LATCH 286, this will cause the output of LATCH 286 to go "low." Accordingly, when the T BLANKING signal input to NAND gate 288 goes "high" and the next R pulse input to NAND gate 282 goes "high", the output from NAND gate 288 will remain "high" since the LATCH input to this gate is "low." As a result thereof, LATCH 290 will remain "low" and the output from NAND gate 292 will remain "high." Thus, no SHORT R-R ALARM signal will be provided — and there should not be such an ALARM signal since the R-R INTERVAL is not less than or equal to 0.5 sec. — as indicated by the fact that R-R COUNTER 268 has counted at least 80 CL3 clock pulses.

Consider, however, the situation where R-R COUNTER 268 does not count 80 CL3 clock pulses before the COUNTER is reset, that is, consider a short R-R INTERVAL. The sequence starts much as before with the $R_{dd}$ pulse setting LATCH 286 "high." However, since the output from NAND DECODE R-R gate 282 remains "high" (R-R COUNTER 268 does not count the number of CL3 clock pulses required to cause this gate to go low), the short."from LATCH 286 remains "high" since the LATCH is not reset by the output from NAND DECODE R-R gate going "low." Accordingly, when the T BLANKING signal input to NAND gate 288 and the R pulse input to NAND gate 288 (corresponding to the next R pulse or ventricular component) go "high," the output from NAND gate 288 goes "low." This causes LATCH 290 to go "high" causing the output from NAND gate 292 to go "low." With NAND gate 292 "low" (in actuality, it goes both "high" and "low" rapidly due to the 1.5 Khz. signal applied thereto), a SHORT R-R ALARM signal is provided at the output of this gate and SHORT R-R INDICATOR 294 is actuated. The output from NAND gate 292 remains "low" until LATCH 290 is reset by the ENABLE B signal which occurs when MANUAL RESET BUTTON 160*a* is pressed. Thus, R-R CARDIAC LOGIC PROCESSING CIRCUIT 68 provides a SHORT R-R ALARM signal when the R-R INTERVAL and, therefore, the R-R component of the analog EKG signal, is "short.

R-R LOGIC PROCESSING CIRCUIT 68 also provides a LONG R-R ALARM signal if the time between consecutive ventricular components of the EKG signal exceeds or is equal to a predetermined duration, for example, 1.5 seconds. Thus, a LONG R-R ALARM signal is provided if the R-R INTERVAL is greater than or equal to 1.5 seconds. Specifically, the various BITS from R-R COUNTER 268, corresponding to a count of approximately 282 CL3 clock pulses, are coupled to NAND DECODE R-R gate 296 and this gate 296 goes "low" when R-R COUNTER 268 counts 282 CL3 clock pulses. This corresponds to an R-R INTERVAL having a time duration equal to or greater than approximately 1.5 seconds and results in a LONG R-R ALARM signal being provided.

The output from NAND DECODE R-R gate 296 is coupled as one input to a NOR gate 298 which, in turn, is coupled to an INVERTER 300. The output from INVERTER 300 is coupled as the set input to a LATCH 302 which, in turn, is coupled to a NAND gate 304. LATCH 302 and NAND gate 304 are identical, respectively, to LATCH 290 and NAND gate 292 described hereinbefore.

In operation, if R-R COUNTER 268 counts 282 CL3 clock pulses during the R-R INTERVAL, that is, during the time corresponding to consecutive R or ventricular beats or cycles of the analog EKG signal, the output from NAND DECODE R-R gate 296 will go "low." Of course, this is not the "normal" situation since most frequently R-R COUNTER 268 will be reset and cleared before 282 CL3 clock pulses are counted. However, if R-R COUNTER 268 is not reset before 282 CL3 clock pulses are counted, the output of NAND DECODE R-R gate 296 will go "low" causing the output from NOR gate 298 to go "high." As a result thereof, the output from INVERTER 300 goes "low." This "low" input to the set input of LATCH 302 causes the output of the LATCH to go "high." As a result, the output of NAND gate 304 goes "low" and an alarm signal is provided at the output of the NAND gate. This signifies that the cardiac monitor has sensed a long R-R INTERVAL, corresponding to the occurrence of a ventricular bradycardia in the monitored-heart. It is to be noted that this occurs when the R-R INTERVAL is equal to or greater than 1.5 sec. and, if such is the case, the LONG R-R ALARM signal output from NAND gate 304 occurs immediately.

Cardiologists have found, however, that a patient may have an EKG signal which exhibits an "intermediately long" R-R component, which corresponds, for example, to an R-R INTERVAL less than or equal to 1.5 sec. but greater than or equal to 1.2 sec. They have also found that an occasional "intermediately long" R-R INTERVAL is relatively common-place but that frequent "intermediately long" R-R INTERVALS signify the occurrence of a ventricular bradycardia in the heart. Accordingly, and as will now be explained, R-R LOGIC PROCESSING CIRCUIT 68 includes circuitry which enables the cardiac monitor of the present invention to sense "intermediately long" R-R INTERVALS. The "intermediately long" R-R INTERVALS are counted or tallied during a tally interval, the latter advantageously also being a function of the monitored-hearbeat, and a LONG R-R ALARM signal is provided if the number of "intermediately long" R-R INTERVALS exceed a predetermined number during the heart dependant tally interval. By way of example, a LONG R-R ALARM signal is provided if 12 "intermediately long" R-R INTERVALS are tallied within 60 ventricular beats or cycles.

Referring to FIG. 17, the output BITS of R-R COUNTER 268, corresponding to a count of approximately 224 CL3 clock pulses, are coupled to a NAND DECODE R-R gate 308. The output from NAND DECODE R-R gate 308 goes "low" when R-R COUNTER 268 counts 224 CL3 clock pulses corresponding to an "intermediately long" R-R INTERVAL (an R-R INTERVAL between 1.2 and 1.5 seconds). Thus, every time NAND DECODE R-R gate 308 goes "low" an "intermediately long" R-R INTERVAL has been sensed. NAND DECODE R-R gate 308 also goes "low" when a long R-R INTERVAL is sensed. However, this can be ignored since when this occurs, NAND DECODE R-R gate 296 goes "low" and the LONG R-R ALARM signal is immediately provided.

The output from NAND decode R-R gate 308 is coupled as the input to an INTERMEDIATELY LONG TALLY COUNTER 310 which counts or tallies the number of "intermediately long" R-R INTERVALS during a heart dependant tally interval. As will now be explained, INTERMEDIATELY LONG TALLY COUNTER 310 provides an output if 12 "intermediately long" R-R INTERVALS are counted during a tally interval established by 60 R pulses, corresponding to 60 ventricular beats or cycles. It is to be noted that the tally interval may be fixed time dependant, for example, a 60 second tally interval could be provided. However, a heart dependant tally interval is advantageously utilized.

In order to provide the heart dependant tally interval, the output from NAND DECODE R-R gate 308 is coupled to a NOR COUNT 60 gate 312 which goes "high" when an "intermediately long" R-R INTERVAL is sensed by NAND DECODE R-R gate 308. As will be explained hereinafter, the output from NOR COUNT 60 gate 312 also goes "high" responsive to the sensing of an "intermediately long" P-P INTERVAL, sensed in P-P LOGIC PROCESSING CIRCUIT 74, since the heart dependant tally interval is also utilized in the latter circuit.

The output from NOR COUNT 60 gate 312 is coupled to an INVERTER 314 which provides a set input to a LATCH 316. When an "intermediately long" R-R INTERVAL (or an "intermediately long" P-P INTERVAL) is sensed, the output of inverter 314 goes "low" causing the output from LATCH 316 to go "high" and this output is coupled to a NAND gate 318. NAND gate 318 also receives the series of R pulses from ANALOG TO DIGITAL CONVERTER 56.

The output from NAND gate 318 is coupled to a COUNT 60 R CYCLES COUNTER 320. When LATCH 316 goes "high," the R pulses provided at the output of NAND gate 318 are counted by the COUNTER. More particularly, COUNT 60 R CYCLES COUNTER 320 counts the number of transitions at the output of NAND gate 318 from "high" to "low." When LATCH 316 is "low," the output of NAND gate 318 stays "high." However, when LATCH 316 is "high," the number of "high" to "low" transitions at the output of NAND gate 318 correspond to the occurrence of ventricular components in the monitored-heart.

COUNT 60 R CYCLES COUNTER 320 counts 60 R pulses or ventricular beats or cycles and after 60 beats or cycles are counted, COUNTER 320 resets itself. More particularly, the various output BITS from COUNT 60 R CYCLES COUNTER 320, corresponding to a count of 60 R pulses or ventricular beats or cycles, are coupled to a NAND DECODE 60 gate 322 which goes "low" when 60 R pulses or ventricular beats or cycles are counted by COUNT 60 R CYCLES COUNTER 320. Also coupled as an input to NAND DECODE 60 gate 322 is the output from NAND gate 318 which is provided to eliminate "false positives" from COUNT 60 R CYCLES COUNTER 320. Thus, this input to NAND DECODE 60 gate 322 insures that the output from this gate will go "low" only when COUNT 60 R CYCLES COUNTER 320 is counting R pulses or ventricular beats or cycles and not due to any circuit malfunction, for example, in COUNT 60 R CYCLES COUNTER 320.

The output from NAND DECODE 60 gate 322 is coupled to a NAND gate 326 which also has, as an input thereto, the ENABLE B signal coupled from SYNCHRONIZING AND ENABLE CIRCUIT 62. The input to NAND gate 326 from the ENABLE B signal may be considered to be normally "high."

The output of NAND gate 326 is connected to the reset of COUNT 60 R CYCLES COUNTER 320. Accordingly, when the output from NAND DECODE 60 gate 322 goes "low" (which occurs when 60 R pulses or ventricular beats or cycles are counted by COUNTER 320), the output from NAND gate 326 goes "high" and this causes the COUNTER to be reset and cleared to zero. (Additionally, the output from NAND gate 326 is coupled to the P-P CARDIAC LOGIC PROCESSING 74 since the latter also utilizes the same heart dependant tally interval established by COUNT 60 R CYCLES COUNTER 320.) Once COUNTER 320 is cleared to zero, the output from NAND DECODE 60 gate 322 goes "high" causing the output from NAND gate 326 to go "low." As a result thereof, the reset input to COUNT 60 R CYCLES COUNTER 320 goes "low."

The output from NAND gate 326 is also coupled to the reset of INTERMEDIATELY LONG TALLY COUNTER 310 and, by way of an INVERTER 328, to the reset of LATCH 316. Accordingly, after 60 R pulses or ventricular beats or cycles have been counted by COUNT 60 R CYCLES COUNTER 320, the reset to LATCH 316 goes "low" and, when the COUNTER is reset, then goes "high." Thus, LATCH 316 is reset causing the output of the LATCH to go "low" and the output from NAND gate 318 will go and will remain "high". As a result thereof, COUNT 60 R CYCLES COUNTER 320 will not count any R pulses or ventricular beats or cycles until the output from NAND gate 318 goes "low." This occurs when LATCH 316 is set by the next "intermediately long" R-R INTERVAL that is sensed. In a similar manner, the reset input to INTERMEDIATELY LONG TALLY COUNTER 310 goes "low" and then "high" after 60 R pulses or ventricular beats or cycles have been counted by COUNT 60 R CYCLES COUNTER 320. This clears and resets to zero INTERMEDIATELY LONG TALLY COUNTER 310. The output from INTERMEDIATELY LONG TALLY COUNTER 310 is coupled to a NAND DECODE 12 gate 330. The output from NAND DECODE 12 gate 330 goes "low" if INTERMEDIATELY LONG TALLY COUNTER 310 counts 12 "intermediately long" R-R INTERVALS before the COUNTER 310 is reset, that is, during the heart dependant tally interval. The output from NAND DECODE R-R gate 308 is also coupled to NAND DECODE 12 gate 330 thereby insuring that the gate will go "low" only if INTERMEDIATELY LONG TALLY COUNTER 310 is counting "intermediately long" R-R INTERVALS. Thus, the input to NAND DECODE 12 gate 330 from DECODE R-R gate 308 prevents false positives.

The output from NAND DECODE 12 gate 330 is coupled as the other input to NOR gate 298 and when the NAND DECODE 12 gate input to NOR gate goes "low," a LONG R-R ALARM signal is provided and LONG R-R INDICATOR 306 is actuated as explained hereinbefore with respect to the input to NOR gate 298 from DECODE R-R gate 296.

Considering a typical operational sequence, the output from NAND DECODE R-R gate 308 goes "low" when R-R COUNTER 268 senses an "intermediately long" R-R INTERVAL. This causes the output from LATCH 316 to go "high" which enables the R pulses, corresponding to the ventricular beats or cycles of the monitored-heart, to be counted by COUNT 60 R CYCLES COUNTER 320. Similarly, INTERMEDIATELY LONG TALLY COUNTER 310 starts to count or tally the number of "intermediately long" R-R INTERVALS.

After COUNT 60 R CYCLES COUNTER 320 counts 60 R pulses or ventricular beats or cycles, thereby establishing the heart dependant tally interval, the COUNTER resets itself and also resets LATCH 316 causing the output from the LATCH to go "low." When LATCH 316 goes "low," the output from NAND gate 318 goes and remains "high". Accordingly, COUNT 60 R CYCLES COUNTER 320 stops counting R pulses or ventricular beats or cycles until the next "intermediately long" R-R INTERVAL is sensed to trigger LATCH 316. COUNT 60 R CYCLES COUNTER 320 also resets INTERMEDIATELY LONG TALLY COUNTER 310, clearing the same to zero.

Assuming that less than 12 "intermediately long" R-R INTERVALS have occurred within the heart dependant tally interval, that is, within 60 R pulses or ventricular beats or cycles, then the output from NAND DECODE 12 gate 312 remains "high" and no LONG R-R ALARM signal is provided. However, if 12 "intermediately long" R-R INTERVALS are counted by INTERMEDIATELY LONG TALLY COUNTER 310 before this tally counter is reset, that is, within the heart dependent tally interval, the output from NAND DECODE 12 gate 330 will go "low" resulting in a LONG R-R ALARM signal being provided.

To summarize the operation of R-R CARDIAC LOGIC PROCESSING CIRCUIT 68, this CIRCUIT provides a SHORT R-R ALARM signal (responsive to a ventricular tachycardia in the monitored-heart) if the R-R INTERVAL is less than or equal to a 0.5 sec. duration; provides an immediate LONG R-R ALARM signal (responsive to a ventricular bradycardia in the monitored-heart) if the R-R INTERVAL is equal to or greater than a 1.5 second time duration; and, provides a LONG R-R ALARM signal (responsive to a ventricular bradycardia in the monitored-heart) if the R-R INTERVAL is "intermediately long" (greater than or equal to 1.2 seconds but less than 1.5 seconds) and if 12 such "intermediately long" R-R INTERVALS are tallied within a predetermined heart dependent tally interval. This latter alarm may be termed a delayed LONG R-R ALARM signal.

THE P-P CARDIAC LOGIC PROCESSING CIRCUIT

Figure 18:
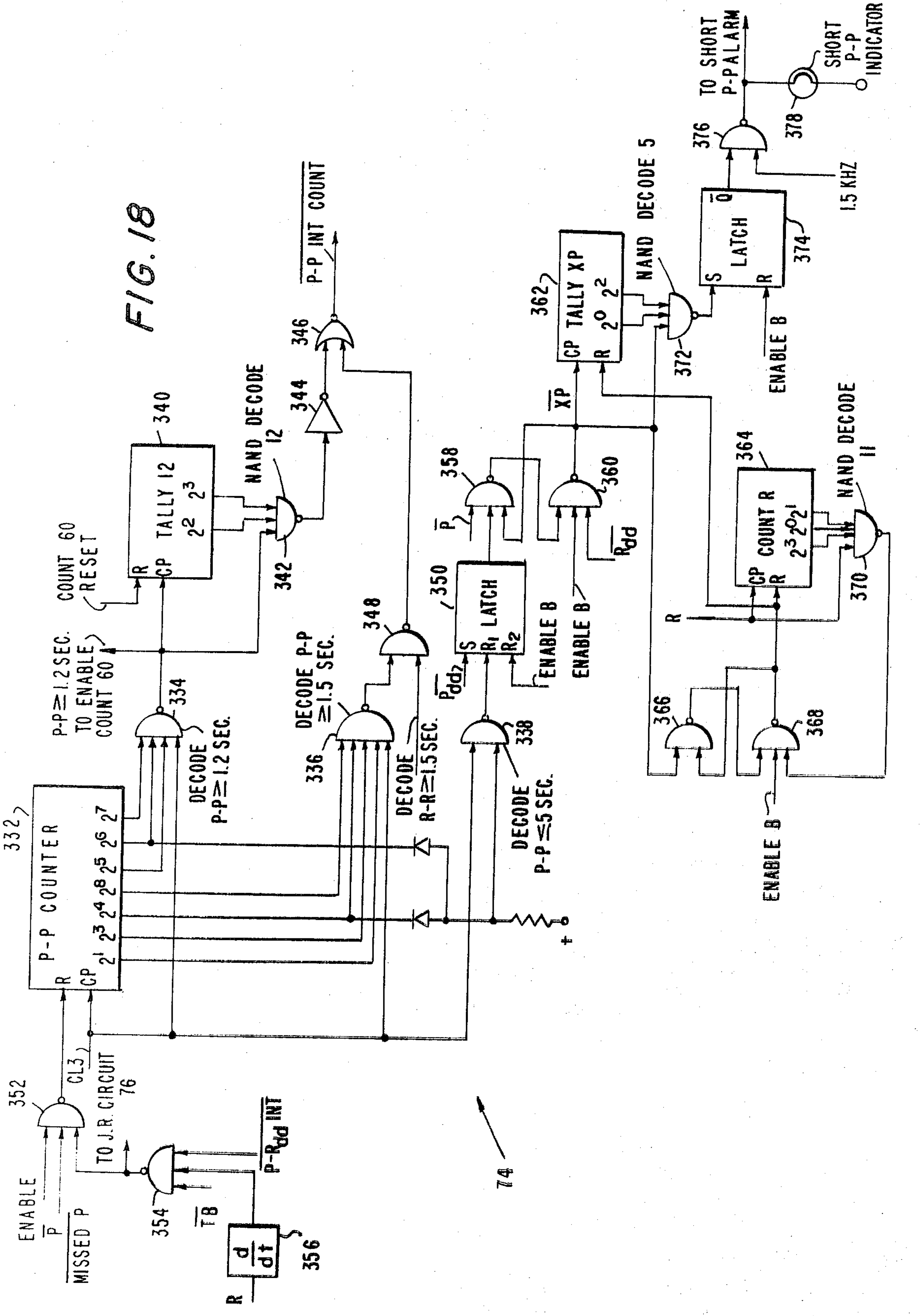
FIG. 18 is a circuit schematic of part of the logic circuitry of the P-P CARDIAC LOGIC PROCESSING CIRCUIT of the invention.
Figure 20:
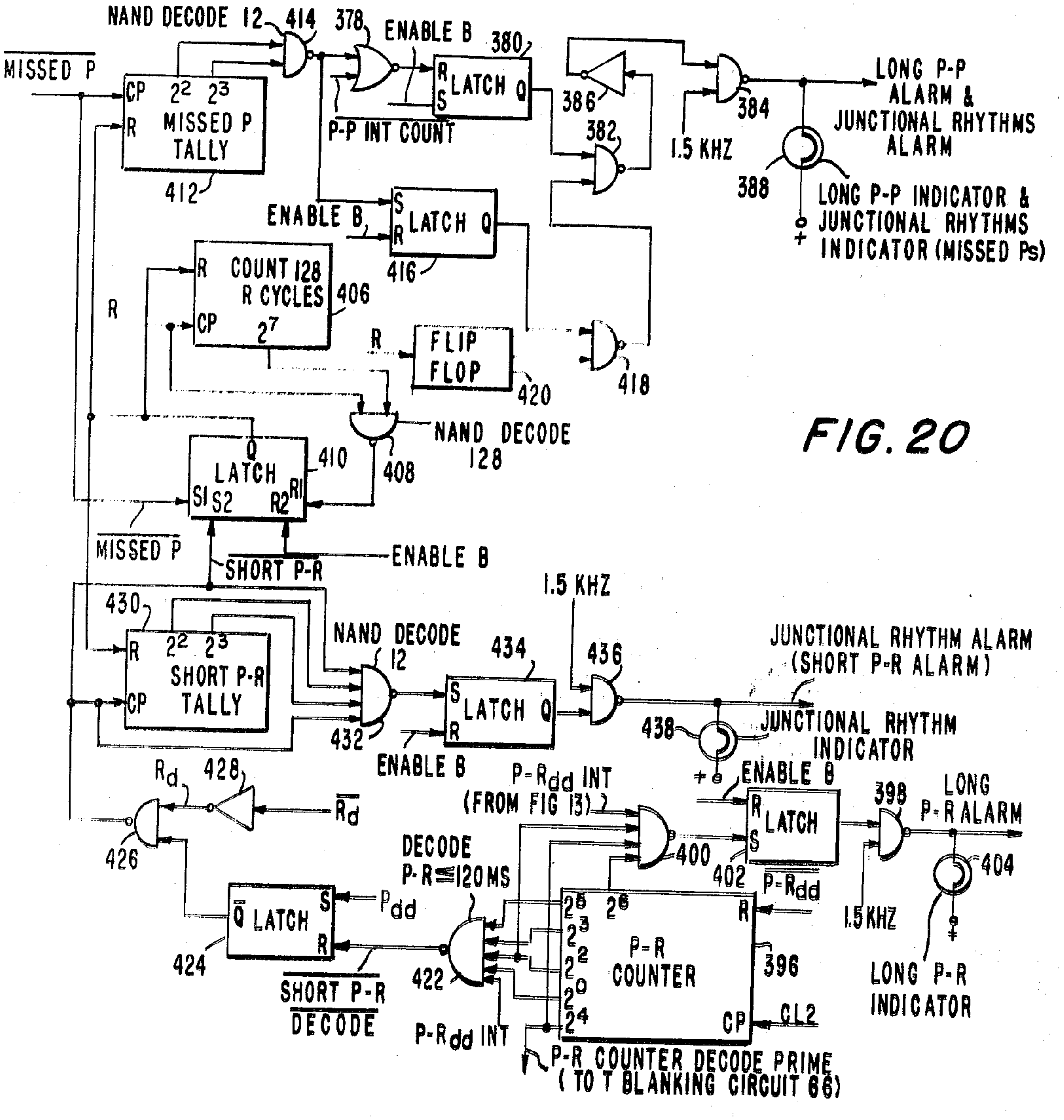
FIG. 20 is a circuit schematic of the logic circuitry of the P-P CARDIAC LOGIC PROCESSING CIRCUIT, the P-P CARDIAC LOGIC PROCESSING CIRCUIT and the JUNCTIONAL RHYTHMS CARDIAC LOGIC PROCESSING CIRCUIT of the present invention.

P-P CARDIAC LOGIC PROCESSING CIRCUIT 74 is shown in detail in FIGS. 18 and 20 and is provided to analyze the atrial or P component of the analog EKG signal by providing a P-P INTERVAL. As will be explained hereinafter, this circuit provides an immediate LONG P-P ALARM signal responsive to an atrial bradycardia in the monitored-heart if the P-P INTERVAL is greater than a predetermined time duration, for example, a 1.5 second duration (and if this occurs with a long R-R INTERVAL). Similarly, a delayed LONG P-P ALARM signal is provided if a predetermined number of "intermediately long" P-P INTERVALS are tallied within a predetermined heart dependent tally interval. By way of example, if 12 "intermediately long" P-P INTERVALS are tallied within 60 R pulses or ventricular beats or cycles, the LONG P-P ALARM signal is provided.

P-P CARDIAC LOGIC PROCESSING CIRCUIT 74 also provides a SHORT P-P ALARM signal, responsive to an atrial tachycardia in the monitored-heart, if a predetermined number of short P-P INTERVALS are sensed within a heart dependent tally interval. By way of example, and as will be explained in more detail, if 5 short P-P INTERVALS (less than or equal to 0.5 seconds) occur within 11 R pulses or ventricular beats or cycles, a SHORT P-P ALARM signal is provided.

Referring now particularly to FIG. 18, P-P CARDIAC LOGIC PROCESSING CIRCUIT 74 includes a P-P COUNTER 332 which is adapted to count CL3 clock pulses coupled to the COUNTER from CLOCK AND TIMING CIRCUIT 64. P-P COUNTER 332 is coupled to NAND DECODE P-P gates 334, 336, and 338 which are substantially identical, respectively, to NAND DECODE R-R gates 308, 296 and 282 of FIG. 17. Thus, the output of NAND DECODE P-P gate 334 goes "low" when an "intermediately long" P-P INTERVAL (a P-P INTERVAL greater than or equal to 1.2 sec.) is sensed by P-P COUNTER 332; the output from NAND DECODE P-P gate 336 goes "low" when a P-P INTERVAL (greater than or equal to 1.5 sec.) is sensed; and, the output from NAND DECODE R-R gate 338 goes "low" when a short P-P INTERVAL (less than or equal to 0.5 sec.) is sensed.

The output from NAND DECODE P-P gate 334 is coupled to an INTERMEDIATELY LONG TALLY COUNTER 340 which is substantially identical to the INTERMEDIATELY LONG TALLY COUNTER 310 of FIG. 17. Thus, this COUNTER is provided to count or tally the number of "intermediately long" P-P INTERVALS which occur during a heart dependent tally interval as provided by COUNT 60 R CYCLES COUNTER 320 counting 60 R pulses or ventricular beats or cycles. After 60 R pulses or ventricular beats or cycles are counted, the output from NAND gate 326 (see FIG. 17) resets INTERMEDIATELY LONG TALLY COUNTER 340.

In order to start the heart dependent tally interval, the output from NAND DECODE P-P gate 334 is coupled to NOR COUNT 60 gate 312 (see FIG. 17) which is utilized to set LATCH 316 of FIG. 17 and, in a similar manner to the NAND DECODE 12 gate 330 of FIG 17, the output of a NAND DECODE 12 gate 342 goes "low" if 12 "intermediately long" P-P INTERVALS are tallied within 60 R pulses or ventricular beats or cycles. The output from NAND DECODE 12 gate 342 is coupled to an INVERTER 344 which is coupled as one input to a NOR gate 346. The output from NOR gate 346 is a P-P INTERVAL COUNT signal which goes "low" if 12 "intermediately long" P-P INTERVALS are counted within the heart dependent tally interval.

Considering now NAND DECODE P-P gate 336, the output from NAND DECODE P-P gate 336 goes "low" when P-P COUNTER 332 senses a long P-P INTERVAL, that is, a P-P INTERVAL greater than or equal to 1.5 seconds in duration. The output from NAND DECODE P-P gate 336 is coupled as one input to a NAND gate 348. The other input to NAND gate 348 is provided from the output of NAND DECODE R-R gate 296 which goes "low" when the R-R INTERVAL, sensed by the R-R CARDIAC LOGIC PROCESSING CIRCUIT 68, is long. Accordingly, when the P-P INTERVAL sensed by P-P COUNTER 332 is equal to or greater than 1.5 sec. and the R-R INTERVAL sensed by R-R COUNTER 268 is equal to or greater than 1.5 sec., the output from NAND gate 348 goes "low" and, as will be explained, this provides a LONG P-P ALARM signal.

Considering now the NAND DECODE P-P gate 338, in a similar manner to the NAND DECODE R-R gate 382 of FIG. 17, NAND DECODE P-P gate 338 goes "low" when P-P COUNTER 332 senses a short P-P INTERVAL (less than or equal to 0.5 sec.). The output from NAND DECODE P-P gate 338 is coupled to a LATCH 350, which is substantially identical and operates in the same manner as LATCH 286 shown in FIG. 17, the set input to LATCH 350 being the $P_{dd}$ signal coupled to this LATCH from DELAY CIRCUIT 60 and the other reset to this LATCH being the ENABLE B signal from SYNCHRONIZING AND ENABLE CIRCUIT 62.

As explained hereinbefore, P-P COUNTER 332 is adapted to count CL3 clock pulses to provide an indication of the time duration between the atrial components of the analog EKG signal. The reset input to this COUNTER is provided from the output of a NAND gate 352 which has, as the inputs thereto, the ENABLE signal coupled from SYNCHRONIZING AND ENABLE CIRCUIT 62, a series of P pulses coupled from P-R CARDIAC LOGIC PROCESSING CIRCUIT 76, and a MISSED P signal.

The MISSED P signal is developed in a NAND gate 354. The inputs to NAND gate 354 are the T BLANKING signal developed in the VARIABLE RATE T BLANKING CIRCUIT 66 and a P-$R_{dd}$ INT signal developed in P-R CARDIAC LOGIC PROCESSING CIRCUIT 76. The third input to NAND gate 354 is a spike signal which corresponds to the leading or rising edge of the R pulses and is developed by differentiating, in a DIFFERENTIATING NETWORK 356, the series of R pulses from ANALOG TO DIGITAL CONVERTER 56. DIFFERENTIATING NETWORK 356 is adapted to shunt to ground the negatively going spike which correspond to the trailing or falling edges of the R pulses. The MISSED P signal is usually "high" since the three inputs to NAND gate 354 are usually not "high" concurrently. However, if the ANALOG TO DIGITAL CONVERTER 56 does not sense the P component of the analog EKG signal (for example, if this signal is too low in amplitude), the P-$R_{dd}$ INT signal remains "high". Accordingly, the MISSED P signal goes "low" when the T BLANKING signal and the differentiated R spike go "high" — which occurs at the differentiated R spike. The MISSED P signal going "low" signifies that the P component of the analog EKG signal has not been sensed.

In normal operation, the reset input to P-P COUNTER 332 goes "high" at the P pulse or atrial component of the analog EKG signal. After the P pulse is received, the reset goes "low." The COUNTER is thus cleared and, when the reset goes "low" the COUNTER starts to count CL3 pulses until the next P pulse comes in, that is, it counts CL3 clock pulses during the P-P INTERVAL. However, if the MISSED P signal goes "low," P-P COUNTER 332 is reset and cleared to zero. This prevents the P-P CARDIAC LOGIC PROCESSING CIRCUIT 74 from registering a false positive long P-P INTERVAL resulting from physiological retrograde P*s* (P*s* occurring after the QRS component), P*s* buried in the QRS complex or masked by artifacts.

Considering first the development of a SHORT P-P ALARM signal, it will be remembered that LATCH 350 operates in a similar manner to LATCH 286 of FIG. 17 and goes "high" if NAND DECODE P-P gate 338 goes "low," the latter occurring if 80 CL3 clock pulses are not counted by P-P COUNTER 332. This is indicative of a short P-P INTERVAL less than or equal to 0.5 sec. Although it would be possible for the output from LATCH 350 to immediately provide an ALARM signal, as is the case of LATCH 286 of FIG. 17, it has been found useful to modify the P-P CARDIAC LOGIC PROCESSING CIRCUIT 74 so as to tally "multiple" P pulses since the sensing of "multiple" P pulses may provide an indication of atrial flutter, atrial fibrillation, blocked APC's and blocked PAT's. Thus, it is possible for the SHORT P-P ALARM signal to represent not only a true atrial tachycardia corresponding to the sensing of a short P-P INTERVAL, but it may represent four additional heart abnormalities, responsive to "multiple" P*s* as will now be explained.

In order to provide the SHORT P-P ALARM signal, the output from LATCH 350 is coupled to a NAND gate 358 which has, as the other input thereto, a series of P pulses developed in P-R CARDIAC LOGIC PROCESSING CIRCUIT 76, as will be explained hereinafter. The output of NAND gate 358 is coupled to a NAND gate 360 which also has, as the inputs thereto, the ENABLE B signal from SYNCHRONIZING AND ENABLE CIRCUIT 62 and the $R_{dd}$ signal developed in DELAY CIRCUIT 60. The output from NAND gate 360, in turn, is coupled to the input of NAND gate 358 and is also coupled to an XP TALLY COUNTER 362. As will now be explained, the output from NAND gate 360 is a series of XP pulses which is developed when P-P CARDIAC LOGIC PROCESSING CIRCUIT 74 senses a "true" SHORT P-P INTERVAL and is also developed when this circuit senses "multiple" P*s*.

Figure 19:
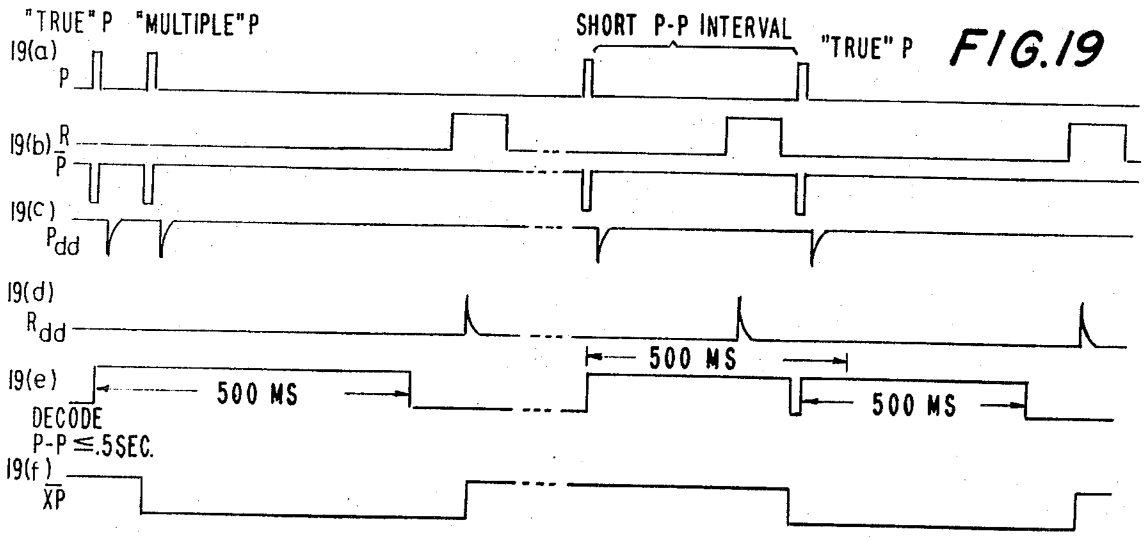
FIG. 19 is a graphical view showing waveforms helpful in understanding the operation of the P-P CARDIAC LOGIC PROCESSING CIRCUIT of FIG. 18.

Referring to FIG. 19, FIG. 19*a* and FIG. 19*b* thereof illustrate, respectively, a representative series of P pulses and R pulses. As illustrated in FIG. 19*a*, the P pulses include a "true" short P-P INTERVAL and a "multiple" P pulse. The "multiple" P pulse occurs "back-to-back" with the P pulse which proceeds it, in other words, the P pulse and the "multiple" P pulse are not separated by an R pulse corresponding to a ventricular beat. In contrast, the P pulses which comprise the short P-P INTERVAL are separated by an R pulse or ventricular signal. As will now be explained, either the occurrence of a "multiple" P pulse or a "true" short P-P INTERVAL, within a predetermined time, will cause the XP pulse signal at the output of NAND gate 360 to go "low." These are tallied by XP TALLY COUNTER 362. The predetermined time is established by the output of LATCH 350. More particularly, if a P pulse or a "multiple" P pulse is sensed during a P-P INTERVAL which is less than or equal to 0.5 seconds, the XP pulse signal goes "low."

Considering first the XP signal caused by the "multiple" P pulse, it will be appreciated that the first or "true" P pulse accomplishes two things. First, the P pulse causes the output from NAND DECODE P-P gate 338 to go "high" since the P pulse clears P-P COUNTER 332. This pulse also produces a $P_{dd}$ spike which is utilized to set LATCH 350 causing the output from this LATCH to go "high." If, during the time that NAND DECODE P-P gate 338 is "high," that is, for a time duration less than or equal to 0.5 sec., another P pulse is sensed, this will cause the output from NAND gate 360 to go "low". More particularly, the next P pulse causes the P input to NAND gate 358 to go "low." Since the output from LATCH 350 is "high," this causes the output from NAND gate 360 to go "low". The XP signal thus goes "low" and this is tallied by XP TALLY COUNTER 362. This may be seen by considering FIGS. 19*a*, 19*b*, 19*e* and and 19*f* wherein the "multiple" P signal of FIG. 19*a*, occurring during the DECODE P-P LESS THAN 0.5 SEC. INTERVAL of FIG. 19*e*, causes the output of NAND gate 360 to go "low" as indicated in FIG. 19*f*. The output from NAND gate 360 stays "low" until the $R_{dd}$ "low" going spike comes in which causes NAND gate 360 to go "high."

In a similar manner, the "true" short P-P INTERVAL results in a "true" P pulse occurring during the DECODE P-P LESS THAN 0.5 SEC. INTERVAL OF FIG. 19*e*. Again, this causes the output from NAND gate 360 to go "low" and this gate stays "low" until the next $R_{dd}$ spike comes in causing the output from this gate to go "high." Thus, either a "multiple" P pulse which is sensed within 0.5 sec. of a "true" P or atrial pulse, and a "true" short P-P INTERVAL, that is, a P-P INTERVAL less than or equal to 0.5 sec., will result in the XP pulse signal going "low".

The number of XP pulses (or the number of XP pulses) are counted in XP TALLY COUNTER 362. It has been found advantageous to generate a heart dependent tally interval and, if the number of XP pulses tallied in XP TALLY COUNTER 362 exceeds a predetermined number within the heart dependent tally interval, a SHORT P-P ALARM signal is provided. More particularly, if five XP pulses are tallied in XP TALLY COUNTER 362, within 11 R pulses or ventricular beats or cycles, a SHORT P-P ALARM signal is provided.

In order to develop the heart dependent tally interval, P-P CARDIAC LOGIC PROCESSING CIRCUIT 74 includes a count 11 R CYCLES COUNTER 364, which operates much in the manner of COUNT 60 R CYCLES COUNTER 320 of FIG. 17, and which counts 11 R pulses or ventricular beats or cycles thereafter resetting itself. More particularly, the XP output from NAND gate 360 is coupled to the reset of COUNT 11 R CYCLES COUNTER 364, via NAND gates 366, 368, the latter gates operating as a "latch" to reset the COUNTER. When the XP signal goes "low", thereby indicating either that "multiple" P or "true" short P-P INTERVAL has been sensed, the reset to COUNTER 364 goes "low" and the COUNTER is enabled to count the R pulses or ventricular beats or cycles coupled to the clock pulse input to the COUNTER. After COUNT 11 R CYCLES COUNTER 364 counts 11 R pulses or ventricular beats or cycles, the output from a NAND DECODE 11 gate 370 goes "low". This resets COUNT 11 R CYCLES COUNTER 364 and also resets XP TALLY COUNTER 362, clearing the latter to zero.

Coupled to the output of XP TALLY COUNTER 362 is a NAND DECODE 5 gate 372. If XP TALLY COUNTER 362 has not counted 5 XP pulses before this COUNTER is reset, that is, during the heart dependent tally interval as determined by 11 R pulses or ventricular beats or cycles, the output from NAND DECODE 5 gate 372 remains "high". However, if 5 XP pulses are tallied in XP TALLY COUNTER 362 before this COUNTER is reset, the output from NAND DECODE 5 gate 372 goes "low". The output from NAND DECODE 5 gate 372 is utilized as the set input to a LATCH 374 which operates, in a similar manner to LATCH 302 of FIG. 17, to go "high" when the set input from NAND DECODE 5 gate 362 goes "low." When LATCH 374 goes "low," the output from a NAND gate 376, which also has coupled thereto the 1.5 khz. signal, goes "low". This results in a SHORT P-P ALARM signal being provided at the output of NAND 376 and also results in the actuation of a SHORT P-P INDICATOR 378. Accordingly, the ALARM signal is provided when 5 XP pulses are tallied during the heart dependent tally interval. The ALARM signal ceases when the MANUAL RESET BUTTON 160*a* is actuated causing the ENABLE B reset to LATCH 374 to go "low" then "high" which resets LATCH 374 "low".

Although it is apparent that the P pulses could be sensed in a manner similar to that of FIG. 17 to provide a SHORT P-P ALARM signal, it has been found advantageous to utilize a tally sequence within a heart dependent tally interval. More particularly, this enables P-P CARDIAC LOGIC PROCESSING CIRCUIT 74 to sense "multiple" P pulses since it has been found that the occurrence of a number of "multiple" P pulses is indicative of a blocked APC, PAT with a block, atrial flutter and atrial fibrillation and the like. When one of these abnormalities is sensed, the SHORT P-P ALARM is provided. Similarly, the P-P CARDIAC LOGIC PROCESSING CIRCUIT 74 quickly provides a SHORT P-P ALARM signal upon the sensing of an atrial tachycardia (a "true" short P-P INTERVAL) since, when this occurs, 5 "true" short P-P INTERVALS will be quickly tallied within the heart dependent tally interval.

Continuing now with the development of a LONG P-P ALARM signal, reference to FIG. 20 (which illustrates part of the circuit for P-P CARDIAC LOGIC PROCESSING CIRCUIT 74, P-R CARDIAC LOGIC PROCESSING CIRCUIT 76 and JUNCTIONAL RHYTHMS CARDIAC LOGIC PROCESSING CIRCUIT 78), indicates that the P-P INTERVAL COUNT signal output from NOR gate 346 is coupled as one input to a NOR gate 378. The output from NOR gate 378 is coupled to a LATCH 380 as the reset signal thereto while the output from LATCH 380 is coupled to a NAND gate 382 which, in turn, is coupled to a NAND gate 384 by way of an INVERTER 386. The output from NAND gate 384 provides a LONG P-P ALARM signal and, as will be explained hereinafter, also provides a JUNCTIONAL RHYTHMS ALARM signal.

Referring now to FIGS. 18 and 20, it will be remembered that the P-P INTERVAL COUNT signal goes "low" if the P-P INTERVAL is greater than or equal to a 1.5 sec. duration or if the P-P INTERVAL is "intermediately long" (between 1.2 and 1.5 sec.) and if 12 of these "intermediately long" P-P INTERVALS are tallied within a heart dependent tally interval established by 12 ventricular beats or cycles.

When the input to NOR gate 378 goes "low", the set input to LATCH 380 goes "high" causing the LATCH output also to go "high." Assuming the other input to NAND gate 382 is also "high;" this causes the output of this gate to go "low". After being inverted in INVERTER 386, a "high" input signal is provided at NAND gate 384 which causes the output of this gate to go "low." NAND gate 384 is similar to the other NAND gates to which is applied the 1.5 Khz. signal and, when this gate goes "low," a LONG P-P ALARM signal is provided. This LONG P-P ALARM signal is utilized to actuate AUDIBLE ALARM 80 and is also used to actuate LONG P-P INDICATOR 388 which identifies and alerts the user to the particular abnormality which is occurring. In this case, when LONG P-P INDICATOR 388 is "on" continuously, this represents the occurrence of an atrial bradycardia, corresponding to long P-P components of the analog EKG signal, occurring in the monitored-heart. As will be explained hereinafter, when this INDICATOR "blinks," this will indicate the occurrence of a junctional rhythm in the monitored-heart which is sensed by sensing and counting MISSED Ps.

Thus, to summarize the operation of P-P CARDIAC LOGIC PROCESSING CIRCUIT 74, this part of the cardiac monitor of the present invention allows the cardiac monitor to sense atrial bradycardias and tachycardias and various other cardiac abnormalities, i.e., blocked APC, atrial flutter, etc., in the monitored-heart and provides various ALARM signals and actuates various INDICATORS responsive thereto.

THE P-R CARDIAC PROCESSING LOGIC CIRCUIT

Figure 13:
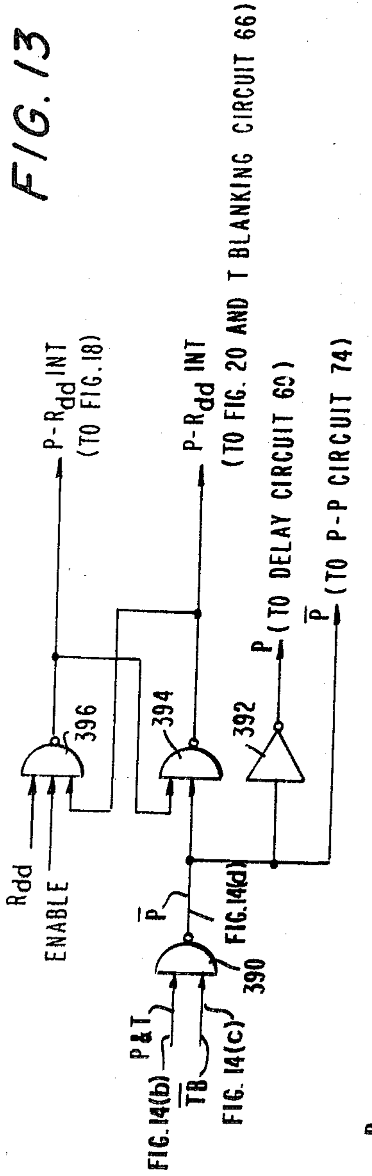
FIG. 13 is a circuit schematic showing the logic circuitry of part of the P-R CARDIAC LOGIC PROCESSING CIRCUIT of the present invention.
Figure 14:
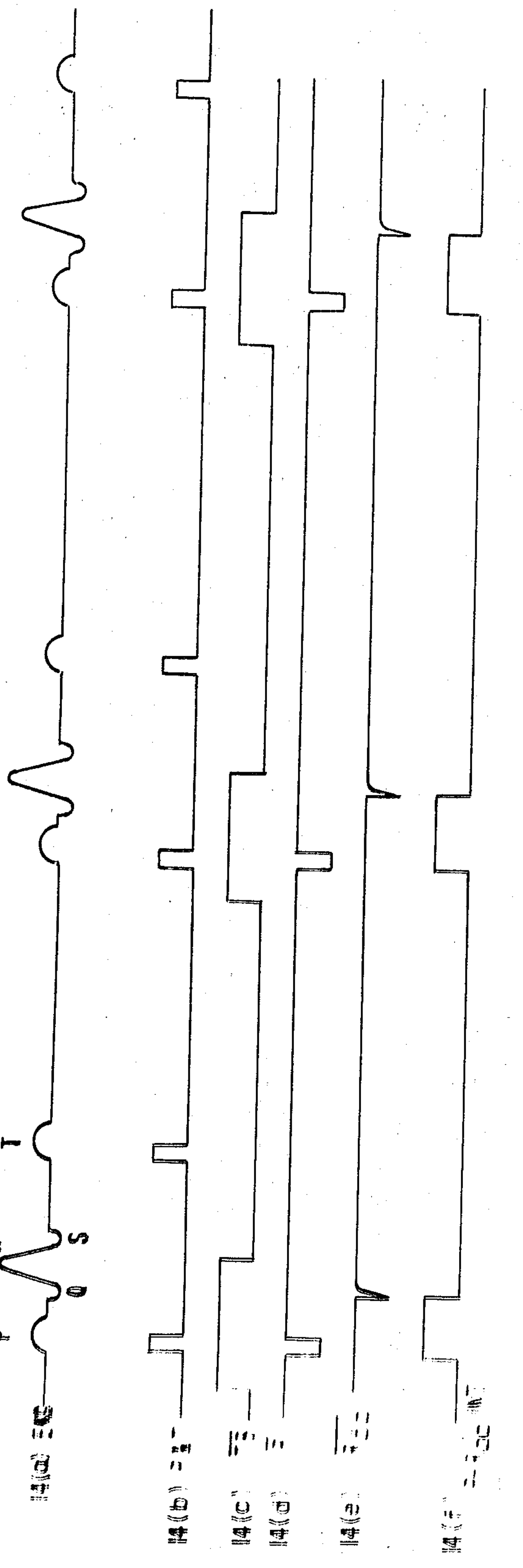
FIG. 14 is a graphical view of waveforms helpful in understanding the operation of the circuit schematic of FIG. 13.

FIGS. 13 and 20 illustrate the circuitry utilized in P-R CARDIAC LOGIC PROCESSING CIRCUIT 74. Referring to FIG. 13, the T BLANKING signal from VARIABLE RATE T BLANKING CIRCUIT 66 and the P & T signal from DELAY CIRCUIT 60 are coupled as inputs to a NAND gate 390. These input signals are illustrated in FIGS. 14*b* and 14*c*. The output from NAND gate 390 is a series of P pulses, illustrated in FIG. 14*d* and, as illustrated in this waveform and by comparing FIG. 14*b* to FIG. 14*d*, the T BLANKING signal input to NAND gate 390 serves to "blank" the T pulses from the series of P & T pulses. Thus, after inverting the output from NAND gate 390 in an INVERTER 392, the output provided is a series of P pulses which correspond to the atrial or P component of the analog EKG signal. These pulses are utilized elsewhere in the cardiac monitor of the present invention, for example, this signal is coupled as an input to DELAY CIRCUIT 60. The P signal output from NAND gate 390 is also utilized elsewhere in the cardiac monitor, for example, this signal is coupled to P-P CARDIAC LOGIC PROCESSING CIRCUIT 74, as the input to NAND gate 352.

The P signal output from NAND gate 390 is also utilized in FIG. 13 to develop a P-$R_{dd}$ INTERVAL signal and a P-$R_{dd}$ INTERVAL signal. More particularly, the output from NAND gate 390 is coupled as one input to a NAND gate 394 which has, as the other input thereto, the output from a NAND gate 396. Applied as inputs to NAND gate 396 is the $R_{dd}$ signal from DELAY CIRCUIT 60 and the ENABLE signal from SYNCHRONIZING AND ENABLE CIRCUIT 62.

As illustrated in FIG. 14*f*, the output from NAND gate 394 is a series of P-$R_{dd}$ INTERVAL pulses which go "high" from the start of the atrial or P component of the analog EKG signal to approximately the start of the ventrical or R component of the EKG signal. More particularly, the output from NAND gate 394 goes "high" when the P signal of FIG. 14*d* goes "low" and this gate stays "high" until the $R_{dd}$ signal input spike to NAND gate 396 goes "low". In a similar manner, the output from NAND gate 396 is a series P-$R_{dd}$ INTERVAL pulses which go "low" from the start of the atrial or P pulse to approximately the start of the ventricular or R pulse.

Referring now to FIG. 20, P-R CARDIAC LOGIC PROCESSING CIRCUIT 76 includes a P-R COUNTER 396. As was the case with R-R COUNTER 268 of FIG. 17 and P-P COUNTER 332 of FIG. 18, the P-R COUNTER of FIG. 20 is utilized to count clock pulses to provide an indication of the time duration of the P-R INTERVAL. Specifically, P-R COUNTER 396 is utilized to count CL2 clock pulses, provided from the output of CLOCK AND TIMING CIRCUIT 64, when the reset to this COUNTER is "low." The reset to COUNTER 396 is provided by the P-$R_{dd}$ INTERVAL signal output from NAND gate 396 of FIG. 13. Since the input to this COUNTER is low only during the P-R INTERVAL, it is apparent that P-R COUNTER 396 will count CL2 clock pulses, to provide an indication of whether the P-R INTERVAL is long, short or normal, during the P-R INTERVAL.

More particularly, P-R CARDIAC LOGIC PROCESSING CIRCUIT 76 provides a LONG P-R ALARM signal at the output of a NAND gate 398 when the P-R INTERVAL exceeds a predetermined time duration. By way of example, when the P-R INTERVAL is equal to or greater than 0.22 sec., a long P-R ALARM signal is provided. In order to develop the long P-R ALARM signal, the various output BITS from P-R COUNTER 396, corresponding to the number of CL2 clock pulses equalling 0.22 sec., are coupled as the inputs to a NAND gate 400. When all the inputs to this gate go "high", thus indicating that the P-R INTERVAL exceeds the predetermined time duration of 0.22 seconds, the output from this gate goes "low". In order to avoid false positives which may result from P-R COUNTER 396, NAND gate 400 also has coupled as one input thereto the P-$R_{dd}$ INTERVAL signal from FIG. 13 which insures that the output from NAND gate 400 "decodes" only during the time that the P-R INTERVAL is being sensed.

As with the other CARDIAC LOGIC PROCESSING CIRCUITS, the output from NAND gate 400 is utilized as the set input to a LATCH 400 which has, as the reset thereto, the ENABLE B signal from SYNCHRONIZING AND ENABLE CIRCUIT 62. When the output from NAND gate 400 goes "low", this causes the output of LATCH 402 to go "high" and the output from NAND gate 398 goes "low". This results in a LONG P-R ALARM signal being provided at the output of NAND gate 398 and also results in actuation of a LONG P-R INDICATOR 404. The occurrence of a LONG P-R INTERVAL is responsive to an abnormal AV conduction which is sensed by the cardiac monitor (such as first degree AV block, second and third degree AV block, etc.).

Additionally, it should be noted that the output of P-R COUNTER 396 provides a P-R COUNTER DE- CODE PRIME signal which is utilized in the VARIABLE RATE T BLANKING CIRCUIT 66.

THE JUNCTIONAL RHYTHM CARDIAC LOGIC PROCESSING CIRCUIT

P-R COUNTER 396 of P-R CARDIAC LOGIC PROCESSING CIRCUIT 76 may be utilized to provide an immediate alarm upon sensing of a short P-R INTERVAL, that is, an interval less than a predetermined time duration. However, as will be explained, it is advantageous to count or tally a predetermined number of short P-R INTERVALS, tallying these intervals in a heart dependent tally interval, since it has been found that this provides an indication of junctional rhythms which are occurring within the monitored-heart. An indication that junctional rhythms are occurring in the monitored-heart is also provided by sensing and tallying, within a heart dependent tally interval, the number of MISSED P pulses in the monitored-heart.

The cardiac monitor of the present invention includes a JUNCTIONAL RHYTHM CARDIAC LOGIC PROCESSING CIRCUIT 78, shown in FIG. 20, which is utilized to provide two JUNCTIONAL RHYTHM ALARM signals, one responsive to short P-R INTERVALS and the other responsive to MISSED P pulses. Both of the JUNCTIONAL RHYTHM ALARM signals, responsive to MISSED P pulses or responsive to short P-R INTERVALS, are tallied within a heart dependent tally interval generated by a COUNT 128 R CYCLES COUNTER 406 disposed within JUNCTIONAL RHYTHM CARDIAC LOGIC PROCESSING CIRCUIT 78. The output of COUNT 128 R CYCLES COUNTER 406 is coupled to a NAND DECODE 128 gate 408, the output of which goes "low" after the COUNTER has counted 128 R pulses or ventricular beats or cycles.

COUNT 128 R CYCLES COUNTER 406 is actuated to count R pulses by the output from a LATCH 410 which has two set inputs and two reset inputs. One of the set inputs to LATCH 410 is the MISSED P signal which is developed in P-P CARDIAC LOGIC PROCESSING CIRCUIT 74, at the output of NAND gate 354 of FIG. 18. The other set input to LATCH 410 is a SHORT P-R signal developed from P-R COUNTER 396. Of the two reset inputs to LATCH 410, one reset input is provided from the output of NAND DECODE 128 gate 408 while the other reset input is the ENABLE B signal developed in SYNCHRONIZING AND ENABLE CIRCUIT 62.

When either the MISSED P or the SHORT P-R set input to LATCH 410 goes "low," the output of the LATCH goes "low." Since this output is coupled as the reset to COUNT 128 R CYCLES COUNTER 406, this enables the COUNTER to count the series of R pulses which are coupled to the clock pulse input of COUNTER 406 from ANALOG TO DIGITAL CONVERTER 56. COUNT 128 R CYCLES COUNTER 406 is adapted to count 128 R pulses or ventricular beats or cycles at which time the output from NAND DECODE 128 gate 408 goes "low," resetting LATCH 410 and causing the output of the LATCH to go "high" which, in turn, causes the reset input to COUNTER 406 also to go "high." This resets and clears the COUNTER. Accordingly, a heart dependent tally interval, corresponding to 128 R pulses or ventricular beats or cycles, is established. If, during the heart dependent tally interval, the JUNCTIONAL RHYTHM CARDIAC LOGIC PROCESSING CIRCUIT 78 senses 12 MISSED P pulses or 12 short P-R INTERVALS, a JUNCTIONAL RHYTHM ALARM signal is provided.

Referring to the MISSED P pulses, JUNCTIONAL RHYTHM CARDIAC LOGIC PROCESSING CIRCUIT 78 includes a MISSED P TALLY COUNTER 412 which is adapted to count, during the heart dependent tally interval, the MISSED P pulses applied to the clock pulse input to this COUNTER. More particularly, during the time that LATCH 410 is "low," that is, during the heart dependent tally interval established by COUNT 128 R CYCLES COUNTER 406, the MISSED P TALLY COUNTER 412 counts or tallys the MISSED P pulses coupled thereto. This, of course, is responsive to the MISSED P pulses being sensed by the cardiac monitor.

At the end of the heart dependent tally interval, the output from LATCH 410 goes "high" clearing and resetting to zero MISSED P TALLY COUNTER 412. If, however, during the heart dependent tally interval, MISSED P TALLY COUNTER 412 counts or tallies 12 MISSED P signals, the output of a NAND DECODE 12 gate 414, which is coupled to the output of COUNTER 412, will go "low."

The output from NAND DECODE 12 gate 414 is coupled as the other input to NOR gate 378. As was the case when the P-P INTERVAL COUNT input to this NOR gate went "low," the output of LATCH 380 goes "high" which, in turn, causes the output from NAND gate 384 to go "low." When NAND gate 384 goes "low," this results in an ALARM signal being generated at the output of this gate and also results in actuation of INDICATOR 388.

It is advantageous, however, to differentiate between the ALARM signal at the output of NAND gate 384 which results when the cardiac monitor senses a long P-P INTERVAL from that ALARM signal which is caused by the sensing of MISSED P pulses. In other words, it is advantageous to differentiate between the ALARM signals responsive, respectively, to an atrial bradycardia and to a MISSED P junctional rhythm. In order to differentiate between these two abnormalities, the output from NAND DECODE 12 gate 414 is also coupled as the set input to a LATCH 416. LATCH 416 is reset by the ENABLE B signal and has an output which is coupled to a NAND gate 418. The other input to NAND gate 418 is provided from the output of a FLIP FLOP 420 which has, as the input thereto, the series of R pulses provided by ANALOG TO DIGITAL CONVERTER 56. The output from NAND gate 418 is coupled as the other input to NAND gate 382.

When the output from NAND DECODE 12 gate 414 goes "low," responsive to the sensing of a predetermined number of MISSED P pulses occurring within the heart dependent tally interval, the input to NAND gate 382 from LATCH 380 goes "high" and remains "high" until the time that LATCH 380 is set by the ENABLE B signal applied thereto. The output from NAND DECODE 12 gate 414 further causes the output from LATCH 416 to go "low." Accordingly, the input to NAND gate 418 from LATCH 416 will remain "low" until LATCH 416 is reset by the ENABLE B signal. However, the other input to NAND gate 418 from FLIP FLOP 420 goes "high" and then goes "low" at a rate determined by the R pulses applied to the FLIP FLOP. Accordingly, the output from NAND gate 418, which is also the input to NAND gate 382, goes "high" and "low" at a rate determined by the patient's ventricular heartbeat. Consequently, the output from NAND gate 384 goes "low" and "high" (neglecting the time that this gate changes due to the 1.5 Khz. signal applied thereto since this is for power conservation purposes only) at a particular rate.

It will be appreciated, therefore, that when the cardiac monitor senses an atrial bradycardia, a long P-P ALARM signal is provided at the output of NAND gate 384. This ALARM signal is steady and LONG P-P INDICATOR 388 is actuated in a continuous manner. On the other hand, when the cardiac monitor senses a junctional rhythm abnormality caused by MISSED *Ps*, the JUNCTIONAL RHYTHM ALARM signal output from NAND gate 384 is a blinking-type signal and JUNCTIONAL RHYTHM INDICATOR 388 flashes on and off. Thus, it is possible to differentiate between the LONG P-P ALARM and the JUNCTIONAL RHYTHM ALARM signals.

Considering now the development of a JUNCTIONAL RHYTHM ALARM signal responsive to the sensing of short P-R INTERVALS, the BIT outputs from P-R COUNTER 396, corresponding to the sensing by this COUNTER of short P-R INTERVALS, are coupled as the inputs to a NAND DECODE P-R gate 422. Also coupled as an input to this gate is the $P\text{-}R_{dd}$ INTERVAL signal, the latter applied to gate 422 to prevent false positives generated at the output of COUNTER 396. The output of NAND DECODE P-R gate 422 is a SHORT P-R DECODE signal which goes "low" when the P-R INTERVAL is less than a predetermined time duration, for example, less than 0.12 sec. which, of course, is sensed by the number of CL2 clock pulses being counted by P-R COUNTER 396.

The SHORT P-R DECODE signal, which is generated in the portion of FIG. 20 corresponding to P-R CARDIAC LOGIC PROCESSING CIRCUIT 76, is coupled as the reset input to a LATCH 424 in JUNCTIONAL RHYTHM CARDIAC LOGIC PROCESSING CIRCUIT 78. Coupled as the set input to LATCH 424 is the $P_{dd}$ signal developed in DELAY CIRCUIT 60. LATCH 424 operates in a similar fashion to LATCH 286 of FIG. 17 and provides an output signal which goes "high" when the P-R COUNTER 396 senses a short (less than or equal to 0.12 sec.) P-R INTERVAL.

The output from LATCH 424 is coupled as one input to a NAND gate 426. The other input to NAND gate 426 is provided from the output of an INVERTER 428 which takes the $R_d$ signal, coupled from DELAY CIRCUIT 60, and inverts the same to provide an $R_d$ signal input to NAND gate 426. Remembering that the $R_d$ signal is a series of spikes which go "low" a short time before the end of the $P\text{-}R_{dd}$ INTERVAL, the output from NAND gate 426 is a series of spikes which go "low" each time P-R COUNTER 396 has sensed a short P-R INTERVAL. Thus, each time the output from NAND gate 426 goes "low," this is an indication that the cardiac monitor has sensed a short P-R INTERVAL.

The output from NAND gate 426, termed the SHORT P-R signal, is coupled to LATCH 410. As was the case with the MISSED P input to this LATCH, when the output of NAND gate 426 goes "low," this causes the output of LATCH 410 to go "low." When LATCH 410 goes "low," COUNT 128 R CYCLES COUNTER 406 starts counting R pulses or ventricular beats or cycles thus establishing the heart dependent tally interval.

The SHORT P-R signal output from NAND gate 426 is also coupled as the clock pulse input to a SHORT P-R TALLY COUNTER 430. This COUNTER is rendered operable by the reset input to the COUNTER from LATCH 410 to count the number of SHORT P-R INTERVALS, sensed by P-R COUNTER 396 and indicated by the SHORT P-R signal, when the output from LATCH 410 goes "low," that is, during the heart dependent tally interval. If, during the heart dependent tally interval SHORT P-R TALLY COUNTER 430 tallies or counts 12 SHORT P-R signals, corresponding to 12 short P-R INTERVALS, the output from NAND DECODE 12 gate 432 goes "low." Of course, if during the heart dependent tally interval COUNTER 430 does not count or tally 12 short P-R INTERVALS, the COUNTER is reset and the output from NAND DECODE 12 gate 432 remains "high".

The output from NAND DECODE 12 gate 432 is coupled as the set input to a LATCH 434. When SHORT P-R TALLY COUNTER 430 counts or tallies 12 short P-R INTERVALS, the output from LATCH 434 goes "high" causing the output from a NAND gate 436 to go "low". This provides a JUNCTIONAL RHYTHM ALARM signal at the output of NAND gate 436 and also actuates a JUNCTIONAL RHYTHM INDICATOR 438. Thus, an ALARM signal is provided which is utilized to actuate AUDIBLE ALARM 80. It will be appreciated that this JUNCTIONAL RHYTHM ALARM signal is responsive to a predetermined number of short P-R INTERVALS being counted or tallied during a heart dependent tally interval.

To summarize the operation of JUNCTIONAL RHYTHM CARDIAC LOGIC PROCESSING CIRCUIT 78, this provides two JUNCTIONAL RHYTHM ALARM signals, one of such signals being responsive to short P-R INTERVALS and the other signal responsive to MISSED P pulses, the latter being a blinking ALARM signal to distinguish it from the steady LONG P-P ALARM signal developed in P-P CARDIAC LOGIC PROCESSING CIRCUIT 74 and responsive to an atrial bradycardia.

THE PVC CARDIAC LOGIC PROCESSING CIRCUIT

Figures 21, 23:
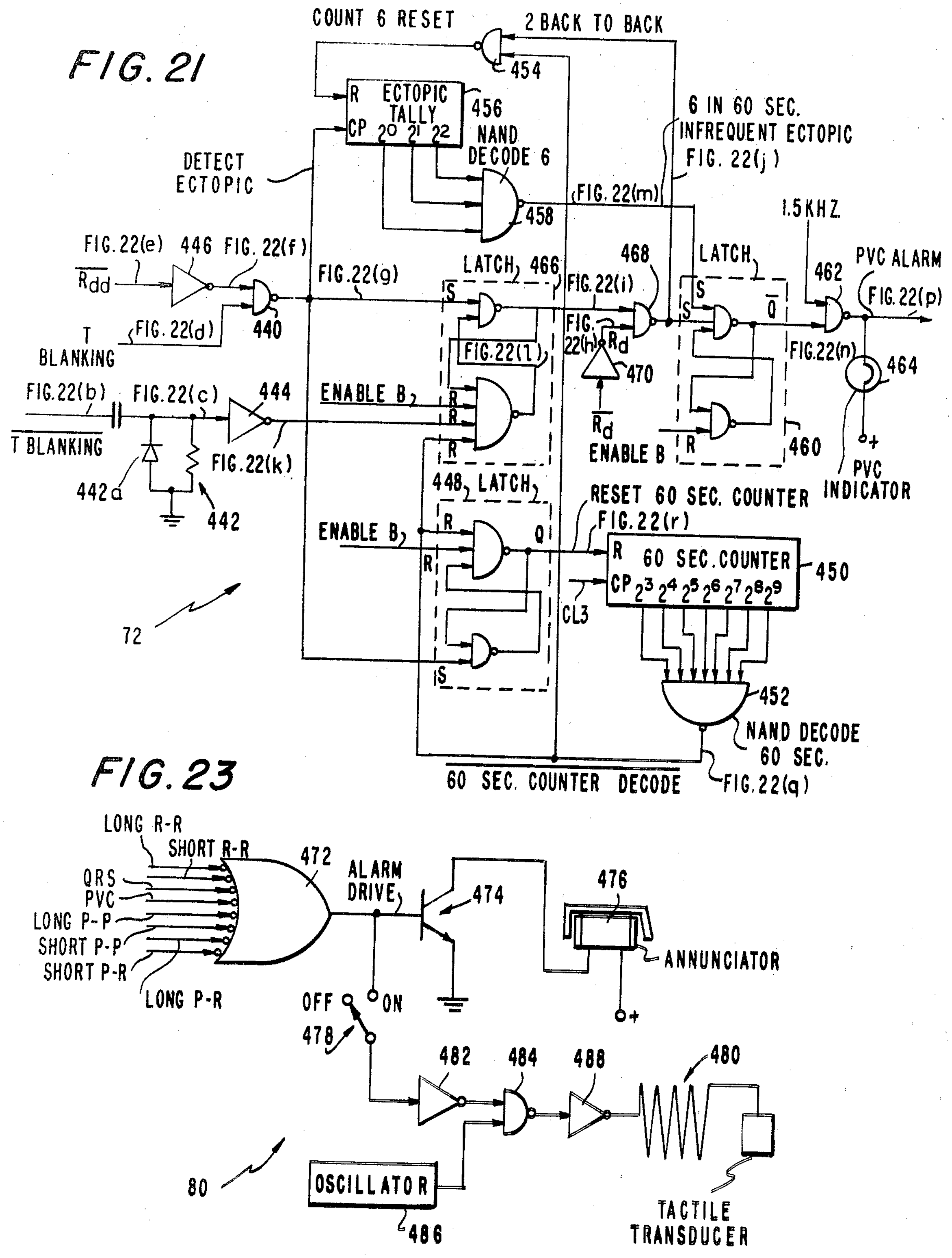
FIG. 21 is a circuit schematic of the logic circuitry of the PVC CARDIAC LOGIC PROCESSING CIRCUIT of the invention.
FIG. 23 is a circuit schematic of the ALARM CIRCUIT of the present invention.

PVC CARDIAC LOGIC PROCESSING CIRCUIT 72 is illustrated in FIG. 21 and is utilized to sense premature ventricular contractions to provide a PVC ALARM signal when either of two conditions are sensed. More particularly, a PVC ALARM signal is provided if two ectopic ventricular contractions are sensed "back-to-back." A PVC ALARM signal is also provided if six ectopic ventricular contractions are sensed within a time dependent tally interval, for example, if six ectopic ventricular contractions are sensed within 60 seconds.

Figure 22:
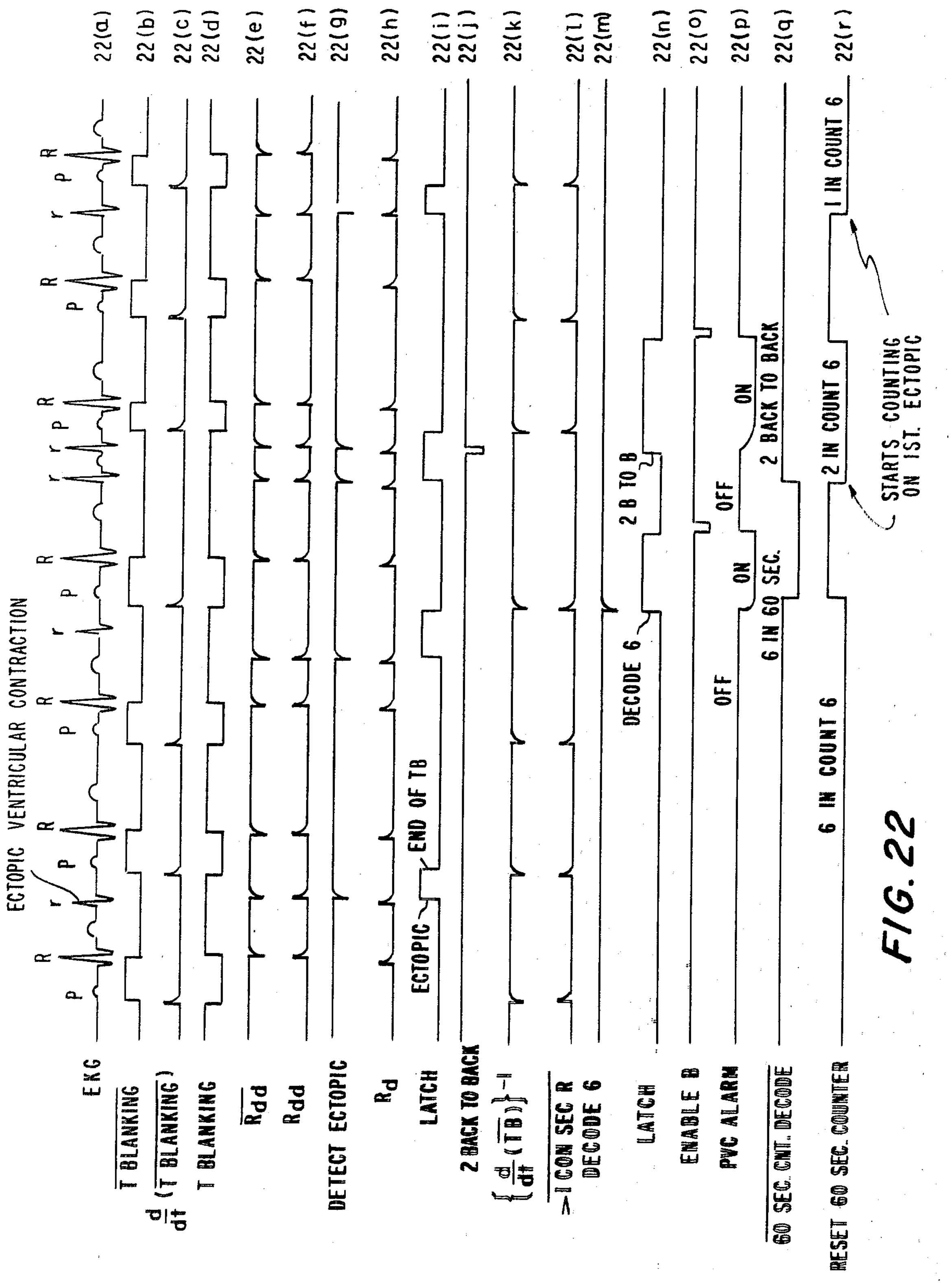
FIG. 22 is a graphical view illustrating various waveforms useful in understanding the operation of the PVC CARDIAC LOGIC PROCESSING CIRCUIT of FIG. 21.

Referring to FIG. 21, which shows the details of the logic circuitry, and to FIG. 22, which shows waveforms helpful in understanding the operation of the logic circuitry, it will be appreciated that the normal sequence of atrial and ventricular pulses in the EKG signal is as follows: PRPRPR, etc. However, it is possible that an ectopic ventricular pulse may occur — in which case the sequence will be as follows: PRrPRPR, etc. In this sequence, the *r* is defined as an ectopic ventricular contraction. Although ectopic ventricular contractions may occur in healthy hearts, the occurrence of the ectopic beats are infrequent. However, if a predetermined number of ectopic ventricular contractions occur within a predetermined time duration, this is an indication of premature ventricular contractions or PVCs in the monitored-heart. Accordingly, PVC CARDIAC LOGIC PROCESSING CIRCUIT 72 senses ectopic ventricular contractions and if six ectopic ventricular contractions occur within 60 seconds, an alarm is provided.

Also indicative of premature ventricular contractions is the occurrence of two ectopic ventricular contractions "back-to-back." Referring to FIG. 22*a*, this results in an atrial and ventricular sequence as follows: PRrrPR. The occurrence of two ectopic ventricular contractions (*rr*) back to back immediately provides a PVC ALARM signal.

As indicated in FIG. 21, both the T BLANKING and the T BLANKING signals from VARIABLE RATE T BLANKING CIRCUIT 66 are coupled to PVC CARDIAC LOGIC PROCESSING CIRCUIT 72. The T BLANKING signal is coupled as one input to a NAND gate 440 while the T BLANKING signal is differentiated in a DIFFERENTIATING NETWORK 442. As indicated in FIG. 22*c*, the output from DIFFERENTIATING NETWORK is a series of spikes which correspond to the rising edge of the T BLANKING signals. Diode 442*a* is provided to shunt to ground the negatively going spikes (not shown) which correspond to the falling or trailing edge of the T BLANKING interval. The differentiated T BLANKING signal is inverted in an INVERTER 444 to provide the signal illustrated in FIG. 22*k*. The other input to NAND gate 440 is the $R_{dd}$ signal of FIG. 22*f*. This is provided by taking the $R_{dd}$ signal (FIG. 22*e*) from DELAY CIRCUIT 60 and inverting this signal in an INVERTER 446. Under "normal" circumstances, the output of NAND gate 440 is "high." However, when the output from this gate goes "low," this indicates than an ectopic ventricular contraction has been sensed by the cardiac monitor.

More particularly, the output from NAND gate 440 goes "low" when both the T BLANKING and the $R_{dd}$ signal inputs to this gate are "high". It will be appreciated that an $R_{dd}$ signal is provided at the output of INVERTER 446 each time an R or ventricular pulse is sensed. Since the T BLANKING interval extends from after the "normal" R pulse or ventricular beat to just before the P pulse or atrial beat, any ventricular beat which is sensed during the T BLANKING interval must be an ectopic ventricular contraction. Thus, if an $R_{dd}$ signal occurs during the T BLANKING interval, the output from NAND gate 440 goes "low," and, as illustrated in FIG. 22*g*, this corresponds to the occurrence of an ectopic ventricular contraction or *r* pulse of FIG. 22*a*.

The output from NAND gate 440 is coupled to the set input of a LATCH 448 which, in turn, is coupled to a 60 SECOND COUNTER 450. When the input to LATCH 448 goes "low" (indicating an ectopic ventricular contraction), the output of the LATCH goes "low." The LATCH output is coupled as the reset to 60 SECOND COUNTER 450 and, therefore, when an ectopic ventricular contraction is sensed, this enables the COUNTER to count CL3 clock pulses applied to the clock pulse input thereto. The BIT outputs of 60 SECOND COUNTER 450 are coupled to a NAND DECODE 60 SECOND gate 452 and the output of NAND DECODE 60 SECOND gate 452 provides a 60 SEC. COUNTER DECODE signal which goes "low" (see FIG. 22(q)) when COUNTER 450 has counted CL3 clock pulses corresponding to a time duration of 60 seconds.

The 60 SEC. COUNTER DECODE signal is coupled to one of the reset inputs of LATCH 448 the other reset input being the ENABLE B signal. Thus, when the output of NAND DECODE 60 SECOND gate 452 goes "low", this causes the output from LATCH 448 to go "high" (see FIG. 22*r*) which resets 60 SECOND COUNTER 450, clearing the same to zero. Thus, 60 SECOND COUNTER 450 is similar to the other COUNTERS in the cardiac monitor and provides a tally interval, that is, the COUNTER starts counting clock pulses when the cardiac monitor senses a particular cardiac signal. However, COUNTER 450 is not "heart dependent" but is "time dependent" thereby providing a time dependent tally interval as will be explained in more detail hereinafter.

The output from NAND DECODE 60 SECOND gate 452 is also coupled as one input to a NAND gate 454, which is coupled as the reset to an ECTOPIC VENTRICULAR TALLY COUNTER 456. This COUNTER is adapted to count or tally ectopic ventricular contractions by sensing and tallying the number of times that the output from NAND gate 440, which is applied as the clock pulse input to COUNTER 456, goes "low." By way of example, ECTOPIC VENTRICULAR TALLY COUNTER 456 is adapted to count or tally six ectopic ventricular contractions during the time dependent tally interval (as established by 60 SECOND COUNTER 450). If ECTOPIC VENTRICULAR TALLY COUNTER 456 counts or tallies six ectopic ventricular contractions during this tally interval, the output of a NAND DECODE 6 gate 458, illustrated in FIG. 22*m*, will go "low." This output is coupled as a reset input to a LATCH 460 and, when the reset input to this LATCH goes "low," this causes the output of the LATCH, which is illustrated in FIG. 22*n*, to go "high."

The output of LATCH 460 is coupled as one input to a NAND gate 462 which has, as the other input thereto, the 1.5 Khz. signal applied from CLOCK AND TIMING CIRCUIT 64. When the output of LATCH 460 goes "high," this causes the output of NAND gate 462 to go "low," thereby providing a PVC ALARM signal at the output of this gate. This also actuates a PVC INDICATOR 464 which is coupled to the output of NAND gate 462. Thus, if ECTOPIC VENTRICULAR TALLY COUNTER 456 counts or tallies six ectopic ventricular contractions during the time dependent tally interval established by 60 SECOND COUNTER 450, a PVC ALARM signal is provided at the output of NAND gate 462 and PVC INDICATOR 464 is actuated.

The PVC INDICATOR 464 is also actuated and a PVC ALARM signal is also provided if two ectopic ventricular contractions are sensed back-to-back. In order to accomplish this, PVC CARDIAC LOGIC PROCESSING CIRCUIT 72 includes a LATCH 466. The set input to LATCH 466 is provided from the output of NAND gate 440. Each time the PVC CARDIAC LOGIC PROCESSING CIRCUIT senses an ectopic ventricular contraction, that is, each time the output from NAND gate 440 goes "low", the output of LATCH 466, which is illustrated in FIG. 22*in* goes "high". The reset to LATCH 466 is provided from the output of an INVERTER 444, shown in FIG. 22*k*, which goes "low" at the end of the T BLANKING INTERVAL. When this occurs, this causes the output of LATCH 466 to go "low". Thus, the output of LATCH 466 goes "high" when an ectopic ventricular contraction is sensed and the LATCH remains "high" until the end of the T BLANKING INTERVAL at which time the output of thee LATCH goes "low" (see FIG. 22*i*). The ENABLE B signal and the output from NAND DECODE 60 SECOND gate 452 are also provided as two other resets to LATCH 466.

The output from LATCH 466 is coupled as one input to a NAND gate 468. The other input to NAND gate 468 is the $R_d$ signal, illustrated in FIG. 22*h*, which is obtained by inverting, in an INVERTER 470, the $R_d$ signal from DELAY CIRCUIT 60. The output from NAND gate 468, illustrated in FIG. 22*j*, is applied as the set input to LATCH 460 and is also applied as the other input to NAND gate 454. As illustrated in FIG. 22*j*, the output of NAND gate 468 goes "low" when $R_d$ pulse occurs during the time that LATCH 466 is "high." Since LATCH 466 is caused to go "high" at the occurrence of a first ectopic ventricular contraction, the output of NAND gate 468 goes "low" upon the occurrence of a second ectopic ventricular contraction occurring before the time that LATCH 466 is reset "low." Thus, the output of NAND gate 468 goes "low" when two ectopic ventricular contractions occur "back-to-back."

When the output of NAND gate 468 goes "low," this causes the output of LATCH 460 to go "high" (see FIG. 22*n*), causing the output of NAND gate 462 to go "low." Thus, a PVC ALARM signal is provided at the output of NAND gate 462 and PVC INDICATOR 464 is actuated. This is illustrated in FIG. 22*p*. The ALARM signal will stay "low" until the ENABLE B input to LATCH 460 resets the LATCH causing the LATCH causing the output of NAND gate 462 to go "high." This occurs when the MANUAL RESET BUTTON 160a is actuated.

In operation, PVC CARDIAC LOGIC PROCESSING CIRCUIT 72 provides a PVC ALARM signal when 6 ectopic ventricular contractions are tallied within the time dependent tally interval and also when two ectopic ventricular contractions are sensed back-to-back. In a typical operation sequence, the output of NAND gate 440 goes "low" upon the occurrence of an ectopic ventricular contraction. This starts 60 SECOND COUNTER 450 counting CL3 clock pulses thereby establishing the time dependent tally interval. COUNTER 450 counts for 60 seconds and is then reset. The number of ectopic ventricular contractions are counted in ECTOPIC VENTRICULAR CONTRACTION TALLY COUNTER 456 and if six ectopic ventricular contractions are tallied within the time dependent tally interval, the output of NAND DECODE 6 gate 458 goes "low" causing the output of LATCH 460 to go "high". This results in a PVC ALARM signal being provided at the output of NAND gate 462. On the other hand, if the time dependent tally interval passes before six ectopic ventricular contractions are tallied, COUNTER 456 is reset and no ALARM signal is provided.

The occurrence of an ectopic ventricular contraction also sets LATCH 466 causing the output of this LATCH to go "high." If another ectopic ventricular contraction is sensed while LATCH 466 is "high," the output of NAND gate 468 will go "low" indicating that two ectopic ventricular contractions have occurred back-to-back. This also causes the output of LATCH 460 to go "high" providing a PVC ALARM signal at the output of NAND gate 462. Upon the occurrence of two ectopic ventricular contractions back-to-back, ECTOPIC VENTRICULAR TALLY COUNTER 456 is reset and cleared at zero.

THE AUDIBLE ALARM

AUDIBLE ALARM 80 is illustrated in FIG. 23. The AUDIBLE ALARM includes a NOR gate 472 which has as inputs the various ALARM signals generated in the CARDIAC LOGIC PROCESSING CIRCUITS 68–78. More particularly, the LONG R-R ALARM signal (indicative of a ventricular bradycardia) and the SHORT R-R ALARM signal (indicative of a ventricular tachycardia) generated in R-R CARDIAC LOGIC PROCESSING CIRCUIT 68; the QRS ALARM signal (indicative of a long ventricular contraction) generally in QRS CARDIAC LOGIC PROCESSING CIRCUIT 70; the LONG P-P ALARM signal (indicative of an atrial bradycardia and a junctional rhythm) generated, respectively, in P-P CARDIAC LOGIC PROCESSING CIRCUIT 74 and JUNCTIONAL RHYTHM CARDIAC LOGIC PROCESSING CIRCUIT 78 and the SHORT P-P ALARM signal (responsive to atrial tachycardia) generated in P-P CARDIAC LOGIC PROCESSING CIRCUIT 74; the LONG P-R ALARM signal (indicative of atrial to ventricular conduction) generated in P-R CARDIAC LOGIC PROCESSING CIRCUIT 76; and, the SHORT P-R ALARM signal (responsive to junctional rhythms) and generated in JUNCTIONAL RHYTHM CARDIAC LOGIC PROCESSING CIRCUIT 78 are all coupled as inputs to NOR gate 472. When any of these ALARM inputs to NOR gate 472 go "low, " the output of the gate goes "high."

The output of NOR gate 472 is coupled to the base of a TRANSISTOR 474. The emitter elctrode of this TRANSISTOR is connected to ground while the collector electrode is coupled to an ANNUNCIATOR 476 which is connected to TRANSISTOR 476 and a source of power (not shown).

Also coupled to the output of NOR gate 472 is a SELECTOR SWITCH 478. This allows a TACTILE TRANSDUCER, generally designated 480, to be coupled to the output of NOR gate 472. More particularly, the SELECTOR SWITCH 478 is coupled to an INVERTER having an output which is coupled as one input to a NAND gate 484. The other input to NAND gate 484 is provided from a conventional OSCILLATOR 486. The output of NAND gate 484 is coupled, via an INVERTER 488, to TACTILE TRANSDUCER 480.

In operation, when the cardiac monitor of the present invention provides one of the numerous ALARM signals described in detail hereinbefore, the output of NOR gate 472 goes "high". This causes TRANSISTOR 474 to be rendered on which, in turn, completes a power path for ANNUNCIATOR 476. By way of example, ANNUNCIATOR 476 may be a bell, chime, or other mechanism which, when operated, provides an audible signal. Thus, when one of the many ALARM signals are provided, ANNUNCIATOR 476 is operated to provide an audible signal which calls the patient's or user's attention to the fact that the cardiac monitor has sensed a heart abnormality. Of course, the particular abnormality which is occurring is identified by actuation of one of the INDICATORS described hereinbefore.

It is often desirable not only to actuate ANNUNCIATOR 476 upon the occurrence of a heart abnormality but also to actuate TACTILE TRANSDUCER 480. For example, the pateint or user of the cardiac monitor may be asleep and may not hear the ANNUNICATOR. When it is desired to utilize TACTILE TRANSDUCER 480, SELECTOR SWITCH 478 is moved to its ON position. When the output of NOR gate 472 goes "high," this causes the output of INVERTER 488 to go "low" at a frequency dependent on the frequency of OSCILLATOR 486. The output of INVERTER 488 may be utilized to actuate TACTILE TRANSDUCER 480 thereby awaking the patient or providing a further indication that a cardiac abnormality is occurring

THE ALTERNATIVE EMBODIMENTS

Although the various CARDIAC LOGIC PROCESSING CIRCUITS have been described as including circuitry for tallying signals, whether in a heart dependent tally interval or a time dependent tally interval, it is apparent from the teachings of the present invention that it is possible to provide an ALARM signal by directly sensing the time duration between the various components of the analog EKG signal. By way of example, FIG. 24 illustrates an R-R CARDIAC LOGIC PROCESSING CIRCUIT 68' which is adapted to provide a LONG R-R ALARM and a SHORT R-R ALARM signal by directly sensing the time duration of the R-R INTERVAL.

Figures 24, 25:
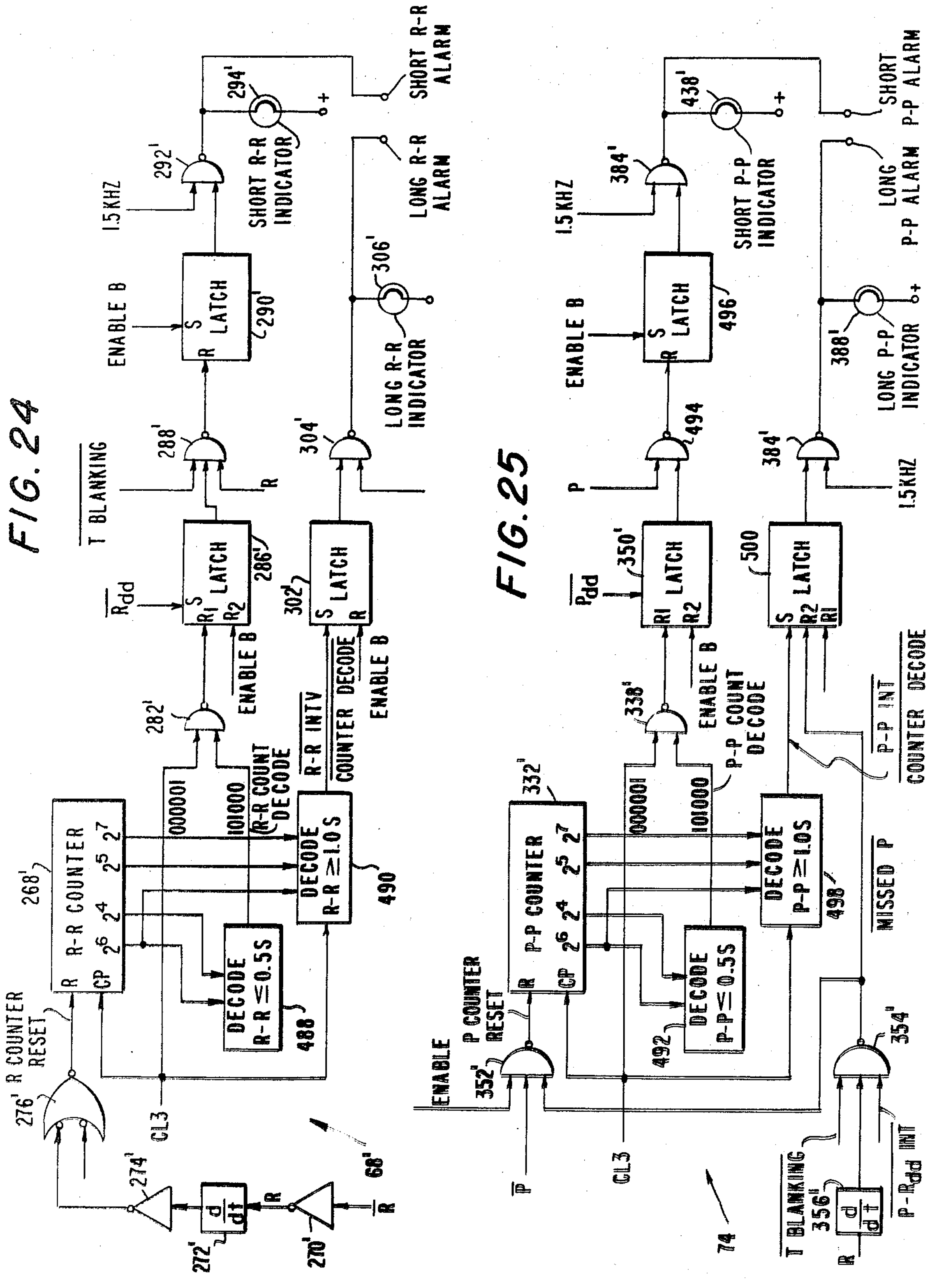
FIG. 24 is a circuit schematic of an alternative embodiment of the R-R CARDIAC LOGIC PROCESSING CIRCUIT of the present invention.
FIG. 25 is a circuit schematic showing an alternative embodiment of the P-P CARDIAC LOGIC PROCESSING CIRCUIT of the present invention; and, FIG. 26 is block diagram of a RECORDING UNIT useful with the cardiac monitor of the present invention.

By way of description, the various components utilized in FIG. 24 which are similar to the components utilized in FIG. 17 have been designated with the "prime" designation and further description of the operation of these components may be found in the description of FIG. 17. Thus, R-R CARDIAC LOGIC PROCESSING CIRCUIT 68' includes an R-R COUNTER 268' which is adapted to count CL 3 clock pulses applied thereto. A NAND DECODE R-R gate 282' goes "low" when R-R COUNTER 268' has counted clock pulses corresponding to an R-R INTERVAL less than or equal a predetermined time interval, for example, to 0.5 sec. In order to provide such an output, a DECODE R-R circuit 488, which includes a pair of diodes similar to DIODES 278 and 280 and a resistor similar to RESISTOR 284 of FIG. 17, is coupled as the input to gate 282'.

The R-R CARDIAC LOGIC PROCESSING CIRCUIT 68' operates in almost identical fashion to the R-R CARDIAC LOGIC PROCESSING CIRCUIT 68 of FIG. 17 when providing the SHORT R-R ALARM signal. More particularly, the output from NAND DECODE R-R gate 282' is utilized to actuate a LATCH 286' which is coupled as the input to a NAND gate 288'. The output from NAND gate 288' is coupled to a LATCH 290' which, in turn, is couple to a NAND gate 292'.

In operation, the output of NAND gate 292' stays "high" when LATCH 286' is reset, thus indicating that the R-R INTERVAL is of a duration greater than or equal to 0.5 sec. On the other hand, if the R-R INTERVAL is less than or equal to 0.5 sec., LATCH 286' is not reset, the output of NAND gate 288', goes "low" causing LATCH 290' to go "high." This results in a SHORT R-R ALARM signal being provided. A LONG R-R ALARM signal is provided in a similar manner. More particularly, the output of R-R COUNTER 268' is coupled to a DECODE R-R gate 490 which, by way of example, may be a NAND gate having an output which goes "low" when COUNTER 268' counts the number of CL3 clock pulses corresponding to an R-R INTERVAL greater than or equal to a predetermined time duration, for example, 1.0 sec. When the output from DECODE R-R gate 490 goes "low," this sets a LATCH 302' causing the output of a NAND gate 304' to go "low." This results in a LONG R- R ALARM signal being provided. The particular ALARM signal which is provided is indicated either by a SHORT R-R INDICATOR 294' or a LONG R-R INDICATOR 306'. It is to be noted, however, that a LONG R-R ALARM signal is provided and LONG R-R INDICATOR 306' is actuated without the requirement of "tallying" a predetermined number of LONG R-R INTERVALS as in CIRCUIT 68. Thus, an ALARM signal is provided immediately in this alternative embodiment.

In a similar manner, FIG. 25 illustrates a P-P CARDIAC LOGIC PROCESSING CIRCUIT 74' which operates to provide a SHORT P-P ALARM and a LONG P-P ALARM signal directly, that is, without tallying the number of "intermediately long" P-P INTERVALS. Again, similar components of FIG. 25 and FIGS. 18 and 20 are indicated by the "prime" designation in FIG. 25 and reference is made for a description thereof to FIGS. 18 and and 20. More particularly, the P-P CARDIAC LOGIC PROCESSING CIRCUIT 74' includes a P-P COUNTER 332' which is utilized to count CL3 clock pulses applied thereto. When P-P COUNTER 332' counts a predetermined number of CL3 clock pulses, corresponding to a P-P INTERVAL of a duration equal to or less than a predetermined duration, for example, 0.5 sec., the output of NAND gate 338' goes "low". A DECODE P-P circuit 492, which is substantially identical to CIRCUIT 488 of FIG. 24, and which includes diodes and a resistor (not shown), is also included as one of the inputs to NAND gate 338'. When the output of NAND gate 338' goes "low," this resets a LATCH 350' causing th output of LATCH 350' to go "high." This, in turn, causes the output of a NAND gate 494 to go "low," thereby causing the output of a LATCH 496 to go "high." When this occurs, the output of a NAND gate 384', which is coupled to the output of LATCH 496, goes "low." As a result, a SHORT P-P ALARM signal is provided and a SHORT P-P INDICATOR 438' is actuated.

In a similar manner, P-P CARDIAC LOGIC PROCESSING CIRCUIT 74' provides a LONG P-P ALARM signal and actuates LONG P-P INDICATOR 388' when the P-P INTERVAL exceeds or equals a predetermined time duration, for example, 1.0 sec. More particularly, the output from DECODE P-P CIRCUIT 498, which may be a NAND gate or the like, goes "low" when P-P COUNTER 332' counts a number of CL3 clock pulses corresponding to a P-P INTERVAL equal to or greather than 1.0 sec. When the output of DECODE P-P CIRCUIT 498 goes "low," this sets a LATCH 500 causing the output of this LATCH to go "high." LATCH 500 is reset by the ENABLE B signal applied thereto and is also reset by a MISSED P signal applied to the LATCH. The purpose of the MISSED P signal is to prevent a LONG P-P ALARM signal from being provided for the case where the cardiac monitor does not sense a P pulse. Thus, the MISSED P signal prevents false positives from occurring for the case in which the P component of the analog EKG signal is of an amplitude insufficient to be sensed.

When the output of DECODE P-P CIRCUIT 498 goes "low", the output of LATCH 500 goes "high." This causes the output of a NAND gate 384' to go "low" and this results in a LONG P-P ALARM signal being provided at the output of this gate. As was the case with R-R CARDIAC LOGIC PROCESSING CIRCUIT 68', P-P CARDIAC LOGIC PROCESSING CIRCUIT 74' provides a LONG ALARM signal without tallying or counting individual P-P INTERVALS.

THE RECORDING UNIT

It is now appreciated that the cardiac monitor of the present invention functions to provide a plurality of ALARM signals and actuates a plurality of INDICATORS upon the sensing of cardiac abnormalities. The cardiac monitor is especially useful in that it may be easily and conveniently carried by a patent thereby facilitating the monitoring of the patient's heart during the time that the patient has recovered from a heart attack and is away from the hospital or, in the alternative, it may be used to monitor patients who have, as yet, not suffered from an attack but are suspected of having cardiac trouble. In any case, when the cardiac monitor senses a cardiac abnormality, the patient advantageously notifies his physician who advises the patient on what course of conduct to follow. It is appreciated that the physician's analysis of the patient's condition would be facilitated if the physician had a record of the patient's EKG signal corresponding to a time in close proximity to the cardiac abnormality. Accordingly, a RECORD UNIT, illustrated in FIG. 26, is advantageously included for operation with the cardiac monitor.

Figure 26:
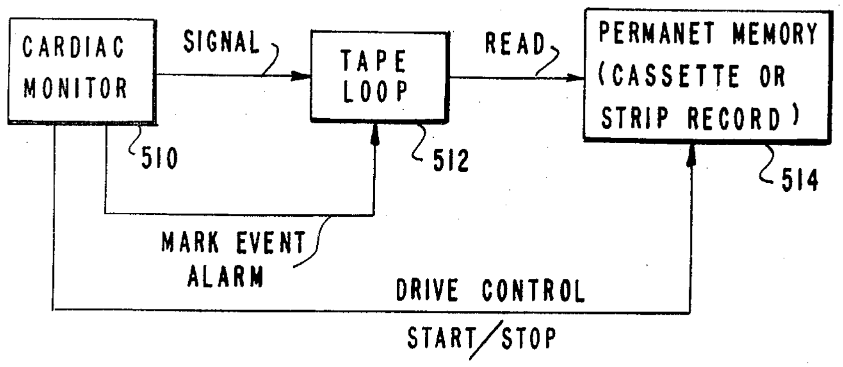

Referring to FIG. 26, the RECORD UNIT is provided to operate with the CARDIAC MONITOR, generally designated 510, and includes a TAPE LOOP CIRCUIT, generally designated 512, and a PERMANENT MEMORY CIRCUIT, generally designated 514. The subcarrier signal, containing the analog EKG signal, is coupled to TAPE LOOP CIRCUIT 512 from CARDIAC MONITOR 510. A MARK EVENT ALARM signal, responsive to the actuation of an ALARM signal in CARDIAC MONITOR 510 is also coupled to TAPE LOOP CIRCUIT 512 while a DRIVE CONTROL (START/STOP) signal, also responsive to actuation of an ALARM signal in CARDIAC MONITOR 510, is coupled to PERMANENT MEMORY CIRCUIT 514. By way of example, PERMANENT MEMORY CIRCUIT 514 may include a tape cassette or an EKG strip recorder or the like. The PERMANENT MEMORY CIRCUIT 514 is actuated, responsive to the DRIVE CONTROL (START/STOP) signal, to record the information which is on TAPE LOOP CIRCUIT 512. This is illustrated by the READ signal coupled from TAPE LOOP CIRCUIT 512 to PERMANENT MEMORY CIRCUIT 514.

As indicated hereinbefore, the RECORD UNIT is utilized to record the analog EKG signal thereby providing the physician with an EKG signal near the cardiac abnormality. In operation, the analog EKG signal, contained as the subcarrier signal, is recorded in TAPE LOOP CIRCUIT 512. However it is appreciated that a large period of time may pass before the cardiac monitor senses an abnormality. Accordingly, TAPE LOOP CIRCUIT 512 is adapted to record the cardiac signal and, after a predetermined delay, for example 5 minutes or the like, will erase itself. This is a continuous process with the EKG signal being recorded on the TAPE LOOP CIRCUIT but that part of the EKG signal being erased 5 minutes later. Until an ALARM signal occurs in CARDIAC MONITOR 510, PERMANENT MEMORY 514 is rendered inoperative.

When an ALARM signal occurs, corresponding to CARDIAC MONITOR 510 sensing a cardiac abnormality, a MARK EVENT ALARM signal is coupled to TAPE LOOP CIRCUIT 512. This signal serves to mark the time that the ALARM signal has occurred.

The sensing of a cardiac abnormality in CARDIAC MONITOR 510 also provides a DRIVE CONTROL (START/STOP) signal to PERMANENT MEMORY CIRCUIT 514. This starts this circuit allowing the cassette or strip recorder to "read" the EKG signal from TAPE LOOP CIRCUIT 512. After a predetermined time, for example, 10 minutes, the DRIVE CONTROL (START/STOP) signals stops PERMANENT MEMORY CIRCUIT 514.

Accordingly, the RECORD UNIT provides a recording, in PERMANENT MEMORY CIRCUIT 514, of the analog EKG signal from approximately 5 minutes before an ALARM signal to approximately 5 minutes after an ALARM signal has been sensed in the cardiac monitor. Further, by continuously erasing TAPE LOOP CIRCUIT 512 and only recording in PERMANENT MEMORY CIRCUIT 514 when an ALARM has occurred, the RECORD UNIT tends to edit the EKG signal — that is, only the EKG signal in proximity to an ALARM signal or cardiac abnormality is recorded. The EKG signal so recorded in PERMANENT MEMORY CIRCUIT 514 may be viewed by the physician in order to provide a help in analysing the patient's condition.

Obviously, other modifications and variations of the present invention are possible in light of the above teachings. For example, it is possible to tally or count the other cardiac signals before providing an alarm signal. Additionally, the tally interval may be heart dependent or time dependent. Still further, the time duration of the various signals, the number of tallies or counts required before an alarm signal is provided, the number of ventricular beats or cycles in the heart dependent tally interval and the time in the time dependent tally intervals may be changed within the scope of the present invention. Similarly, other logic circuitry and/or components may be utilized, for example, up-down counters may be used if so desired. Further, it may be desirable to require the sensing of a pluraluty of abnormal cardiac rhythms before an alarm signal is provided, for example, it may be required that a long QRS component occur in the monitored-heart in combination with ectopic beats before a PVC ALARM signal is provided. Still further, in order to further eliminate false positives, it may be advantageous to "tally" alarm occurrences before an alarm signal is provided, for example, it may be required that six LONG P-P ALARM signals occur within 4 minutes before AUDIBLE ALARM 80 and before the INDICATOR is actuated since, although it may be possible for artifacts to cause a single LONG P-P ALARM, it is highly unlikely that the artifact will persist for a 4 minute duration. To the contrary, a repetitive cardiac abnormality may well cause six LONG P-P ALARMS (or other ALARM signals) to occur within 4 minutes. Thus, false positives may further be reduced.

It is to be understood, therefore, that the abovedescribed cardiac monitor is merely an example of the application of the principles of the present invention. Further embodiments will be apparent to those skilled in the art without departing from the spirit and scope of the present invention as delineated by the scope of the following claims.

What is claimed is:

1. A cardiac monitor for analyzing cardiac rhythms, comprising:

a. means for providing an analog signal responsive to said cardiac rhythms including the P, Q, R, S and T components of said cardiac rhythms;

b. analog to digital converter means for converting said analog signal into a series of pulses including P, Q, R, S and T pulses corresponding to the P, Q, R, S and T components of said cardiac rhythms;

c. means for generating a series of clock pulses;

d. means for generating delayed R pulses occurring at a predetermined time interval subsequent to the occurrence of said R pulse;

e. counter means responsive to said R pulses and said clock pulses for producing a count signal indicative of the number of clock pulses occurring between successive R pulses;

f. decoding means coupled to receive said count signal and said clock pulses for producing a first potential level signal when said count is less than said predetermined number; and g. means responsive to said first potential level signal and said delayed R pulses for producing an output signal indicative of an abnormally short time interval between successive R pulses.

2. The cardiac monitor for analyzing cardiac rhythms, comprising:

a. means for providing an analog signal responsive to said cardiac rhythms including the P, Q, R, S and T components of said cardiac rhythms;

b. analog to digital converter means for converting said analog signal into a series of pulses including P, Q, R, S and T pulses corresponding to the P, Q, R, S and T components of said cardiac rhythms;

c. means for generating a series of clock pulses;

d. first counter means responsive to said R pulses and said clock pulses for producing a first count signal indicative of the number of clock pulses occurring between successive R pulses;

e. decode means responsive to said count signal and said clock pulses for producing decode signals when the number of clock pulses exceeds a first predetermined number but is less than a second predetermined number;

f. second counter means responsive to a first decode signal and said R pulses for establishing a heartbeat depended interval by producing a second count signal indicative of the number of successive R pulses occurring after occurrence of the first decode signal;

g. second decode means responsive to said second count signal for generating an interval signal at the end of said heartbeat dependent interval when a predetermined number of successive R pulses have been counted;

h. tally means responsive to said decode signals and said interval signal for producing a tally signal indicative of the number of decode signals occurring during said hearbeat dependent interval; and i. third decode means responsive to said tally signal for producing an output signal indicative of an abnormally high number of decode signals during said heartbeat dependent interval.

3. A cardiac monitor for analyzing cardiac rhythms, comprising:

a. means for providing an analog signal responsive to said cardiac rhythms including the P, Q, R, S and T components of said cardiac rhythms;

b. analog to digital converter means for converting said analog signal into a series of pulses including P, Q, R, S and T pulses corresponding to the P, Q, R, S and T components of said cardiac rhythms;

c. means for generating a series of clock pulses;

d. means for generating delayed R pulses occurring at a predetermined time interval subsequent to the occurrence of said R pulse;

e. means for generating TB pulses indicative of the interval between an R pulse and a successive P pulse;

f. gate means responsive to said delayed R pulses and said TB pulses for generating signals indicative of ectopic R pulses;

g. counter means responsive to said ectopic R pulses and said clock pulses for generating a count signal indicative of the number of clock pulses occurring after the occurrence of a first ectopic R pulse;

h. first decode means responsive to said count signal for generating a first decode signal when said count signal indicates that said counter means has counted a predetermined number of clock pulses;

i. tally means responsive to said ectopic R pulses and said first decode signal for generating a tally signal indicative of the number of ectopic R pulses which occur between the first ectopic R pulse and said first decode signal; and j. second decode means responsive to said tally signal for generating a second decode signal indicative of an abnormally high number of ectopic R pulses occurring between said first ectopic R pulse and said tally signal.

4. A cardiac monitor for analyzing cardiac rhythms, comprising:

a. means for providing an analog, signal responsive to said cardiac rhythms including the P, Q, R, S and T components of said cardiac rhythms;

b. analog to digital converter means for converting said analog signal into a series of pulses including P, Q, R, S and T pulses corresponding to the P, Q, R, S and T components of said cardiac rhythms;

c. means for generating delayed R pulses occurring at a predetermined time interval subsequent to the occurrence of said R pulse;

d. means for generating P-$R_d$ pulses indicative of the interval between the P pulse and the delayed R pulse;

e. means for generating TB pulses indicative of the interval between the R pulse and the next succeeding P pulse;

f. gate means responsive to R pulses, TB pulses and P-$R_d$ pulses for producing a missed P pulse when P pulses are missing from said cardiac rhythms signal;

g. latch means responsive to said missed P pulse for generating a first latch signal when a first missed P signal occurs;

h. tally means responsive to said first latch signal and said missed P pulses for providing a tally signal indicative of the number of missed P signals;

i. counter means responsive to said first latch signal and said R pulses for providing a count signal when said counter means counts a predetermined number of R pulses, said count signal being coupled to said latch means to produce a second latch signal, said tally means being responsive to said second latch signal to terminate counting of said missed P signals; and j. decode means responsive to said tally signal for producing an output signal indicative of an abnormally high number of missed P signals.

5. A cardiac monitor for analyzing cardiac rhythms, comprising:

a. means for providing an analog signal responsive to said cardiac rhythms including the P, Q, R, S and T components of said cardiac rhythms;

b. analog to digital converter means for converting said analog signal into a series of pulses including P, Q, R, S and T pulses corresponding to the P, Q, R, S and T components of said cardiac rhythms;

c. means for generating delayed P pulses occurring at a predetermined time interval after said P pulses;

d. means for generating first delayed R pulses occurring at a first predetermined time after the occurrence of said R pulses;

e. means for generating second delayed R pulses occurring at a predetermined time after the occurrence of said first delayed R pulses;

f. means for generating P-$R_{dd}$ pulses indicative of the time interval between said P pulse and said second delayed R pulses;

g. means for generating a series of clock pulses;

h. first counter means responsive to said P-$R_{dd}$ pulse and said clock pulses for producing a first count signal indicative of the number of clock pulses occurring during the duration of said P-$R_{dd}$ pulse signal;

i. decode means responsive to said count signal for generating a decode signal when the number of clock pulses counted by said counter means is less than a predetermined number; and j. means responsive to said first delayed R pulses; said delayed P pulses and said decode signal for producing short P-R signals indicative of an abnormally short time interval between said P pulse and said R pulse.

6. The cardiac monitor of claim 5 further including:

a. second counter means responsive to said short P-R signals and said R pulses for providing a second count signal when said second counter means counts a predetermined number of R pulses;

b. tally means responsive to said second count signal and said short P-R signal for providing a tally signal indicative of the number of short P-R signals which occur between the first short P-R signal and said second count signal; and c. second decode means responsive to said tally signal and said short P-R signals for generating an output signal indicative of an abnormally high number of short P-R signals.

7. A cardiac monitor for analyzing cardiac rhythms, comprising:

a. means for providing an analog signal to said cardiac rhythms including the P, Q, R, S and T components of said cardiac rhythms;

b. analog to digital converter means for converting said analog signal into a series of pulses including P, Q, R, S and T pulses corresponding to the P, Q, R, S and T components of said cardiac rhythms;

c. means for generating a series of clock pulses;

d. means for generating Q and S pulses which are the inverse of said Q pulses and said S pulses;

e. means for generating TB pulses representative of the interval between an R pulse and the next succeeding P pulse;

f. means responsive to said Q, S and TB pulses for providing a signal indicative of the trailing edge of said S pulses;

g. means for generating TB pulses which are the inverse of said TB pulses;

h. means responsive to said Q, S and TB pulses for producing a signal indicative of the leading edge of said Q pulses;

i. means responsive to the signals indicative of the leading edge of said Q pulses and the trailing edge of said S pulses for generating QRS pulses indicative of the interval between the Q and S pulse and QRS pulses which are the inverse of said QRS pulses;

j. counter means responsive to said QRS pulses and said clock pulses for providing a count signal indicative of the number of clock pulses counted during the duration of said QRS pulses; and k. decode means responsive to said count signal and said QRS pulses for producing an output signal when there is an abnormally long duration between a Q pulse and an S pulse.

8. A cardiac monitor for providing a real time analysis of cardiac rhythms, comprising:

a. a sensor including means for providing an analog EKG signal responsive to said cardiac rhythms and normally including P, Q, R, S and T components;

b. a processor remote from said sensor for analyzing said analog EKG signal, said processor including:

i. analog to digital converter means for providing a series of pulse signals including P, Q, R, S and T pulses corresponding to the P, Q, R, S and T components of said cardiac rhythms;

ii. means for providing a series of clock pulses;

iii. first digital means responsive to said clock pulses and said P, Q, R, S and T pulse signals for providing an ectopic pulse signal corresponding to an ectopic R component of said analog EKG signal occurring during an interval between the regular occurrence of the R components of said analog EKG signal;

iv. second digital means responsive to said ectopic pulse signal for producing an alarm signal indicative of the occurrence of said ectopic pulse signal; and c. means for coupling said analog EKG signal from said sensor to said remote processor.

9. The cardiac monitor of claim 8 wherein said first digital means further includes tally means responsive to said ectopic pulse signals for counting said ectopic pulse signals and providing a first signal when said tally means has counted a predetermined number of ectopic pulse signals, said second digital digital means being responsive to said first signal for producing said signal when said tally means has counted a predetermined of ectopic pulse signals.

10. The cardiac monitor of claim 9 wherein said tally means further includes tally interval means for establishing a tally interval, said tally interval means being responsive to a first ectopic pulse signal for starting said tally interval, said tally interval extending for a predetermined time interval after the occurrence of said first ectopic pulse, said first signal being provided when said tally means counts a predetermined number of ectopic pulse signals during said tally interval.

* * * * *